(12) United States Patent
Natori

(10) Patent No.: US 11,448,500 B2
(45) Date of Patent: Sep. 20, 2022

(54) THREE-DIMENSIONAL SHAPE MEASURING APPARATUS AND METHOD THEREOF UTILIZING POINT CLOUD DATA AND TOP VIEW MAP IMAGING

(71) Applicant: Keyence Corporation, Osaka (JP)

(72) Inventor: Kazuki Natori, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 22 days.

(21) Appl. No.: 16/918,108

(22) Filed: Jul. 1, 2020

(65) Prior Publication Data

US 2021/0041230 A1 Feb. 11, 2021

(30) Foreign Application Priority Data

Aug. 6, 2019 (JP) .............................. JP2019-144968

(51) Int. Cl.
*G01B 11/25* (2006.01)
*G02B 26/08* (2006.01)
(Continued)

(52) U.S. Cl.
CPC ........ *G01B 11/2513* (2013.01); *G01B 5/0004* (2013.01); *G01B 11/2527* (2013.01);
(Continued)

(58) Field of Classification Search
CPC ............ G01B 11/2513; G01B 11/2527; G01B 11/2531; G01B 5/0004; G01B 11/2522;
(Continued)

(56) References Cited

U.S. PATENT DOCUMENTS 10,323,933 B2 6/2019 Fujiwara et al.
2005/0264556 A1* 12/2005 Chang .................... G06T 19/20
345/419
(Continued)

FOREIGN PATENT DOCUMENTS

JP 2018004278 A 1/2018

OTHER PUBLICATIONS

U.S. Appl. No. 16/918,100, filed Jul. 1, 2020 (121 pages).
U.S. Appl. No. 16/918,116, filed Jul. 1, 2020 (122 pages).

*Primary Examiner* — Michael P LaPage
(74) *Attorney, Agent, or Firm* — Kilyk & Bowersox, P.L.L.C.

(57) ABSTRACT

A three-dimensional shape measuring apparatus includes a fixer that fixes an illuminator and a photoreceptor to produce a measurement area to be illuminated with measuring light above a stage and to incline their optical axes with respect to a placement surface of the stage in an orientation in which the illuminator and the photoreceptor face the measurement area obliquely downward; a point cloud data generator that generates point cloud data as a set of points including three-dimensional position information representing a three-dimensional shape of a measurement object placed on the stage based on light-reception signals provided by the photoreceptor; a top view map image generator that generates a top view map image representing a plan view of the measurement object as viewed downward from a position right above the measurement object based on the point cloud data; and a display that displays the top view map image.

14 Claims, 44 Drawing Sheets

(51) Int. Cl.
*G01N 21/88* (2006.01)
*G01B 5/00* (2006.01)

(52) U.S. Cl.
CPC ..... *G01B 11/2531* (2013.01); *G01N 21/8806* (2013.01); *G02B 26/0833* (2013.01)

(58) Field of Classification Search
CPC .............. G01B 11/25; G01N 21/8806; G01N 2021/8829; G02B 26/0833; G06T 2207/10028
See application file for complete search history.

(56) References Cited

U.S. PATENT DOCUMENTS

| | | | | |
|---|---|---|---|---|
| 2009/0137893 | A1* | 5/2009 | Seibel | A61B 1/07 600/407 |
| 2015/0381968 | A1* | 12/2015 | Arora | G06T 17/00 348/47 |
| 2017/0024874 | A1* | 1/2017 | Pang | G06V 40/113 |
| 2017/0370708 | A1* | 12/2017 | Fujiwara | G06T 7/521 |
| 2018/0058843 | A1* | 3/2018 | Tabuchi | G01B 21/04 |
| 2018/0085927 | A1* | 3/2018 | Kapoor | B25J 9/1664 |
| 2018/0247447 | A1* | 8/2018 | Serna | G06T 15/405 |
| 2018/0297117 | A1* | 10/2018 | Kanko | B28B 1/001 |
| 2020/0273216 | A1* | 8/2020 | Kennedy | A61B 1/00009 |

* cited by examiner

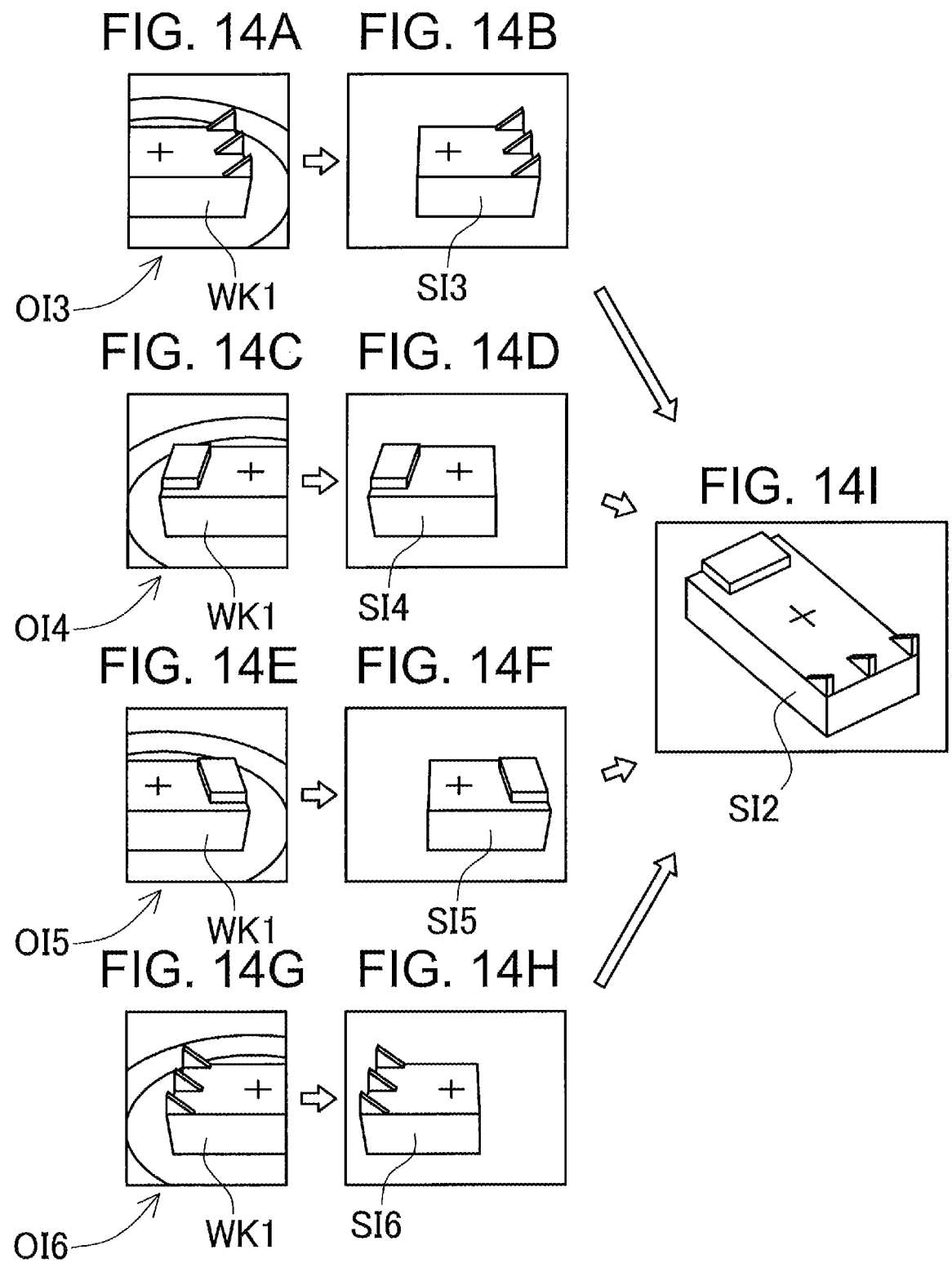

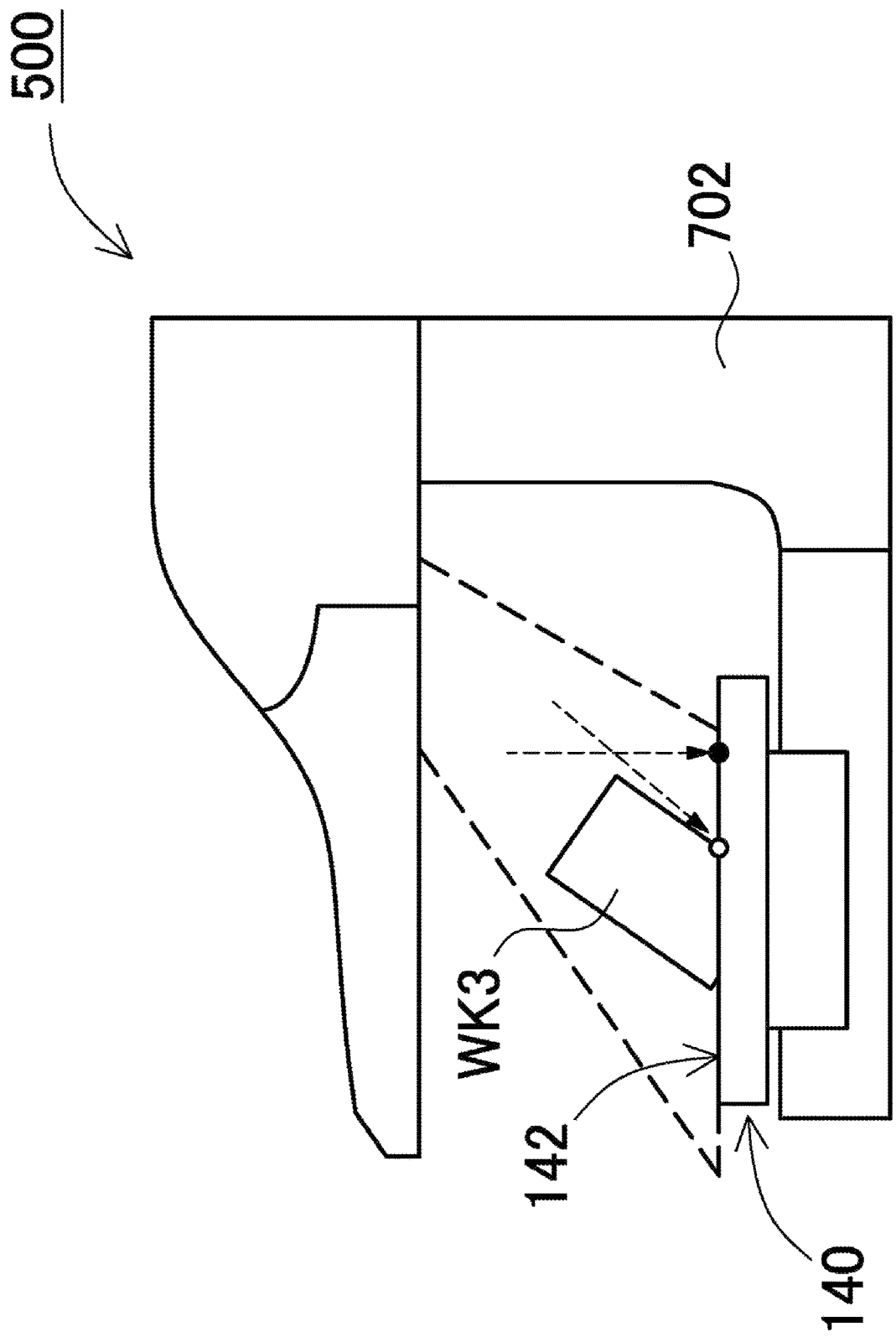

FIG. 23

- S2301: PLACE WORKPIECE ON PLACEMENT SURFACE
- S2302: SPECIFY MEAS. CONDITIONS (BRIGHTNESS, ORIENTATION)
- S2303: OPEN MEAS.-AREA SETTING SCREEN AND ISSUE INSTRUCTION TO GENERATE TOP VIEW MAP IMAGE
- S2304: GENERATE AND DISPLAY TOP VIEW MAP IMAGE
- S2305: CHECK TOP VIEW MAP IMAGE
- S2306: IMAGE CAPTURE AREAS OF TOP VIEW MAP IMAGE SUFFICIENT?
  - NO → S2307: INSTRUCT TO GENERATE ADDITIONAL TOP VIEW MAP IMAGE → S2308: ADD TOP VIEW MAP IMAGE TO DISPLAY → (back to S2305)
  - YES → S2309: DEFINE MEAS. AREAS
- S2310: ISSUE MEAS. INSTRUCTION
- S2311: EXECUTE MEASUREMENT

FIG. 25
| Stage Position | Texture | Top View Before Combination | Top View After Combination |
|---|---|---|---|
| 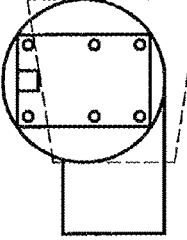 | 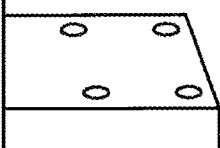 | 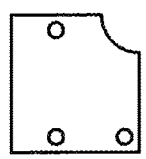 | 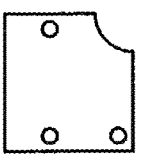 |
| 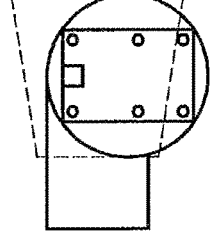 | 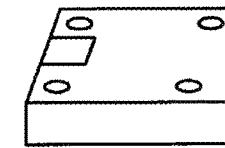 | 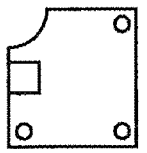 | 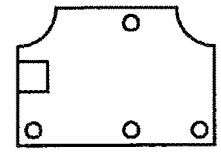 |
| 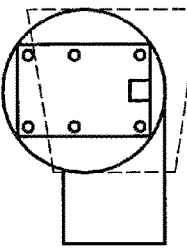 | 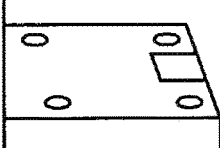 | 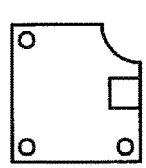 | 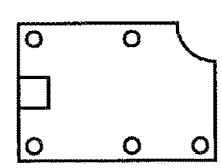 |
| 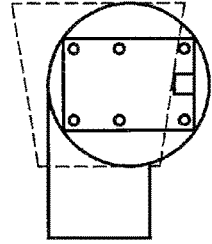 | 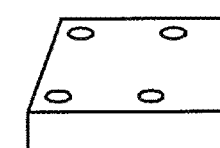 | 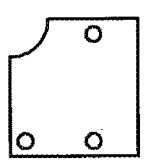 | 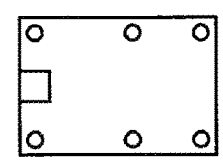 |

THREE-DIMENSIONAL SHAPE MEASURING APPARATUS AND METHOD THEREOF UTILIZING POINT CLOUD DATA AND TOP VIEW MAP IMAGING

CROSS-REFERENCE TO RELATED APPLICATIONS

The present application claims priority under 35 U.S.C. § 119 to Japanese Patent Application No. 2019-144,968, filed on Aug. 6, 2019, the contents of which are incorporated herein by reference.

BACKGROUND OF THE INVENTION

1. Field of the Invention

The present disclosure relates to a three-dimensional shape measuring apparatus and a three-dimensional shape measuring method which perform predetermined inspections including height information on a three-dimensional measurement object.

2. Description of the Related Art

A triangulation-type three-dimensional shape measuring apparatus is known (for example, JP 2018-4,278 A). The three-dimensional shape measuring apparatus includes a stage on which a measurement object is placed, and a head which is fixedly coupled to the stage to illuminate the measurement object with measuring light and receive reflected light from the measurement object. In other words, a photoreceptor which receives the reflected light is arranged to face the measurement object obliquely downward whereby capturing an image on the stage. According to this, its robustness against external environment change such as resistance to vibration can be improved, and a three-dimensional shape of the measurement object can be stably measured.

However, in this arrangement, because the photoreceptor captures an image on the stage so that the photoreceptor faces the stage obliquely downward, there is a problem that a three-dimensional measurement area cannot be easily properly defined based on a simply captured two-dimensional image of a measurement object which is placed on the stage.

It is one object to provide a three-dimensional shape measuring apparatus and a three-dimensional shape measuring method which can easily define a three-dimensional measurement area when capturing an image of a measurement object in a slant direction.

SUMMARY OF THE INVENTION

A three-dimensional shape measuring apparatus according to a first aspect of the present invention is a three-dimensional shape measuring apparatus which measures a three-dimensional shape of a measurement object, the apparatus including a stage that includes a placement surface on which a measurement object is placed; an illuminator that illuminates the measurement object, which is placed on the stage, with measuring light having a predetermined pattern; a photoreceptor that receives the measuring light which is reflected from the measurement object illuminated by the illuminator, and provides light-reception signals representing a light reception amount; a mount that supports the stage; a fixer that is coupled to the mount, and fixes the illuminator and the photoreceptor to produce a measurement area to be illuminated with the measuring light above the stage and to incline optical axes of the illuminator and the photoreceptor with respect to the placement surface in an orientation with which the illuminator and the photoreceptor face the measurement area obliquely downward; a support that supports the fixer to be spaced away from the mount; a point cloud data generator that generates point cloud data as a set of points including three-dimensional position information representing a three-dimensional shape of the measurement object based on the light-reception signals which are provided by the photoreceptor; a top view map image generator that generates a top view map image representing a plan view of the measurement object, which is placed on the stage, as viewed downward from a position right above the measurement object based on the point cloud data, which is generated by the point cloud data generator; and a display that displays the top view map image, which generated by the top view map image generator. According to this construction, because a top view map image which is viewed downward from the position right above the measurement object is generated, users can easily grasp the entire shape of the measurement object, and as a result can easily define its measurement area.

Also in a three-dimensional shape measuring apparatus according a second aspect of the present invention, in addition to the aforementioned aspect, the top view map image generator applies a two-dimensional texture image of the measurement object which is captured by the photoreceptor onto the point cloud data which is generated by the point cloud data generator onto the three-dimensional data positions in the point cloud data to generate the top view map image.

Also in a three-dimensional shape measuring apparatus according a third aspect of the present invention, in addition to any of the aforementioned aspects, the top view map image generator generates the top view map image from a mesh image the surfaces of which are formed by applying polygons onto points in the point cloud data which is generated by the point cloud data generator.

Also in a three-dimensional shape measuring apparatus according a fourth aspect of the present invention, in addition to any of the aforementioned aspects, the display includes a top view map image display area that shows the top view map image.

Also in a three-dimensional shape measuring apparatus according a fifth aspect of the present invention, in addition to any of the aforementioned aspects, apparatus further includes
a measurement area setting part that specifies the measurement area on the top view map image which is displayed in the top view map image display area, and a movement controller that controls movement of the stage based on the measurement area which is defined by the measurement area setting part.

Also in a three-dimensional shape measuring apparatus according a sixth aspect of the present invention, in addition to any of the aforementioned aspects, the top view map image generator can generate a combined top view map image by combining a plurality of top view map images of a plurality of different areas of the measurement object which are captured by the photoreceptor. According to this construction, because a top view map image in a wider field of view can be obtained by combining two or more top view map images, it is possible to provide users with a user-friendly environment in operations such as measurement area definition.

Also in a three-dimensional shape measuring apparatus according a seventh aspect of the present invention, in addition to any of the aforementioned aspects, the top view map image generator is configured to accept definition of a location on the top view map image displayed in the top view map image display area to which an additional top view map image is added, and the top view map image generator generates the additional top view map image in the defined location, and combines the top view map image or combined top view map image which has been generated and the additional top view map image to display a new combined top view map image in the top view map image display area.

Also in a three-dimensional shape measuring apparatus according an eighth aspect of the present invention, in addition to any of the aforementioned aspects, the measurement area setting part can select from among measurement area shapes.

Also in a three-dimensional shape measuring apparatus according a ninth aspect of the present invention, in addition to any of the aforementioned aspects, the stage further includes a rotation stage part that rotates the placement surface, and the movement controller controls rotational movement of the rotation stage part based on the measurement area which is defined by the measurement area setting part.

Also in a three-dimensional shape measuring apparatus according a tenth aspect of the present invention, in addition to any of the aforementioned aspects, the stage further includes a translation stage part that translates the placement surface, the movement controller translates the translation stage part in a direction opposite to the support from a previously-defined original position, and the point cloud data generator generates the point cloud data representing a three-dimensional shape of the measurement object. According to this construction, because the translation stage part is spaced away from the photoreceptor, a wide angle of view can be surely provided so that a wide area image can be captured, and therefore there is an advantage that even a large measurement object can be easily included in the field of view.

Also in a three-dimensional shape measuring apparatus according an eleventh aspect of the present invention, in addition to any of the aforementioned aspects, in the rotational movement of the rotation stage part the movement controller rotates the rotation stage part following the return movement of the translation stage part to a previously-defined reference position.

Accordingly, in the arrangement in which the rotation stage part and the translation stage part are provided together, unintentional collision of the measurement object with other members can be easily avoided.

Also in a three-dimensional shape measuring apparatus according a twelfth aspect of the present invention, in addition to any of the aforementioned aspects, the top view map image generator generates the top view map image under a simple measurement condition which requires a lower processing load than a measurement condition in normal three-dimensional shape measurement.

Also in a three-dimensional shape measuring apparatus according a thirteenth aspect of the present invention, in addition to any of the aforementioned aspects, the top view map image generator executes, as under the simple measurement condition, at least one of reduction of image resolution as compared with the measurement condition in normal three-dimensional shape measurement, reduction of exposure time of the photoreceptor as compared with the measurement condition in normal three-dimensional shape measurement, and limitation on multiple image capture operations (if two or more illuminators are included) in which images are captured by the photoreceptor every when the illuminators illuminate the measurement object to a single image capture operation in which an image is captured by the photoreceptor only when one of the illuminators illuminates the measurement object. According to this construction, because the simple measurement conditions are defined to reduce the load as compared with the normal measurement as discussed above, the top view map image can be generates and displayed in a short time.

Also in a three-dimensional shape measuring apparatus according a fourteenth aspect of the present invention, in addition to any of the aforementioned aspects, the photoreceptor includes a first optical system that has a first scaling factor, and a second optical system that has a second scaling factor greater than the first scaling factor, and the top view map image generator generates the top view map image by using the first optical system even when the second optical system is selected for the three-dimensional measurement. According to this construction, even in the case in which the second optical system having a higher scaling factor is selected, because the first optical system which has a lower scaling factor and a wider field of view is used to capture a top view map image of a measurement object, the measurement object can be easily entirely captured.

In addition, a three-dimensional shape measuring method according to a fifteenth aspect of the present invention includes generating point cloud data of a measurement object; and generating a top view map image by mapping the generated point cloud data onto a plan view of the measurement object as viewed downward from a position right above the measurement object.

Also in a three-dimensional shape measuring method according a sixteenth aspect of the present invention, in addition to the aforementioned aspect, the method further includes prompting users to specify a measurement area on the top view map image.

Also in a three-dimensional shape measuring method according a seventeenth aspect of the present invention, in addition to any of the aforementioned aspects, the method further includes automatically specifying a measurement area on the top view map image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 11A is a schematic plan view of a translation stage part on which a measurement object, which is not entirely included in the observation visual field, placed on;

FIG. 14A is an observed image of a measurement object which is captured at the position shown in FIG. 13B;

FIG. 14B is a single-view measurement data which is generated from the observed image shown in FIG. 14A;

FIG. 14C is an observed image of the measurement object which is captured at the position shown in FIG. 13C;

FIG. 14D is a single-view measurement data which is generated from the observed image shown in FIG. 14C;

FIG. 14E is an observed image of the measurement object which is captured at the position shown in FIG. 13D;

FIG. 14F is a single-view measurement data which is generated from the observed image shown in FIG. 14E;

FIG. 14G is an observed image of the measurement object which is captured at the position shown in FIG. 13E;

FIG. 14H is a single-view measurement data which is generated from the observed image shown in FIG. 14G;

FIG. 14I is a combined image which is obtained by combining FIGS. 14B, 14D, 14F, and 14H;

FIG. 22 is a schematic side view showing a measurement object placed in an inclined orientation on the placement surface when observed in a slanting direction from the top;

FIG. 23 is a flowchart illustrating the procedure for instruction by users to generate a top view map image;

FIG. 25 illustrates exemplary generated top view map images;

DESCRIPTION

Figure 1:
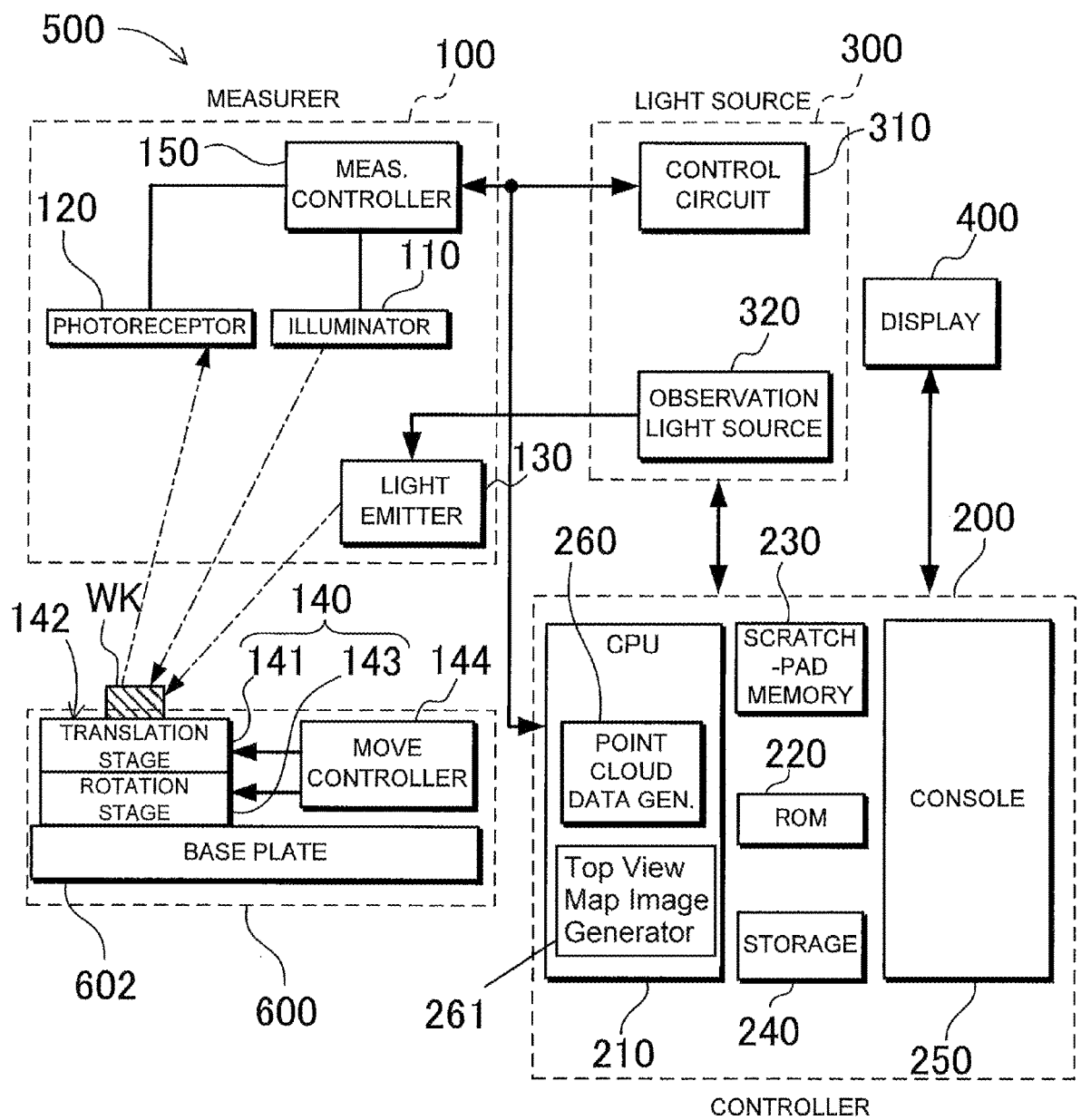
FIG. 1 is a block diagram showing an image inspection apparatus according to a first embodiment of the present invention.

The following description will describe embodiments according to the present invention with reference to the drawings. It should be appreciated, however, that the embodiments described below are illustrations of a three-dimensional shape measuring apparatus and a three-dimensional shape measuring method to give a concrete form to technical ideas of the invention, and a three-dimensional shape measuring apparatus and a three-dimensional shape measuring method of the invention are not specifically limited to description below. Furthermore, it should be appreciated that the members shown in claims attached hereto are not specifically limited to members in the embodiments. Unless otherwise specified, any dimensions, materials, shapes and relative arrangements of the parts described in the embodiments are given as an example and not as a limitation. Additionally, the sizes and the positional relationships of the members in each of drawings are occasionally shown exaggeratingly for ease of explanation. Members same as or similar to those of this invention are attached with the same designation and the same reference numerals and their description is omitted. In addition, a plurality of structural elements of the present invention may be configured as a single part that serves the purpose of a plurality of elements, on the other hand, a single structural element may be configured as a plurality of parts that serve the purpose of a single element.

In this specification, the term "texture image" refers to an observed image (typically, optical image) which includes texture information. In addition, the term "height image" is also referred to as depth map and the like, and is used to mean an image which includes height information. Examples of height images can be provided by images which have height information converted into luminance, chromaticity, or the like represented as a two-dimensional image, and images have height information as Z coordinate information represented as a three-dimensional image. Also, height images include a three-dimensional combined image which is obtained by applying a texture image as texture information onto the aforementioned exemplary height image. In addition, in this specification, display forms for height images are not limited to two-dimensional representation but can include three-dimensional representation. For example, the display forms for height images can include two-dimensional representation which has height information included in a height image converted into luminance or the like, and three-dimensional representation which has height information converted into Z coordinate information.

In addition, in this specification, the term "orientation" of a measurement object which is placed on a stage refers to a rotation angle of the measurement object. It is noted that in the case in which a measurement object is an axially symmetrical shape such as a circular cone which has a circle as viewed in a plan view its orientation is not required to be defined because the same result is obtained irrespective of its rotation angle.

In the following embodiments, in order to obtain height information of a measurement object, the measurement object is illuminated with measuring light having a predetermined pattern so that its height information is obtained by using signals obtained from reflected light which is reflected by surfaces of the measurement object. For example, a measuring method using triangulation which uses structured light as the measuring light having a predetermined pattern, projects it onto a measurement object, and uses striped projection images obtained from the reflected light. However, the principle and construction for obtaining height information of a measurement object in the present invention are not limited to this but other method can be used to obtain height information of a measurement object.

First Embodiment

A three-dimensional shape measuring apparatus can measure heights in a measurement object image in three dimensions. Also, in addition to the three-dimensional measurement, two-dimensional measurement can be performed. FIG. 1 is a block diagram showing a three-dimensional shape measuring apparatus according to a first embodiment of the present invention. This illustrated three-dimensional shape measuring apparatus 500 includes a measurer 100, a mount 600, a controller 200, a light source 300, and a display 400. The three-dimensional shape measuring apparatus 500 illuminates a measurement object WK with structured light by using the light source 300, captures striped projection images of the measurement object WK to generate a height image including height information, and can measure the three-dimensional dimensions and shape of the measurement object WK based on the height image. Because the measurement using such striped projection can measure height without moving the measurement object WK or the optical system such as lenses in the Z direction, there is an advantage that measurement time can be reduced.

The measurer 100 includes an illuminator 110, a photoreceptor 120, a measurement controller 150, and an illumination light emitter 130. The illuminator 110 illuminates the measurement object WK, which is placed on the stage 140, with measuring light having a predetermined pattern. The photoreceptor 120 is fastened to the placement surface 142 in an inclined orientation. The photoreceptor 120 is illuminated by the illuminator 110, and receives measuring light reflected from the measurement object WK to provide light-reception signals representing a light reception amount.

The mount 600 includes the stage 140 and a movement controller 144. This mount 600 supports the stage 140 on a base plate 602. The movement controller 144 serves as a member which moves the stage 140. Although the movement controller 144 is provided on the mount 600 side, it may be provided on the controller 200 side.

The light source 300 is connected to the measurer 100. The light source 300 emits measuring light, and provides it to the measurer 100. The controller 200 controls image capture in the measurer 100. The display 400 is connected to the controller 200, displays generated images, and serves as an HMI for necessary settings.

Stage 140

The mount 600 shown in FIG. 1 includes the stage 140 and the movement controller 144. The stage 140 has the placement surface 142 on in which the measurement object WK is placed. This stage 140 includes a rotation stage part 143 which rotates the placement surface 142, and a translation stage part 141 which translates the placement surface 142.

Movement Controller 144

The movement controller 144 controls rotational movement of the rotation stage part 143 and translational movement of the translation stage part 141 based on a measurement area which is defined by a measurement area setting part 264. In addition, the movement controller 144 controls movement operation of the stage 140 by a stage movement part based on the measurement area which is defined by the later-discussed measurement area setting part 264.

The controller 200 includes a CPU (central processing unit) 210, a ROM (read-only memory) 220, a scratch-pad memory 230, a storage 240, and a console 250. PCs (personal computers) or the like can be used for the controller 200. In addition, the CPU 210 realizes functions of a point cloud data generator 260 which generates point cloud data and a top view map image generator 261 which generates a top view map image based on the point cloud data which is generated by the point cloud data generator 260 (discussed below in detail).

Block Diagram of Measurer 100

Figure 2:
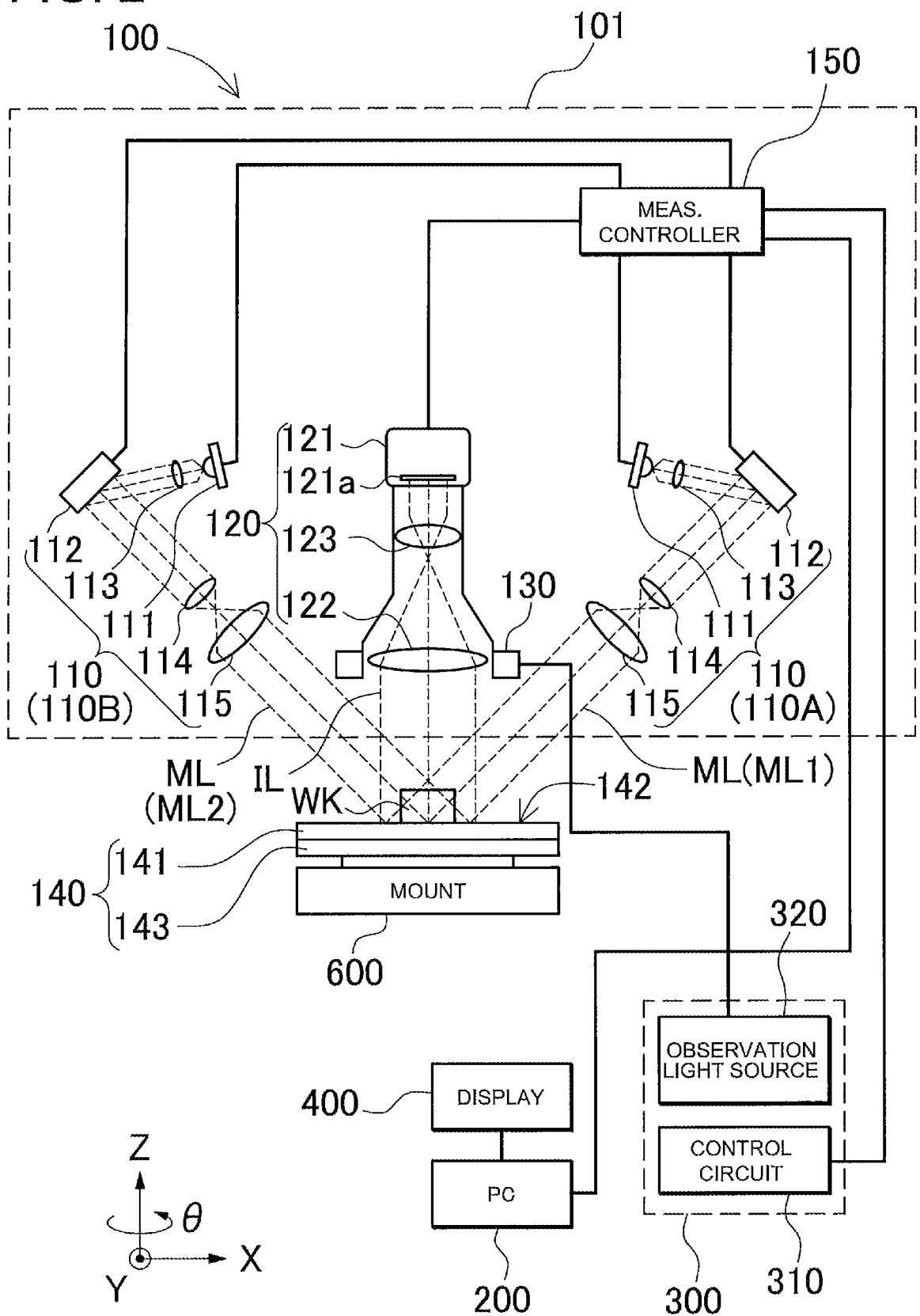
FIG. 2 is a block diagram showing the construction of a measurer in FIG. 1.

FIG. 2 is a block diagram showing the construction of the measurer 100 of the three-dimensional shape measuring apparatus 500 shown in FIG. 1. The measurer 100 is a microscope, for example, and includes the illuminator 110, the photoreceptor 120, the illumination light emitter 130, the measurement controller 150, a body case 101 which accommodates them, and the stage 140. The illuminator 110 includes a measuring light source 111, a pattern generator 112, and a plurality of lenses 113, 114 and 115. The photoreceptor 120 includes a camera 121, and a plurality of lenses 122 and 123. The measurement object WK is placed on the stage 140. The body case 101 is a resin or metal casing.

Illuminator 110

The illuminator 110 is arranged obliquely above the stage 140. The measurer 100 can include a plurality of illuminators 110. In the embodiment shown in FIG. 2, the measurer 100 includes two illuminators 110. In this embodiment, a first measuring-light illuminator 110A (right side in FIG. 2) which can illuminate the measurement object WK with first measuring light ML1 in a first direction, and a second measuring-light illuminator 110б (left side in FIG. 2) which can illuminate the measurement object WK with second measuring light ML2 in a second direction different from the first direction are provided. The first measuring-light illuminator 110A and the second measuring-light illuminator 110б are symmetrically arranged with respect to the optical axis of the photoreceptor 120. It is noted that three or more illuminators may be provided, or a common illuminator may be provided but a measurement object can be illuminated with light in different illumination directions by moving the common illuminator and the stage relative to each other. On the other hand, although a plurality of illuminators 110 are provided and the common photoreceptor 120 receives light in the foregoing embodiment, a plurality of photoreceptors may be provided to receive light from a common illuminator. In addition, although an illumination angle of illumination light which is emitted by the illuminator is fixed with respect to the vertical direction in this embodiment, the illumination angle can be changed.

Measuring Light Source 111

The first and second measuring-light illuminators 110A and 110б include first and second measuring light sources, respectively, as the measuring light source 111. The measuring light sources 111 are a halogen lamp which emits white light, for example. The measuring light source 111 may be a light source which emits monochromatic light, other light source such as white LED (light emitting diode) or organic electroluminescence which emits white light, for example. Light which is emitted by the measuring light source 111 (hereinafter, referred to as "measuring light") is properly condensed by the lens 113 and then enters the pattern generator 112.

Pattern Generator 112

The pattern generator 112 reflects light which is emitted by the measuring light source 111 to illuminate the measurement object WK with measuring light. The measuring light which enters the pattern generator 112 is converted into a predetermined pattern and predetermined intensity (brightness) and emitted from the pattern generator 112. The measuring light which is emitted from the pattern generator 112 is converted into light having a larger diameter than an observable and measurable field of view of the photoreceptor 120 by the lenses 114 and 115, and then incident on the measurement object WK on the stage 140.

The pattern generator 112 is a member which can be changed between an illumination state in which the measurement object WK is illuminated with measuring light and a non-illumination state in which the measurement object WK is not illuminated with measuring light. A DMD (digital micro mirror device) can be suitably, used for the pattern generator 112, for example. The pattern generator 112 which uses a DMD can be controlled by the measurement controller 150 between a reflection state in which measuring light is reflected to travel along an optical path as the illumination state and a light interception state in which the measuring light is intercepted as the non-illumination state.

The DMD is an element which includes a number of micro mirrors (very small mirror surfaces) MM arranged in a flat plane. Because the micro mirrors can be individually switched between ON and OFF states by the measurement controller 150, desired projection patterns can be formed by combination of ON and OFF states of the micro mirrors. Accordingly, the measurement object WK can be measured by generating a pattern required for triangulation. Consequently, the DMD serves as a projection pattern optical system which illuminates the measurement object WK with an alternate projection pattern for measurement when the measurement object WK is measured. In addition, such a DMD has an advantage of high response speed and high operating speed compared with shutters and the like.

It is noted that although the pattern generator 112 has been illustratively described to use the DMD in the foregoing embodiment, the pattern generator 112 is not limited to a DMD but other member can be used as the pattern generator. For example, a LCOS (Liquid Crystal on Silicon: reflective liquid crystal element) may be used as the pattern generator 112. Alternatively, instead of reflective members, a transmissive member may be used to adjust a transmission amount of measuring light. In this case, the pattern generator 112 is arranged on the optical path of measuring light, and is switched between the illumination state in which the measuring light passes through the pattern generator 112 and the light interception state in which the measuring light is intercepted. An LCD (liquid crystal display) can be suitably, used for the pattern generator 112, for example. Alternatively, the pattern generator 112 may be constructed of a projection system using a plurality lines of LEDs or a projection system using a plurality of light paths, an optical scanner system constructed of a laser and galvanometer mirrors, etc., an AFI (Accordion fringe interferometry) system using interference fringes produced by superposing beams divided by a beam splitter, a projection system using gratings constructed of a piezo stage, high resolution encoder, etc. and a moving mechanism, or the like.

In addition, although the three-dimensional shape measuring apparatus has been illustratively described to include two measuring-light illuminators in the embodiment shown in FIG. 2, etc., the present invention is not limited to this but the three-dimensional shape measuring apparatus can include three or more the measuring-light illuminators. Alternatively, the three-dimensional shape measuring apparatus can only include a single measuring-light illuminator. In this case, the measurement object WK can be illuminated with measuring light in different directions by moving the single measuring-light illuminator which is movable between different positions.

Photoreceptor 120

The photoreceptor 120 is arranged above the stage 140. Measuring light which is reflected upward of the stage 140 by the measurement object WK is condensed to form an image by the lenses 122 and 123 of the photoreceptor 120, and is then received by the camera 121.

Camera 121

The camera 121 is a CCD (charge-coupled device) camera which includes an image pickup device 121a and lenses, for example. The image sensor 121a is a monochromatic CCD (charge-coupled device), for example. The image pickup devices 121a may be other image pickup device such as CMOS (complementary metal-oxide semiconductor) image sensor. Because color image pickup devices necessarily includes pixels which receive red light, green light, and blue light, color image pickup devices have lower measurement resolution as compared with monochromatic image pickup devices, and color image pickup devices have lower sensitivity because color filters are necessarily provided to their pixels. For this reason, in this embodiment, a monochromatic CCD is used as the image pickup device, and color images are captured by separately illuminating a measurement object with R light, G light, and B light which are emitted by the later-discussed illumination light emitter 130 at different timing. According to this construction, color images of the measurement object can be captured without reduction of measurement accuracy.

However, needless to say, a color image pickup device may be used as the image pickup device 121a. In this case, although measurement accuracy or sensitivity will be reduced, the illumination light emitter 130 does not necessarily emit R light, G light, and B light at different timing, and the illumination optical system can be simple because color image can be captured by emitting only white light. The pixels of the image pickup device 121a provide analog electric signals corresponding to amounts of their received light (hereinafter, referred to as "light-reception signals") to the measurement controller 150.

Such captured images of a measurement object WK form a similar figure very accurately similar to the measurement object WK in accordance with the characteristics of the lens. In addition, the dimensions in the image and the dimensions in the actual measurement object WK can be accurately associated with each other by calibration using scaling of the lens.

(Measurement Controller 150)

The measurement controller 150 includes an A/D convertor (analog/digital converter) and FIFO (First In First Out) memory (not shown). The light-reception signals which are provided from the camera 121 are periodically sampled at a fixed sampling period by the A/D convertor of the measurement controller 150, and are converted into digital signals under control of the light source 300. The digital signals which are provided from the A/D convertor are sequentially accumulated in the FIFO memory. The digital signals which are accumulated in the FIFO memory are sequentially transmitted as pixel data to the controller 200.

Controller 200

As shown in FIG. 1, the controller 200 includes the CPU 210, the ROM 220, the scratch-pad memory 230, the storage 240, and the console 250. The console 250 can include a keyboard and a pointing device. A mouse or joy stick can be used as the pointing device.

The ROM 220 stores a system program. The scratch-pad memory 230 is constructed of a RAM (random access memory), and is used for various types of data processing. The storage 240 is constructed of a hard disk and the like. The storage 240 stores a three-dimensional shape measurement program for operating the three-dimensional shape measuring apparatus. In addition, the storage 240 is used to save various types of data such as pixel data which are provided by the measurement controller 150 and the like. Also, the storage stores illuminance information, height information, and attribute information of pixels which are included in the measurement image.

CPU 210

The CPU 210 is a control circuit or a controlling device which performs various types of computations by operation on provided signals and data, and provides the calculation results. In this specification, the term "CPU" refers to a device or circuit which performs computations, and is not limited to a processor such as CPU for general-purpose PC, MPU, GPU and TPU but used to include a processor or microcomputer such as FPGA, ASIC, and LSI, or a chip set such as SoC.

Figure 3:
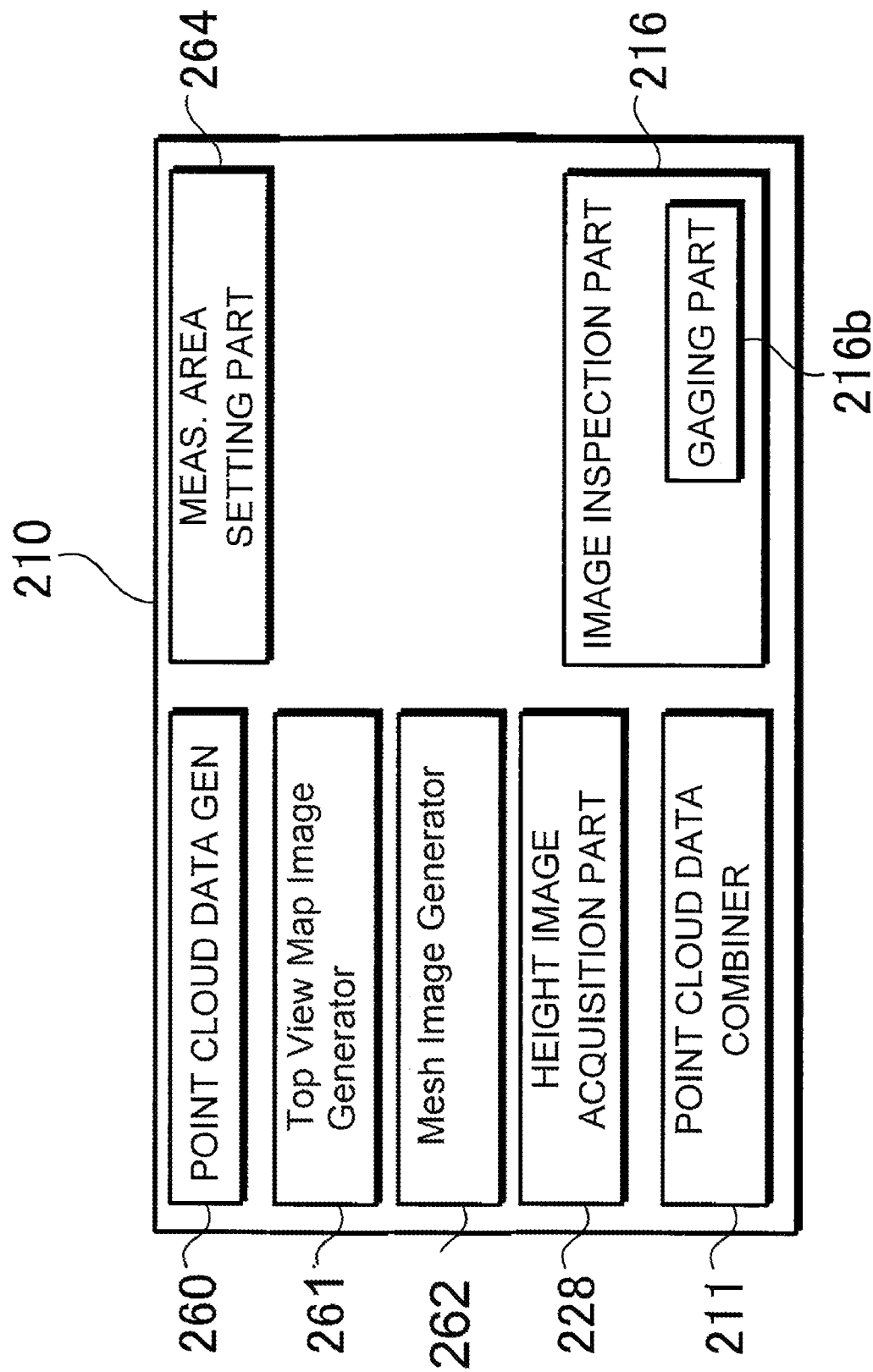
FIG. 3 is a block diagram showing the construction of a CPU of a controller in FIG. 1.

The CPU 210 generates image data based on pixel data provided from the measurement controller 150. In addition, the CPU 210 performs various types of processing on the generated image data by using the scratch-pad memory 230, and displays images based on the image data on the display 400. FIG. 3 is a block diagram of the CPU 210. The CPU realizes functions of the point cloud data generator 260, the top view map image generator 261, the measurement area setting part 264, a height image acquisition part 228, and a point cloud data combiner 211, and the like.

Point Cloud Data Generator 260

The point cloud data generator 260 generates point cloud data as a set of points including three-dimensional position information representing a three-dimensional shape of a measurement object WK based on the light-reception signals which are provided by the photoreceptor 120.

Top View Map Image Generator 261

The top view map image generator 261 generates a top view map image representing a plan view of a measurement object WK, which is placed on the stage 140, as viewed downward from a position right above the measurement object WK based on the point cloud data, which is generated by the point cloud data generator 260. Because the top view map image which is viewed downward from the position right above the measurement object WK is generated, users can easily grasp the entire shape of the measurement object WK, and as a result can easily define its measurement area. For example, the top view map image generator 261 applies a two-dimensional texture image of the measurement object WK which is captured by the photoreceptor 120 onto the point cloud data which is generated by the point cloud data generator 260 onto the three-dimensional data positions in the point cloud data to generate the top view map image. Alternatively, a mesh image the surfaces of which are formed by applying polygons onto the points in the point cloud data generated by the point cloud data generator 260 may be generated. The top view map image is generated from the mesh image. The top view map image generator 261 may generate the mesh image, or the mesh image may be generated by a mesh image generator. Such a mesh image generator 262 which generates the mesh image is realized in the CPU 210 in the exemplary block diagram of FIG. 3.

Also, the top view map image generator 261 may generate a combined top view map image by combining two or more top view map images of two or more different areas of the measurement object WK which are captured by the photoreceptor 120. According to this, because a top view map image in a wider field of view can be obtained by combining two or more top view map images, it is possible to provide users with a user-friendly environment in operations such as measurement area definition.

In this case, the top view map image generator 261 can accept definition of a location relative to the top view map image displayed on a top view map image display area to which an additional top view map image is added. In response to this definition, the top view map image generator 261 generates the additional top view map image of the defined location, and combines the top view map image or combined top view map image which has been generated and the additional top view map image to display a new combined top view map image in the top view map image display area. Accordingly, from the obtained top view map image, a top view map image corresponding to a part in which information on the measurement object WK is insufficient can be added based on users' instruction, and a top view map image suitable for measurement use or purpose can be is obtained.

Measurement Area Setting Part 264

The measurement area setting part 264 defines a measurement area on the top view map image which is displayed in the top view map image display area. The measurement area setting part 264 can select from among measurement area shapes shown in an GUI screen of FIG. 31 as discussed later. Alternatively, a measurement area shape is automatically determined based on the exterior shape area of a measurement object.

The height image acquisition part 228 produces a height image which includes height information based on two or more striped projection images. In addition, the point cloud data combiner 211 combines two or more sets of point cloud data generated by the point cloud data generator 260. Here, the point cloud refers to a set of data points in space which includes coordinates in a three-dimensional space (e.g., XYZ Cartesian coordinate system). Thus, the surface shape of a measurement object can be more precisely represented by superposing items of sets of point cloud data of the measurement object, which are generated at different positions of the stage, corresponding to the same coordinate in the three-dimensional space by using the point cloud data generator 211.

Image Inspection Part 216

The image inspection part 216 performs predetermined image inspections of an image of a measurement object WK which is captured by the measurer 100. This image inspection part 216 can include a gaging part 216*b* which performs predetermined measurement of a measurement object image. According to this construction, image inspection can be performed based on the measurement results which are measured by the gaging part 216*b*. Inspections such as determination of non-defective/defective can be performed based on the measurement results of lengths and angles of predetermined parts of the measurement object WK, for example. In the measurement by the gaging part 216*b*, a profile graph can be displayed on the display 400 by calculating contour lines which pass through a profile line selected in the texture image and are taken by a flat plane perpendicular to the screen, or a radius of a circle, a length of a straight line and the like can be calculated by extracting the circle, straight line and the like from the contour lines shown in the profile graph.

As discussed above, the CPU 210 solely serves as different parts for realizing various functions. However, needless to say, the present invention is not limited to the construction in which one member solely serves as different parts but two or more members which serve as their corresponding parts or realize their corresponding functions may be provided, or two or more members to which the parts or functions to be realized are assigned one by one may be individually provided.

Display 400

The display 400 is a member which displays a striped projection image obtained by the measurer 100, a height image generated by the height image acquisition part 228 based on the striped projection image, or a texture image captured by the measurer 100. The display 400 is constructed of an LCD panel or organic electroluminescence (electroluminescence) panel, for example. Also, the display can serves as the console in the case in which the display includes a touch panel.

In addition, the display 400 displays a top view map image which is generated by the top view map image generator 261. To this end, the display 400 has the top view map image display area which displays the top view map image (discussed later in more detail with reference to FIG. 31, etc.).

Stage 140

Two directions which perpendicularly intersect each other in a flat plane on the stage 140 where the measurement object WK is placed (hereinafter, referred to as "placement surface") are defined as the X and Y directions which are shown by arrows X and Y in FIG. 2, respectively. A direction which perpendicularly intersects the placement surface 142 of the stage 140 is defined as the Z direction, and is shown by an arrow Z. A rotational direction (angular coordinate) which rotates about an axis parallel to the Z direction is defined as a θ direction, and is shown by an arrow θ.

The stage 140 includes the translation stage part 141 and the rotation stage part 143. The translation stage part 141 includes an X-direction movement mechanism and a Y-direction movement mechanism. The rotation stage part 143 includes a θ-direction rotation mechanism. The stage 140 is constructed of the translation stage part 141 and the rotation stage part 143. In addition, the stage 140 may include a fastening member (clamp) which fastens a measurement object WK to the placement surface 142. Also, the stage 140 may include a tilt stage which includes a tiltable mechanism which can rotate about an axis parallel to the placement surface 142.

Here, as shown in FIG. 2, the relative positional relationship between the photoreceptor 120, the illuminator 110, and the stage 140 is defined so that the center axes of the right and left illuminators 110, and the center axis of the photoreceptor 120 intersect each other at a point in which a proper position of the measurement object WK on the stage 140, and a proper depth of field of the illuminator 110 and the photoreceptor 120 are provided. In addition, the center rotation axis of the θ direction agrees with the center axis of the photoreceptor 120 so that the measurement object WK can be rotated about the rotation axis within a field of view without getting out of the field of view when the stage 140 rotates in the θ direction. It is noted that, because the measurer 100 includes its arrangement which is rotated about the X direction in the paper plane in FIG. 2, the optical axis of the photoreceptor 120 and the top surface normal of the stage 140 (Z direction) do not necessarily agree each other.

Light Source 300

The light source 300 includes a control circuit board 310 and an observation illumination light source 320. A CPU (not shown) is mounted on the control circuit board 310. The CPU in the control circuit board 310 controls the illuminator 110, the photoreceptor 120, and the measurement controller 150 based on instructions from the CPU 210 in the controller 200. It is noted that this construction is illustrative, and other construction may be used. For example, the illuminator 110 and the photoreceptor 120 may be controlled by the measurement controller 150, or the illuminator 110 and the photoreceptor 120 are controlled by the controller 200 so that the control circuit board can be omitted. Alternatively, a power supply circuit for driving the measurer 100 may be arranged in the light source 300.

Observation Illumination Light Source 320

The observation illumination light source 320 includes three colors of LEDs which emit red light, green light, and blue light, for example. Any color of light can be can be produced by the observation illumination light source 320 by controlling luminance of light emitted by the LEDs. Illumination light IL which is produced by the observation illumination light source 320 is emitted by the illumination light emitter 130 of the measurer 100 through a light guiding member (light guide). It is noted that suitable light sources other than LEDs such as semiconductor laser (LD), halogen light, and HID can be used for the observation illumination light source. In particular, in the case in which a device capable of capturing color images is used as the image pickup device, a white light source can be used for the observation illumination light source.

The illumination light IL emitted from the illumination light emitter 130 is switched between red light, green light, and blue light when a measurement object WK is illuminated separately with these colors of light at different timing. Accordingly, a texture image can be generated by combining images which are captured when the measurement object WK is illuminated separately with RGB colors of light so that a color texture image is obtained and displayed on the display 400.

The illumination light emitter 130 in FIG. 2 has a ring shape, and is arranged above the stage 140 to surround the photoreceptor 120. According to this arrangement, the illumination light emitter 130 illuminates the measurement object WK with illumination light in a ring shape without shadow appearance.

Also, in addition to such ring illumination, the illumination light emitter 130 can additionally include transmitted illumination and coaxial vertical light illumination. In the embodiment shown in FIG. 2, a transmitted illumination part is provided in the stage 140. The transmitted illumination part illuminates the measurement object WK with light from a lower part of the stage 140. To achieve this, the stage 140 includes a transmitted illumination light source, a reflecting plate, and an illumination lens system.

It is noted that the ring illumination and transmitted illumination may be suitably omitted. If they are omitted, two-dimensional images can be captured by using the illumination for three-dimensional measurement (i.e., the illuminator).

In the embodiment shown in FIG. 1, the observation illumination light source 320 is not included in the body case 101, but the observation illumination light source 320 is provided in the light source 300 added externally to the measurer 100. According to this arrangement, the quality of illumination light provided from the observation illumination light source 320 can be easily improved. For example, because the RGB LEDs which are included in the observation illumination light source 320 have different light distribution characteristics from each other, lighting color unevenness will occur in the field of view if the different light distribution characteristics are not treated when RGB texture images are captured by the monochromatic image pickup device 121a. To address this, optical systems desiccated to their corresponding LED adjusted to its light distribution characteristics are provided and combined with each other so that the light distribution characteristic difference is accommodated, and uniform white illumination without color unevenness is produced and then guided to the measurer 100.

Also, adverse influence of heat generated by the observation illumination light source 320 on the optical system of the measurer 100 can be prevented. That is, if a heat source is located near members of the optical system, thermal expansion may affect their dimensions and reduce measurement accuracy, but because the observation illumination light source which is a heating source is arranged outside the body case 101 such a problem resulting from the heat generated by observation illumination light source can be avoided. In addition, as a result, there is an advantage that a high-output light source which will generate a large amount of heat can be used for the observation illumination light source.

The measuring light source 111 of each of the illuminators 110A and 110B is a blue LED (light emitting diode), for example. The measuring light sources 111 may be other light source such as halogen lamp. Light which is emitted by the measuring light source 111 (hereinafter, referred to as measuring light) is properly condensed by the lens 113 and then enters the pattern generator 112.

The pattern generator 112 is a DMD (digital micro mirror device), for example. The pattern generator 112 may be an LCD (liquid crystal display), LCOS (Liquid Crystal on Silicon: reflective liquid crystal element), or mask. The measuring light which enters the pattern generator 112 is converted into a predetermined pattern and predetermined intensity (brightness) and emitted from the pattern generator 112. The measuring light which is emitted from the pattern generator 112 is converted into light having a larger diameter than the dimensions of the measurement object WK by the lens 114, and then incident on the measurement object WK on the stage 140.

The measuring light source 111, the lens 113, and the pattern generator 112 of the illuminator 110A are aligned with each other substantially parallel to the optical axis of the photoreceptor 120. Similarly, the measuring light source 111, the lens 113, and the pattern generator 112 of the illuminator 110B are aligned with each other substantially parallel to the optical axis of the photoreceptor 120. On the other hand, the lenses 114 of the illuminators 110A and 110B are offset relative to the measuring light source 111, the lens 113, and the pattern generator 112. According to this arrangement, the optical axes of the illuminators 110A and 110B are inclined with respect to the optical axis of the photoreceptor 120 so that measuring light is emitted toward the measurement object WK from the both sides of the photoreceptor 120.

In this embodiment, in order to provide a wide illumination area of the measuring light, the illuminators 110A and 110B are constructed to have a certain angle of view. The angle of view of the illuminators 110A and 110B is defined by the dimensions of the pattern generator 112 and the focal length of the lens 114, for example. In the case in which a wide illumination area of the measuring light is not required, a telecentric optical system which has an angle of view substantially zero degree may be used for the illuminators 110A and 110B.

Measuring light which is reflected upward of the stage 140 by the measurement object WK is condensed to form an image by the lens 122 of the photoreceptor 120, and is received by the image pickup device 121a of the camera 121.

In this embodiment, in order to provide a wide imaging visual field of the photoreceptor 120, the photoreceptor 120 is constructed to have a certain angle of view. In this embodiment, the imaging visual field of the photoreceptor 120 refers to the spatial area whose image can be captured by the photoreceptor 120. The angle of view of the photoreceptor 120 is defined by the dimensions of the image pickup device 121a and the focal length of the lens 122, for example. In the case in which a wide field of view is not required, a telecentric optical system may be used for the photoreceptor 120. Here, the lenses 122 of two photoreceptors 120 which are included in the measurer 100 have a different scaling factor. In this case, images of the measurement object WK can be captured by two scaling factors different from each other by selectively using the two photoreceptors 120. The two photoreceptors 120 are preferably to be arranged so that the optical axes of the two photoreceptors 120 are parallel to each other.

The camera 121 is a CCD (charge-coupled device) camera, for example. The image sensor 121a is a monochromatic CCD (charge-coupled device), for example. The image pickup devices 121a may be other image pickup device such as CMOS (complementary metal-oxide semiconductor) image sensor. The pixels of the image pickup device 121a provide analog electric signals corresponding to amounts of their received light (hereinafter, referred to as light-reception signals) to the control circuit board 150.

Dissimilar to color CCDs, monochromatic CCDs do not necessarily include pixels that receive light of red wavelength, pixels that receive light of green wavelength, and pixels that receive light of blue wavelength. Here, in the case in which a particular wavelength such as blue wavelength is used, color CCDs can use only pixels that receive light of the particular wavelength, but monochromatic CCDs do not have such a restriction. For this reason, monochromatic CCDs have measurement resolution higher than color CCDs. Also, dissimilar to color CCDs, monochromatic CCDs do not necessarily include color filters provided for pixels. For this reason, monochromatic CCDs have sensitivity higher than color CCDs. Therefore, later-discussed point cloud data can be obtained with high accuracy. For these reasons, a monochromatic CCD is provided for the camera 121 in this embodiment.

In this embodiment, the illumination light emitter 130 separately emits light of red wavelength, light of green wavelength, and light of blue wavelength toward the measurement object WK at different timing. According to this construction, color images of the measurement object WK can be captured by the photoreceptor 120 which uses such a monochromatic CCD.

On the other hand, in the case in which a color CCD has sufficient resolution and sensitivity, the image pickup device 121a may be such a color CCD. In this case, the illumination light emitter 130 does not necessarily separately illuminate the measurement object WK with light of red wavelength, light of green wavelength, and light of blue wavelength toward at different timing but illuminate the measurement object WK with white light. Accordingly, the illumination light source 320 can have a simple structure.

Figure 4:
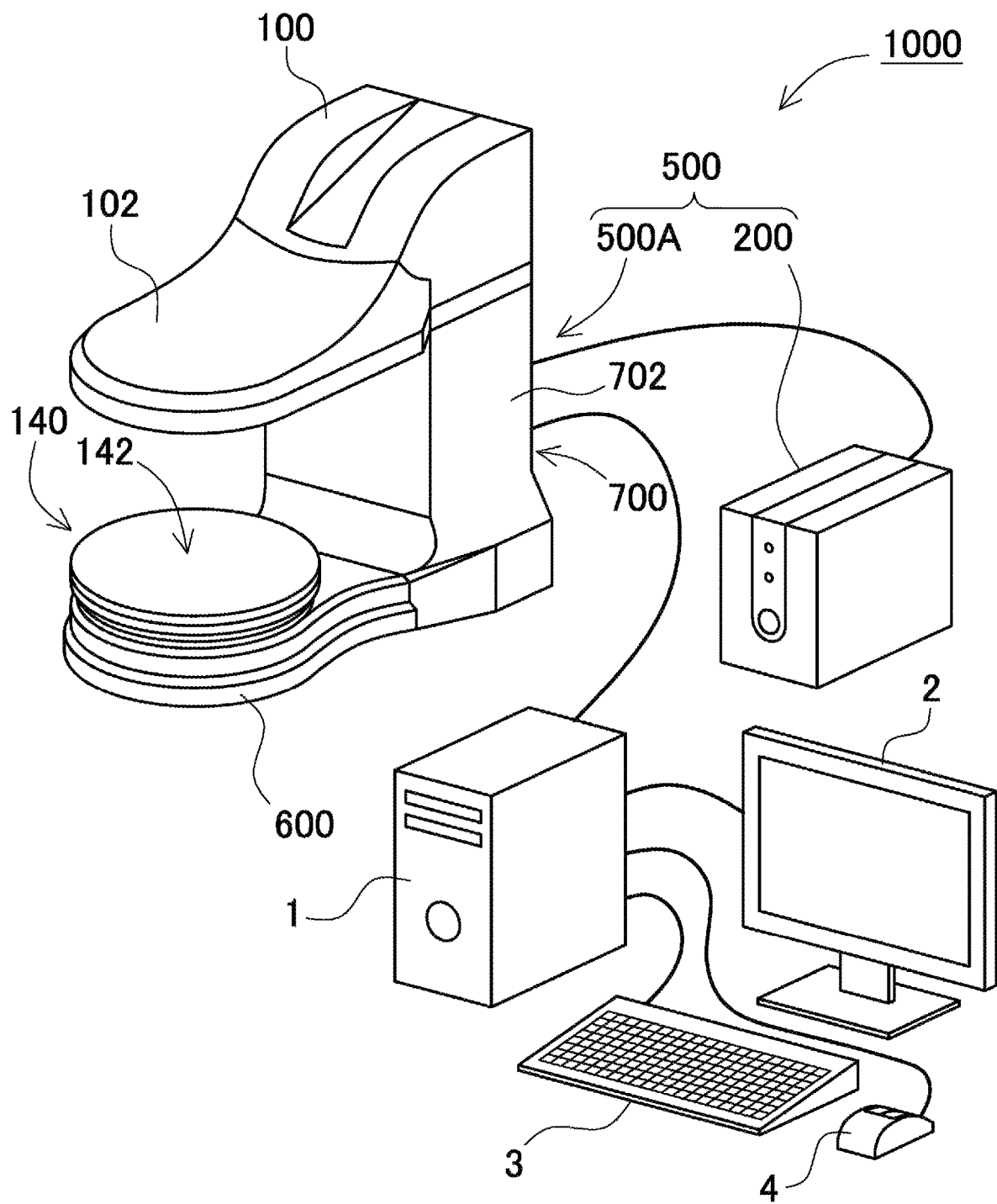
FIG. 4 is a block diagram showing a three-dimensional shape measurement system.

FIG. 4 shows a three-dimensional shape measurement system 1000 which includes a three-dimensional shape measuring apparatus 500 according to the first embodiment. In this illustrated three-dimensional shape measurement system 1000, a PC 1 used for control, a monitor 2, a keyboard 3, and a input device 4 (e.g., mouse) are connected to the three-dimensional shape measuring apparatus 500 which is constructed of a three-dimensional shape measuring apparatus main body 500A and the controller 200. A three-dimensional shape measuring program for executing three-dimensional shape measurement by using the three-dimensional shape measuring apparatus 500 is installed in the control PC 1. Users can instruct settings and execution (e.g., image capture, measurement, etc.) of the three-dimensional shape measuring apparatus 500 by using the three-dimensional shape measuring program.

It is noted that, although the controller 200 is provided separately from the three-dimensional shape measuring apparatus main body 500A in the embodiment shown in FIG. 4, the controller may be integrally constructed with the three-dimensional shape measuring apparatus main body side. Alternatively, the function of the controller may be included in the control PC.

Figure 5:
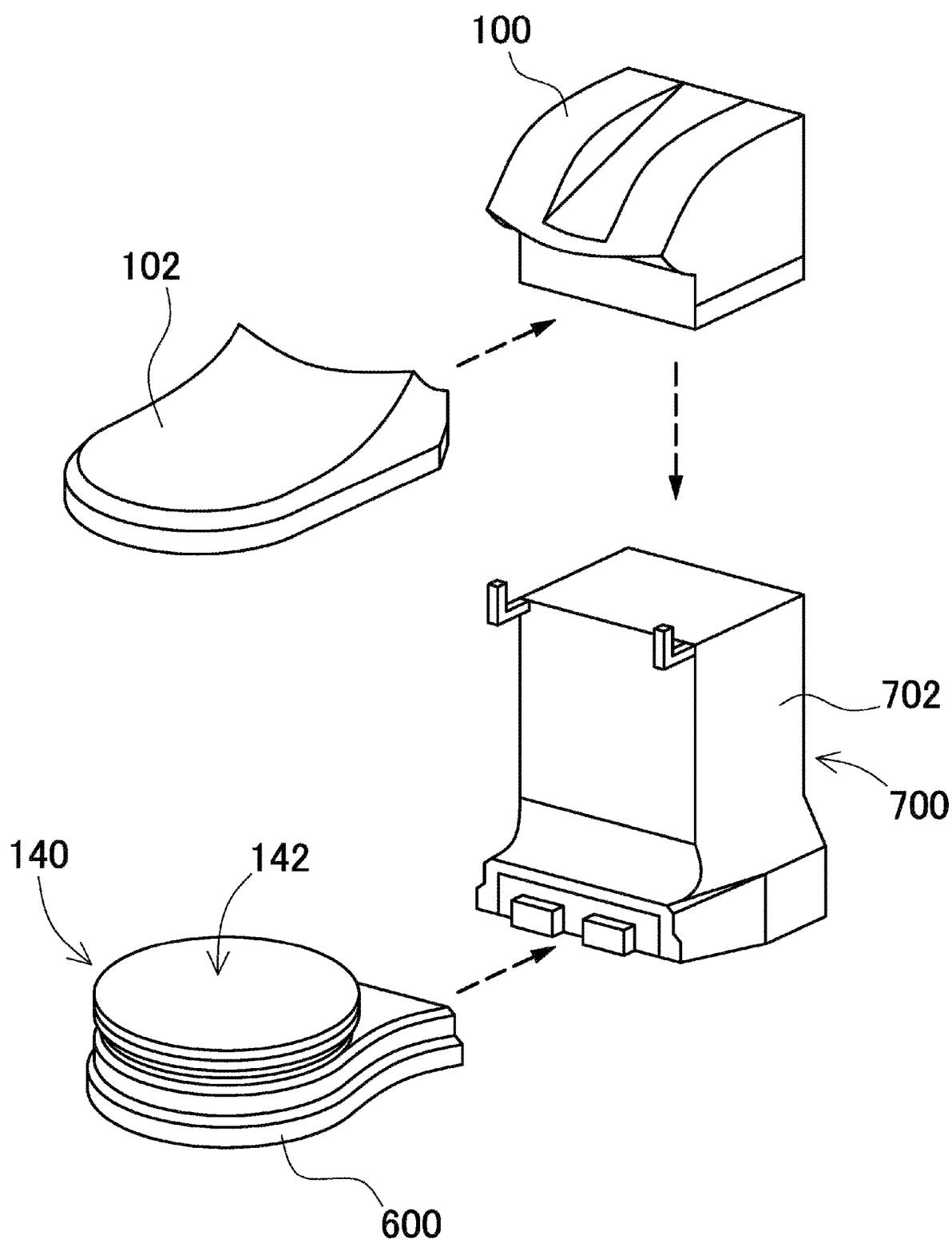
FIG. 5 is an exploded perspective view of a main body of the three-dimensional shape measuring apparatus shown in FIG. 4.

The three-dimensional shape measuring apparatus 500 includes the measurer 100, a support 700, the mount 600, and a light-shielding cover 102. The measurer 100, the support 700, the mount 600, and the light-shielding cover 102 are constructed as detachable units as shown in an exploded perspective view of FIG. 5. According to this construction, these members are advantageous in terms of ease of maintenance and portability. The light-shielding cover 102 extends frontward of the photoreceptor 120 and the illuminator 110 to cover them, and is held above the placement surface 142 in an orientation spaced away from the placement surface 142 to intercept external light from the measurement area above the placement surface 142. The light-shielding cover 102 can be detached depending on a measurement object, and the basic minimum configuration for measurement is a combination of the measurer 100 and the mount 600.

The mount 600 includes the stage 140. This stage 140 includes the rotation stage part 143 for rotating the placement surface 142 on which the measurement object is placed as discussed above, and the translation stage part 141 for translating the placement surface 142. Here, the stage 140 is constructed of an XYθ stage which includes an XY stage as the translation stage part 141 mounted on the upper surface of a θ stage as the rotation stage part 143.

The mount 600 holds the measurer 100 in a vertical orientation through the support 700. In addition, the measurer 100 fixedly holds the illuminator 110 and the photoreceptor 120 in inclined orientations in which their optical axes are inclined with respect to the placement surface 142. To this end, the measurer 100 includes a fixer 125 which fixes the illuminator 110 and the photoreceptor 120. The fixer 125 is supported by a support stand 702 in an orientation in which the fixer 125 is spaced away from the mount 600 as discussed later with reference to FIG. 7. In addition, the fixer fixes the illuminator 110 and the photoreceptor 120 in inclined orientations in which their optical axes are inclined with respect to the placement surface 142. According to this arrangement, the measurement area to be measured with the measuring light is defined above the stage 140. In addition, the optical system such as the illuminator 110 and photoreceptor 120 is held in an orientation in which they face the measurement area obliquely downward.

The support 700 couples the mount 600 and the measurer 100 to each other. The measurer 100 is held by the support 700, and arranged above the stage 140. The measurer 100 includes the illuminator 110 and the photoreceptor 120 as an observation optical system as discussed above. The measurer 100 is held with respect to the placement surface 142 of the stage 140, which is arranged in the mount 600, not vertically above the placement surface 142 but in an orientation in which the measurer 100 faces the placement surface 142 obliquely downward. According to this arrangement, there is an advantage that the shapes of upper and side surfaces of the measurement object can easily obtained by a single measurement operation. In particular, to acquire height-directional information, the information on the side surfaces which have large height difference in the measurement object is useful. On the other hand, it is difficult to grasp the entire shape of the measurement object based on only the side surfaces. For this reason, in order that the measurer 100 is brought in an orientation in which the measurer 100 can see the measurement object from a point which is located obliquely above the measurement object so that both the upper surface which can provide easy grasp of the entire exterior shape and the side surfaces which can provide easy grasp of height information can be obtained by a single measurement operation, it is useful to hold the measurer 100 in an orientation in which the measurer 100 is inclined with respect to the placement surface 142. In the embodiment shown in a side view of FIG. 6, the measurer 100 is held an inclined orientation in which the optical axes of the illuminator 110 and the photoreceptor 120 of the measurer 100 form an angle of approximately 45° with respect to the placement surface 142 of the XYθ stage. According to this arrangement, the measurer 100 is coupled to the mount 600 by the support 700 to maintain a bird's eye view of the measurement object at 45°. As a result, the measurer 100 constantly sees the placement surface 142 at a fixed angle from a fixed position, and the positional relationship between the three axes of XYθ as the driving axes of the placement surface 142 and the observation optical system is kept fixed.

Figure 7:
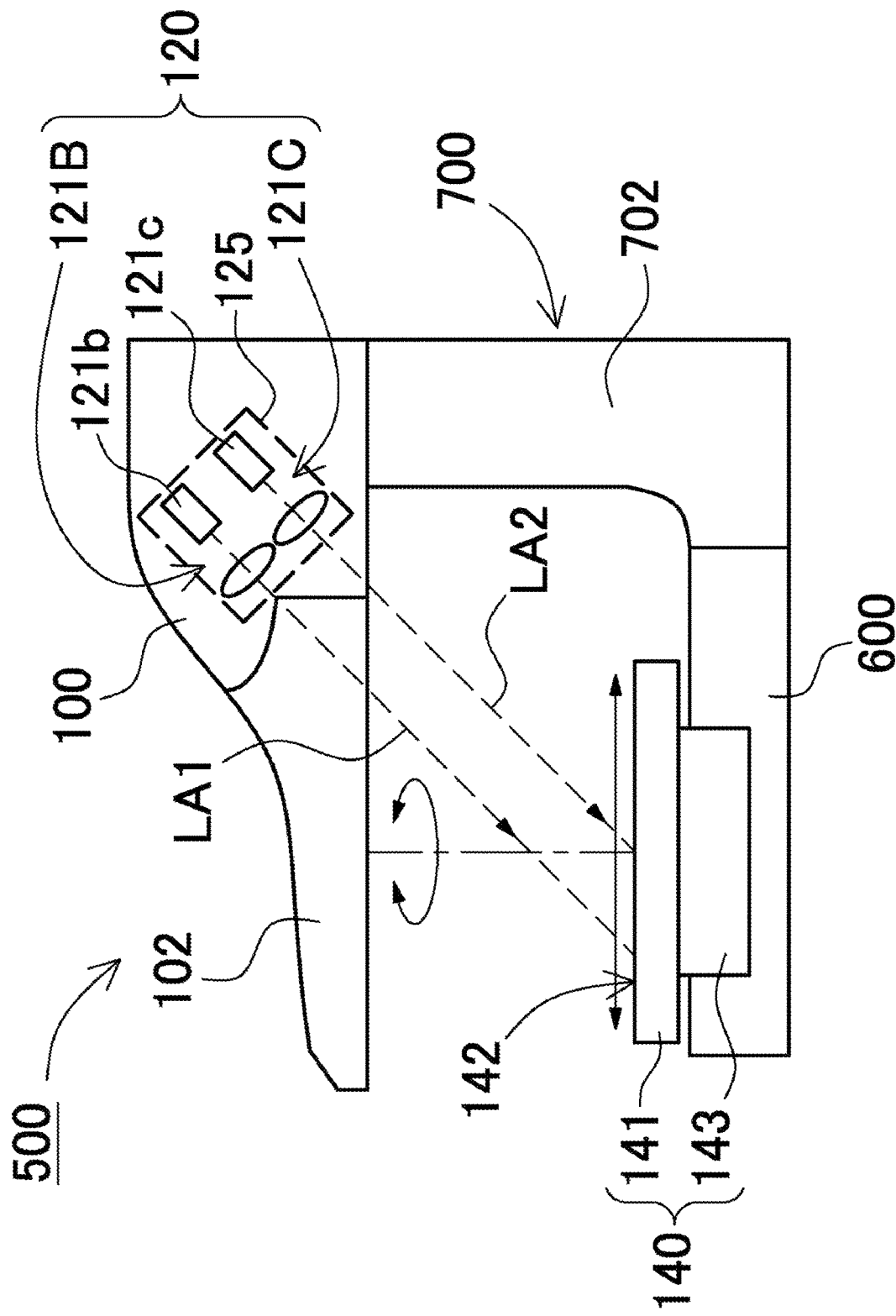
FIG. 7 is a side view of the three-dimensional shape measuring apparatus which includes a plurality of photoreceptors having a scaling factor different from each other.

The photoreceptor 120 may include two or more optical systems having a different scaling factor. Such an exemplary photoreceptor is shown in FIG. 7. In this example, the photoreceptor 120 includes a first optical system having a first scaling factor and a second optical system having a second scaling factor higher than the first scaling factor. According to this, because the optical systems having a different scaling factor, one of their corresponding fields of view can be selected in accordance with a size of a measurement object WK which is placed on the placement surface 142. In this example, first and second photo-receiving devices 121b and 121c which are optically connected to the first and second optical systems respectively are provided as photo-receiving devices. Hereinafter, the first optical system and the first photo-receiving device 121b are occasionally referred together to as a first camera 121B, and the second optical system and the second photo-receiving device 121c are occasionally referred together to as a second camera 121C. In the case in which two or more photo-receiving devices are prepared, and the photo-receiving devices independently capture images by using their own optical system, image-capturing processes for processing images captured by the optical systems can be performed in parallel so that the processing speed can be improved and optical coupling can be simplified. However, two or more optical systems may be optically coupled to a single photo-receiving device.

The first and second optical systems are arranged so that their optical axes are parallel to each other. First and second optical axes LA1 and LA2 of the first and second optical systems are both inclined approximately 45° with respect to the placement surface 142. Here, the second optical system having a higher scaling factor, that is, the second camera 121C is aligned with the first camera 121B as the first optical system, and arranged on the lower side of the first camera 121B in the fixer 125. According to this arrangement, because when the optical system is switched from the first optical system to the second optical system the viewpoint moves to the closer side of a measurement object WK, there is an advantage that users can relatively easily grasp the viewpoint change. More exactly, in the case in which a measurement object WK placed on the placement surface is large in the first optical system having a larger field of view (lower scaling factor), or on the other hand in the case in which a measurement object WK placed on the placement surface is small in the second optical system having a smaller field of view (higher scaling factor), the measurement object WK can be entirely included in their fields of view under the whole rotation of the measurement object WK in either case.

XYθ Stage

Figure 8:
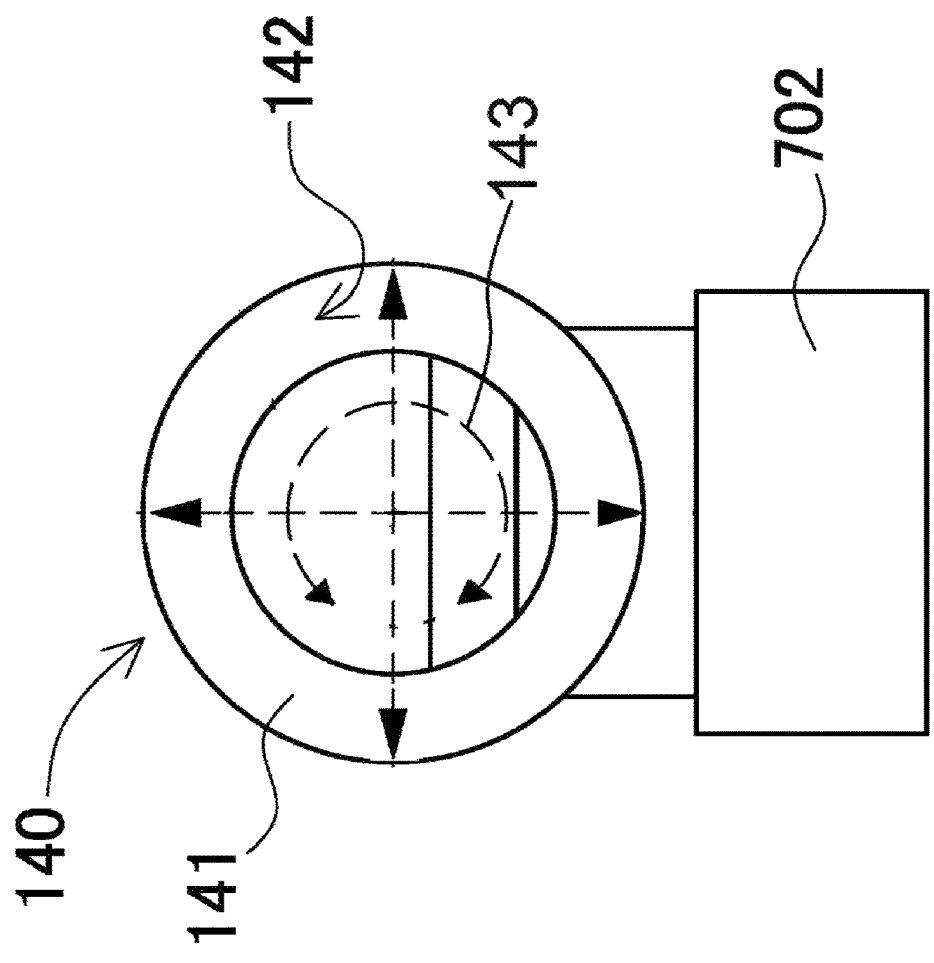
FIG. 8 is a plan view showing driving directions of a placement surface.
Figure 9:
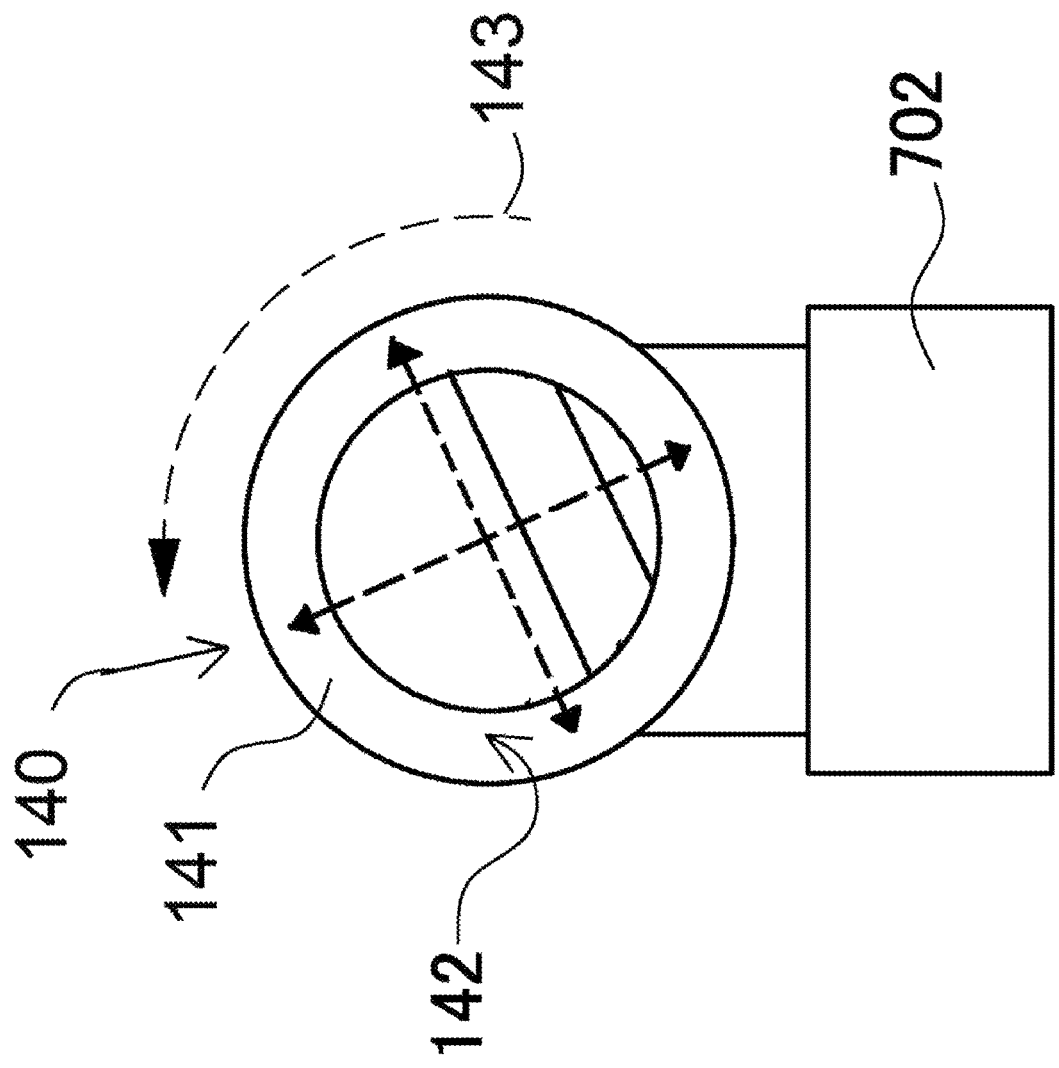
FIG. 9 is a plan view showing driving directions of the placement surface.

Exemplary configuration of the mount 600 is now described with reference to FIGS. 7 to 9. In the embodiment shown in FIG. 7, the XYθ stage includes the θ stage as the rotation stage part 143 which is fixed on the mount 600, and the XY stage as the translation stage part 141 which is placed on the θ stage. Also, the rotation stage part 143 is arranged so that its rotation axis intersects both the optical axes of the first and second optical systems at an angle of 45°. The translation stage part 141 placed on the rotation stage part 143 has a structure in which the XY driving axes rotate together with rotation of the rotation stage part 143 as shown in the plan views of FIGS. 8 and 9. According to this arrangement in which the translation stage part 141 is placed on the rotation stage part 143, the optical axis of the measurer 100 and the rotation axis of the rotation stage part 143 can easily have a fixed relationship in which they are mechanically secured to each other.

In addition, stage driving axes in the coordinate system in the observation space of the measurer 100 can be grasped by calibration of a moving direction of the translation stage part 141, and calibration of a rotational direction about the stage rotation axis when necessary.

(Wide Area Measurement Function by Translation Stage Part 141)

Figure 10B:
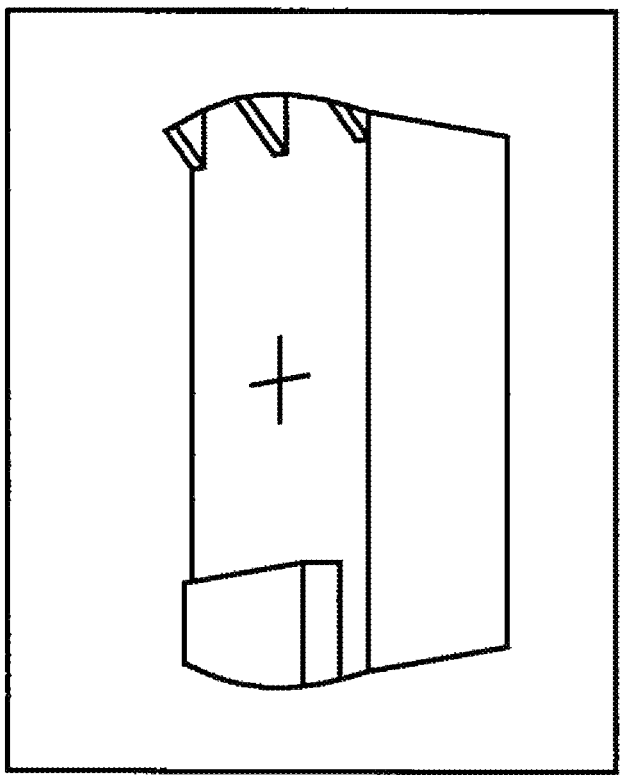
FIG. 10B is an image of single-view measurement data which is generated from the measurement object in FIG. 10A.
Figure 10A:
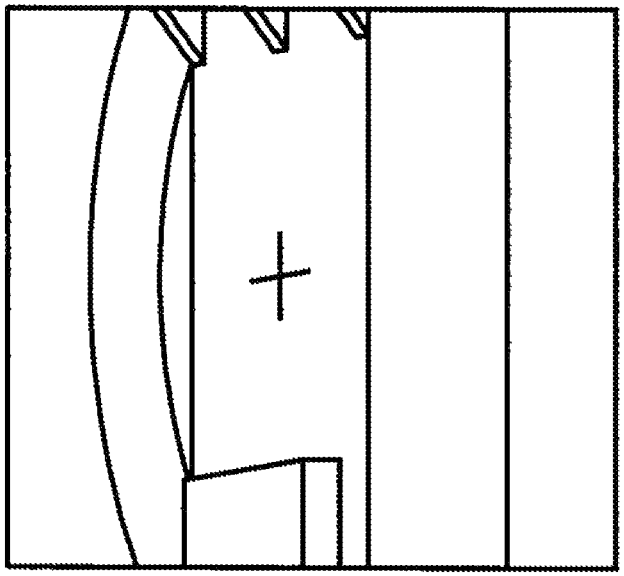
FIG. 10A is an observed image of a measurement object which is not entirely included in an observation visual field.

The three-dimensional shape measuring apparatus 500 according to this embodiment has a wide area measurement function which can entirely measure a measurement object by combining a two or more sets of measurement data which are obtained from different fields of view which are obtained by moving the measurement object even if the measurement object is too large to include it within a single measurable field of view. Here, exemplary wide area measurement in which the translation stage part 141 is used is described. For example, in the case in which a measurement object is large too large and partially lies off the observation visual field of the measurer 100 if the measurement object is measured as it is as shown in FIG. 10A, its entire shape cannot be measured, and as a result measurement data corresponding to only an area which is included in the field of view is provided as shown in FIG. 10B. To address this, in this embodiment, the translation stage part 141 is used to translate the measurement object relative to the observation visual field to entirely measure the measurement object even in such a case so that two or more sets of measurement data are obtained to measure even such a measurement object which has a size exceeding the available observation visual field, and as a result the wide area measurement can be provided by combining the two or more sets of measurement data.

Figure 11A:
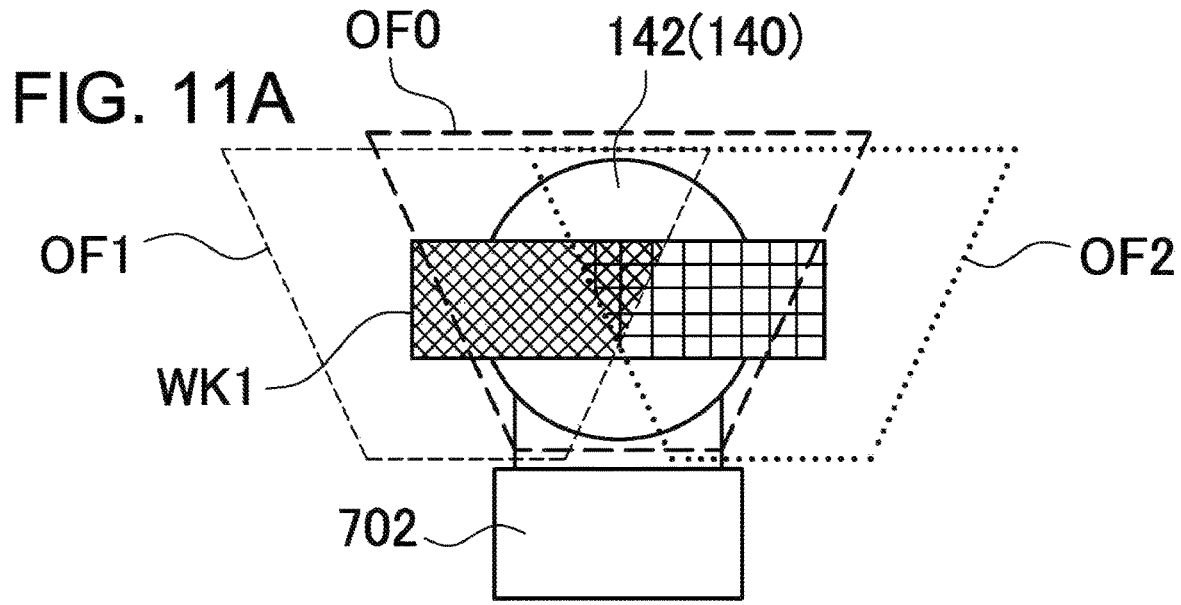

In the case in which a wide measurement object WK1 is placed in the placement surface 142 and partially extends off the observation visual field as discussed above as shown in the image of FIG. 10A and the schematic plan view of FIG. 11A, procedure which performs wide area measurement to be able to measure an entire shape of the measurement object WK1 is now described with reference to schematic plan views of FIGS. 11A to 11C, and images of FIGS. 12A to 12E. In FIG. 11A, a thick dashed line shows an observation visual field OF0 at a reference position (original position) of the translation stage part 141, a thin dashed line shows an observation visual field OF1 at a position in which the translation stage part 141 is moved rightward, and a dotted line shows an observation visual field OF2 at a position in which the translation stage part 141 is moved leftward. The observation visual field looks to move in an opposite direction relative to the movement of the translation stage part 141.

Figure 11B:
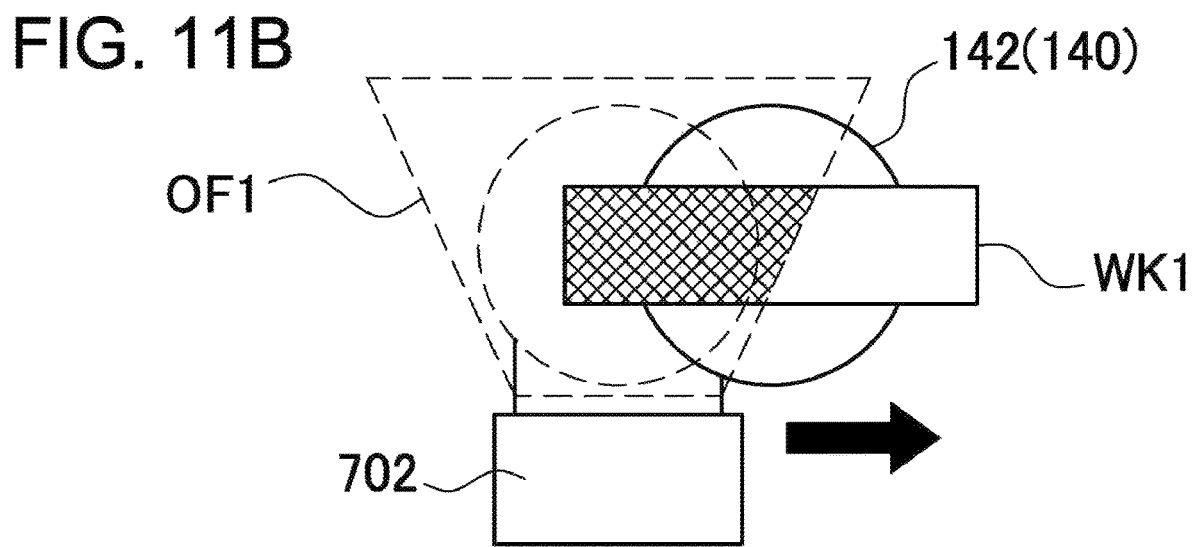
FIG. 11B is a schematic plan view of the translation stage part which is translated rightward from the position shown FIG. 11A.
Figure 11C:
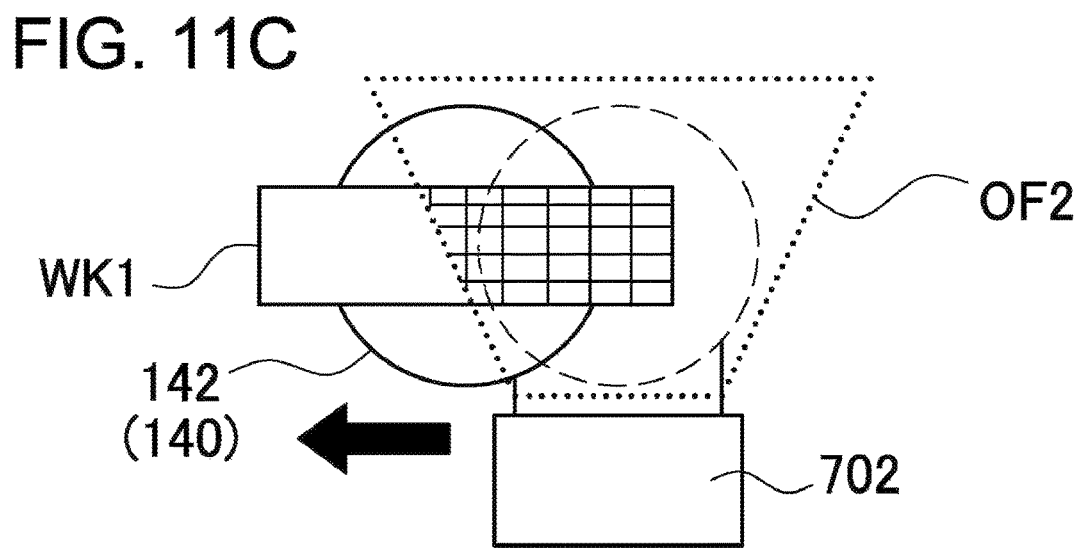
FIG. 11C is a schematic plan view of the translation stage part which is translated leftward from the position shown FIG. 11B.
Figure 12E:
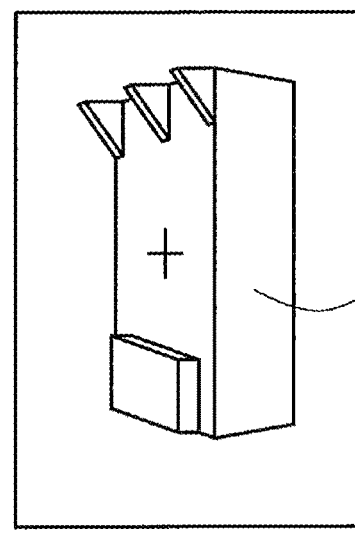
FIG. 12E is a combined image which is obtained by combining FIGS. 12B and 12D.

Firstly, as shown in FIG. 11B, the translation stage part 141 is moved rightward of the observation visual field from the position shown in FIG. 11A so that a left half of the measurement object WK1 is included in the observation visual field. In FIG. 11B, the observation visual field OF1 is shown by an inverted isosceles trapezoid shape defined by a dashed line. An observed image captured at this position is shown in FIG. 12A.

Figure 12B:
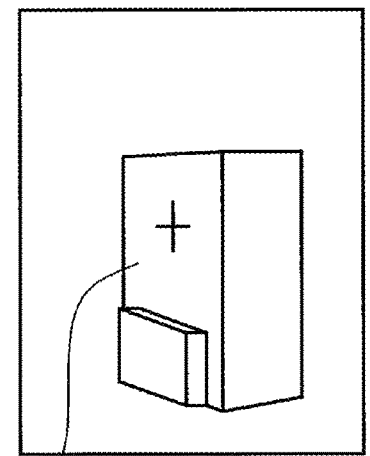
FIG. 12B is an image of single-view measurement data A which is generated from the measurement object in FIG. 12A.

Subsequently, three-dimensional measurement is executed at this position, and single-view measurement data SI1 shown in FIG. 12B is obtained. The single view measurement data SI1 may be displayed on the display 400 as shown in FIG. 12B so that users can visually grasp the obtained three-dimensional shape. Alternatively, only a combined image which is finally obtained may be displayed on the display without displaying such intermediate single-view measurement data on the display.

In addition, as shown in FIG. 11B, the translation stage part 141 is moved leftward of the observation visual field so that a right half of the measurement object WK1 is included in the observation visual field OF2. An observed image captured at this position is shown in FIG. 12C.

Figure 12D:
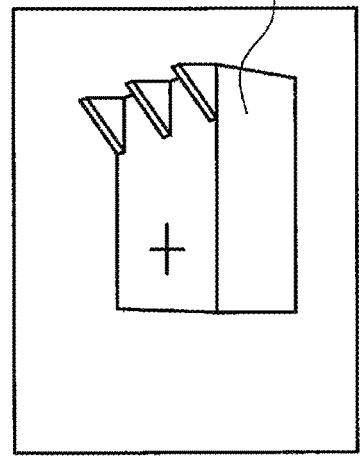
FIG. 12D is an image of single-view measurement data B which is generated from the measurement object in FIG. 12C.
Figure 12A:
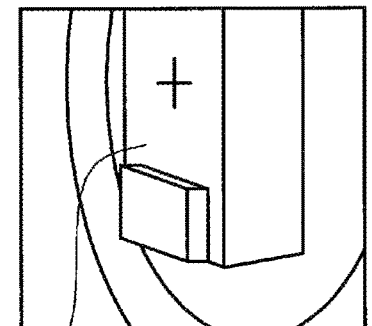
FIG. 12A is an observed image of a left-half part of a measurement object.
Figure 12C:
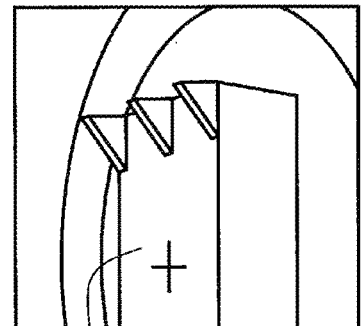
FIG. 12C is an observed image of a right-half part of the measurement object.

Subsequently, three-dimensional measurement is executed at this position, and single-view measurement data SI2 shown in FIG. 12D is obtained. Also, the single view measurement data SI2 may be displayed on the display 400 as shown in FIG. 12D, or may not be displayed as discussed above.

Finally, sets of single view measurement data SI1 and SI2 are automatically arranged in the measurement space coordinate system based on the moving strokes and moving directions of the translation stage part 141, and a combined image CI1 shown in FIG. 12E is generated by combining these sets of single view measurement data and displayed on the display 400. As a result, even in the case in which a measurement object WK1 is too large to be included in the observation visual field, an entire three-dimensional shape of the measurement object WK1 can be measured by combining sets of single view measurement data SI1 and SI2 which are obtained in two or more image capture operations.

In this exemplary wide area measurement, the observation visual fields OF1 and OF2 are defined by dividing the measurement object WK1 into two (right and left) halves as shown in FIG. 11A and capturing images of the two halves, and the entire image is obtained by total two image capture operations. However, needless to say, the entire image can be obtained by similarly separately capturing images of three divided parts of the measurement object and combining these captured images.

It has been described that the entire image of the measurement object WK1 is created by combining images which are captured before and after translational movement by using only the translation stage part 141 in the aforementioned wide area measurement. This wide area measurement can be provided by a three-dimensional shape measuring apparatus which includes only the translation stage part 141 on the stage 140. On the other hand, the three-dimensional shape measuring apparatus according to this embodiment can include the rotation stage part 143 in addition to the translation stage part 141 as discussed above. Accordingly, a shape of the measurement object on its back surface side can be obtained by rotating the rotation stage part 143. In this structure, when the aforementioned wide area measurement function is executed by the translation stage part 141, the rotation stage part 143 is kept at its original position.

Figure 13A:
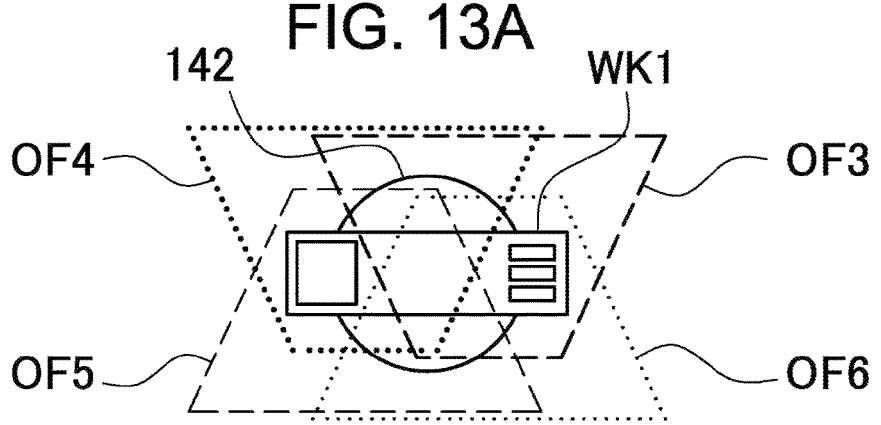
FIG. 13A is a schematic plan view showing a relationship between the placement surface and the observation visual field.

Subsequently, in the three-dimensional shape measuring apparatus which includes the rotation stage part 143 and the translation stage part 141, a wide area measurement function which uses a combination of the rotation stage part 143 and the translation stage part 141 will be described with reference to schematic plan views shown in FIGS. 13A to 13C, and images shown in FIGS. 14A to 14I. In FIG. 13A, a thick dashed line shows an observation visual field OF3 at a position in which the translation stage part 141 is moved leftward (FIG. 13B), a thick dotted line shows an observation visual field OF4 at a position in which the translation stage part 141 is moved rightward (FIG. 13C) from the position shown in FIG. 13B, a thin dashed line shows an observation visual field OF5 at a position in which the rotation stage part 143 is rotated by 180° and then the translation stage part 141 is moved leftward (FIG. 13D) from the position shown in FIG. 13C, and a thin dotted line shows an observation visual field OF6 at a position in which the translation stage part 141 is moved rightward (FIG. 13E) from the position shown in FIG. 13D.

(Wide Area Measurement Function by Combination of Rotation Stage Part 143 and Translation Stage Part 141)

Figure 13B:
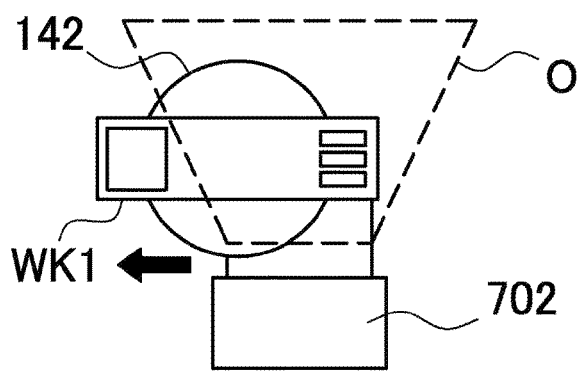
FIG. 13B is a schematic plan view of the translation stage part which is moved leftward.

Firstly, as shown in FIG. 13B, the translation stage part 141 is moved leftward of the observation visual field from the position shown in FIG. 13A so that a right side of the measurement object WK1 is included in the observation visual field OF3. An observed image OI3 captured at this position is shown in FIG. 14A.

Subsequently, three-dimensional measurement is executed at this position, and single-view measurement data SI3 shown in FIG. 14B is obtained. The single view measurement data SI3 may be also displayed on the display 400 as shown in FIG. 14B, or may not be displayed as discussed above.

Figure 13C:
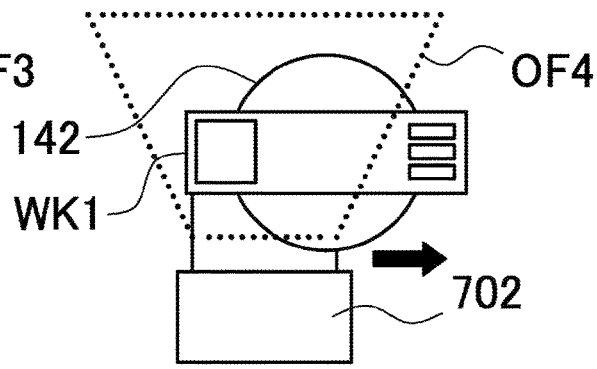
FIG. 13C is a schematic plan view of the translation stage part which is moved rightward.

Subsequently, as shown in FIG. 13C, the translation stage part 141 is moved rightward of the observation visual field from the position shown in FIG. 13B so that a left side of the measurement object WK1 is included in the observation visual field. An observed image OI4 captured at this position is shown in FIG. 14C. Subsequently, three-dimensional measurement is executed at this position, and single-view measurement data SI4 shown in FIG. 12D is obtained.

In addition, the rotation stage part 143 is rotated by 180° so that a back surface side of the measurement object can be seen, and the translation stage part 141 is moved leftward again so that the right side of measurement object WK1 is included in the observation visual field OF5. An observed image OI5 which is obtained at this position is provided as single view measurement data SI5 shown in FIG. 14E. Subsequently, three-dimensional measurement is executed at this position, and single-view measurement data SI5 shown in FIG. 14F is obtained.

Figure 13D:
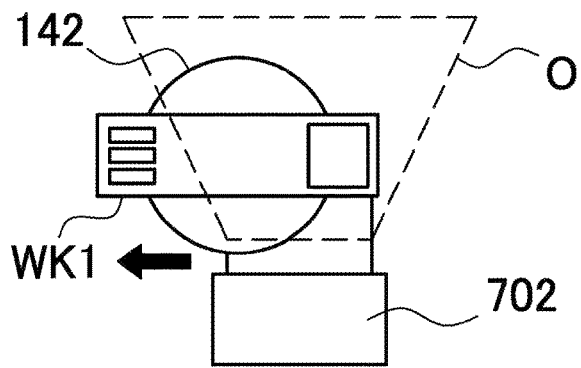
FIG. 13D is a schematic plan view of the translation stage part which is rotated 180° by a rotation stage part and is moved leftward.
Figure 13E:
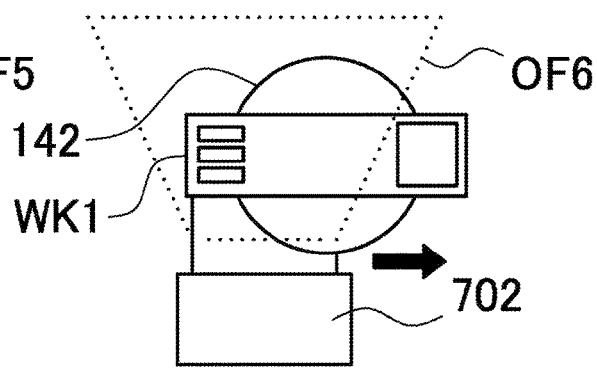
FIG. 13E is a schematic plan view of the translation stage part which is moved rightward from the position shown FIG. 13D.

Subsequently, as shown in FIG. 13E, the translation stage part 141 is moved rightward from the position shown in FIG. 13D so that the left side of the measurement object WK1 is included in the observation visual field OF6. An observed image OI6 captured at this position is shown in FIG. 14G. Subsequently, three-dimensional measurement is executed at this position, and single-view measurement data SI6 shown in FIG. 14H is obtained.

Finally, sets of single view measurement data SI3, SI4, SI5 and SI6 are automatically arranged in the measurement space coordinate system based on the moving strokes and moving directions of the translation stage part 141, and a combined image CI2 shown in FIG. 14I is generated by combining these sets of single view measurement data (i.e., FIGS. 14B, 14D, 14F and 14H) and displayed on the display 400. In this case, the combined image CI2 is a stereoscopic image formed of point cloud data, users can see the obtained shape data of the measurement object from their desired viewpoint by rotating the stereoscopic image by dragging a point on the combined image CI2 on the screen. As a result, even in the case in which a measurement object WK1 is too large to be included in the observation visual field, an entire three-dimensional shape of the measurement object WK1 can be measured by combining sets of single view measurement data SI3 and SI4 which are obtained in two or more image capture operations.

Although it has been illustratively described that the translation stage part 141 is moved in a left-and-right direction in these figures (X direction), the translation stage part 141 can be moved in a top-and-bottom direction in these figures (Y direction) or be moved in a slanting direction by a combination of the X and Y directions. Also, the rotation angle of the rotation stage part 143 is not limited to 180° but can be any angle (e.g., 90°, 45°, etc.). Moving directions of the translation stage part 141 can be suitably adjusted depending on a lengthwise direction of the measurement object, placement orientation of the measurement object on the placement surface 142, shape complexity of the measurement object, and the like.

Accordingly, wide area measurement is provided along any line of sight by rotating the stage part 143. Because users can correctly grasp moving directions of the translation stage part 141, even when the rotation stage part 143 has been rotated, users can understand to translate the translation stage part 141 leftward in the screen in order to obtain an image of the measurement object WK1 on its right side as shown in FIG. 14A, and to translate the translation stage part 141 rightward in the screen in order to obtain an image of the measurement object WK1 on its left side as shown in FIG. 14C, for example. In addition, the moving directions of the placement surface 142 are controlled through the movement controller 144. The movement controller 144 associates moving directions of the placement surface 142 and a position of the moved placement surface 142 (i.e., an observation visual field of the measurement object WK1 which is placed on the placement surface 142) with each other, and maintains the association. Also, because how to arrange sets of single-view measurement data which are obtained in observation visual fields in the measurement space can be determined by coordinate conversion calculation based on the movement distances, X and Y moving directions, and the rotated angle θ of the translation stage part 141, automatic arranging and combining processes can be realized.

It has been described that data is obtained in sight line directions in the foregoing embodiment. However, the present invention is not limited to this but the rotation stage part 143 may be rotated to a plurality of angular coordinates so that wide area measurement results which are obtained at the angular coordinates are superposed on each other, for example. In this case, even in the case of a large three-dimensional measurement object, because sets of measurement data can be obtained in any angle over 360° and superposed on each other, full 3D data can be measured in all the directions.

Also, in the aforementioned exemplary construction of the stage 140, it has been illustratively described that the translation stage part 141 is arranged on the upper surface of the rotation stage part 143. According to this arrangement, the rotation stage part 143 can be rotably mounted to the mount, and the translation stage part 141 can be rotated together with a measurement object which is placed on the upper surface of the translation stage part 141 by the rotation stage part 143. Because the measurement object and the translation stage part 141 are rotated together with each other as discussed above, the positional relationship between the measurement object and the translation stage part 141 can be kept fixed unless a placement orientation of the measurement object is not changed. As a result, three-dimensional measurement is executed on the same area of a measurement object in a plurality of different viewpoints where the rotation stage part 143 is rotated to different angular coordinates, which in turn can obtain averaged data at one point from sets of data which are obtained in the different viewpoints, the measurement object can be stably entirely measured, and therefore the measurement accuracy can be improved.

Figure 15:
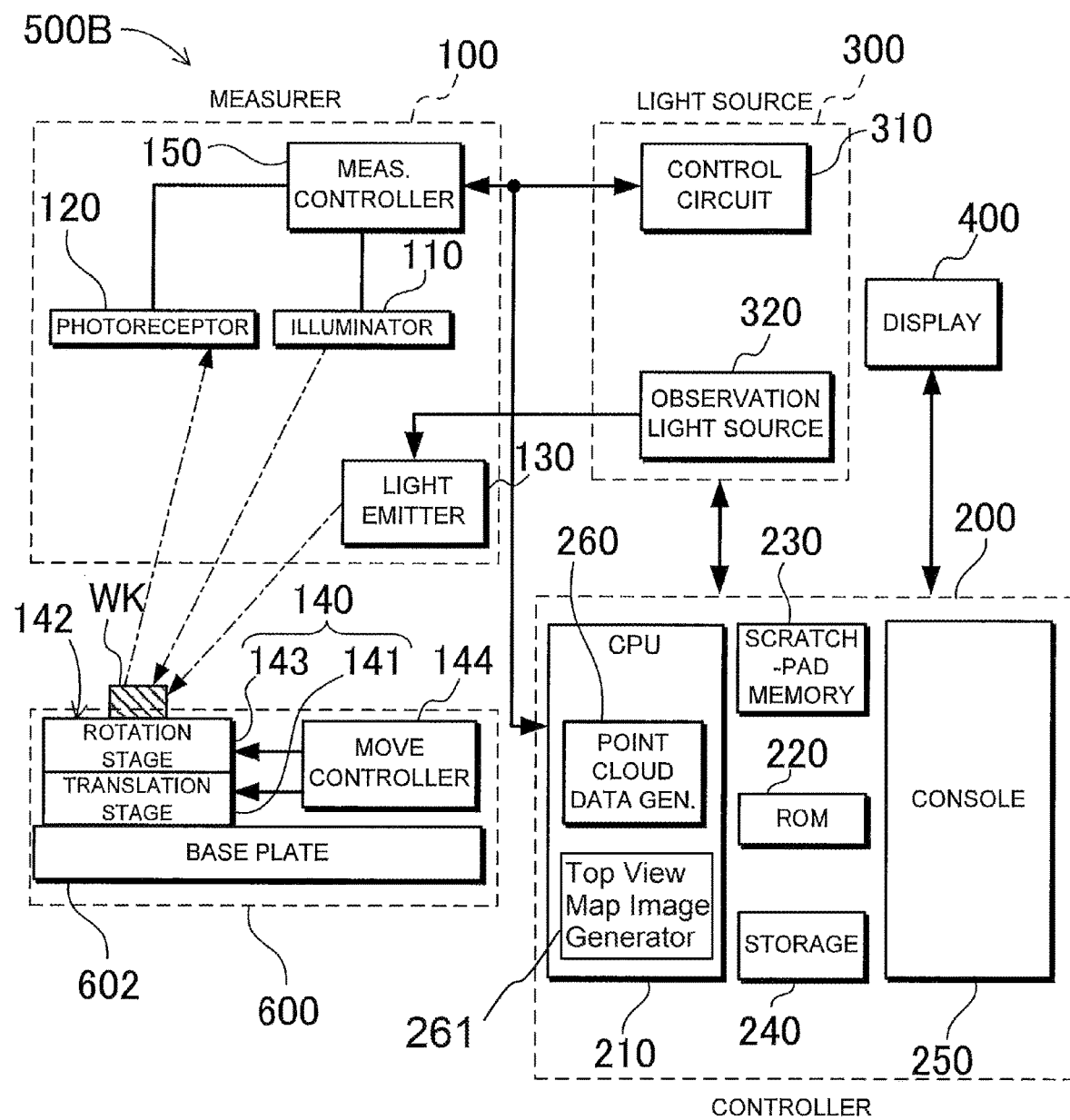
FIG. 15 is a block diagram showing a three-dimensional shape measuring apparatus according to a modified embodiment.

However, the stage 140 in the present invention is not limited to this arrangement, the rotation stage part 143 may be arranged on the upper surface of the translation stage part 141 as shown in a three-dimensional shape measuring apparatus 500B according to a modified embodiment shown in FIG. 15, for example. Also, according to this arrangement of the stage 140, all-directional full 3D data of a measurement object which partially extends off the observation visual field can be similarly obtained by similar measurement and superposition.

In addition, in the arrangement in which the rotation stage part 143 and the translation stage part 141 are provided together, to rotate the rotation stage part 143, it is preferable that the translation stage part 141 is returned to the predetermined reference position prior to rotation of the rotation stage part 143. In this case, it is possible to avoid increase of a rotation radius of the stage 140 on which a measurement object placed, and to avoid unintentional collision of the measurement object with other members. The reference position is defined by the original position of the XY plane on which the translation stage part 141 is moved, for example. Alternatively, the reference position may be defined by another particular coordinate position. Additionally, the rotation stage part 143 and the translation stage part 141 are not moved at the same time so that one of the stages is moved without moving another stage. In this case, collision detection and collision prevention can be easily provided, and as a result the safety can be improved.

Measurement for Obtaining Wide Area Shape and Front and Back Side Shapes

The three-dimensional shape apparatus according to this embodiment can obtain not only a surface shape of the measurement object which is seen from the front side but also the entire three-dimensional surface shape of the measurement object. To this end, in the three-dimensional shape measuring apparatus, the measurement is not limited to only a measurement operation in one sight line direction (single shot measurement) but can be obtained base on a combination of two or more measurement operations in two or more directions in which the orientation of the measurement object is changed by the rotation stage part 143 (multi-shot measurement). In particular, because measurement of the measurement object on the back surface side in which the rotation stage parts 143 is rotated 180° from the initial angular coordinate can measure the width dimensions of the three-dimensional object which cannot be measured in the single shot measurement, the back-surface-side measurement is useful. Also, the aforementioned wide area measurement can measure a wider entire three-dimensional shape of a measurement object by executing similar measurement using rotation operation.

Procedure Before Measurement Start

Figure 16:
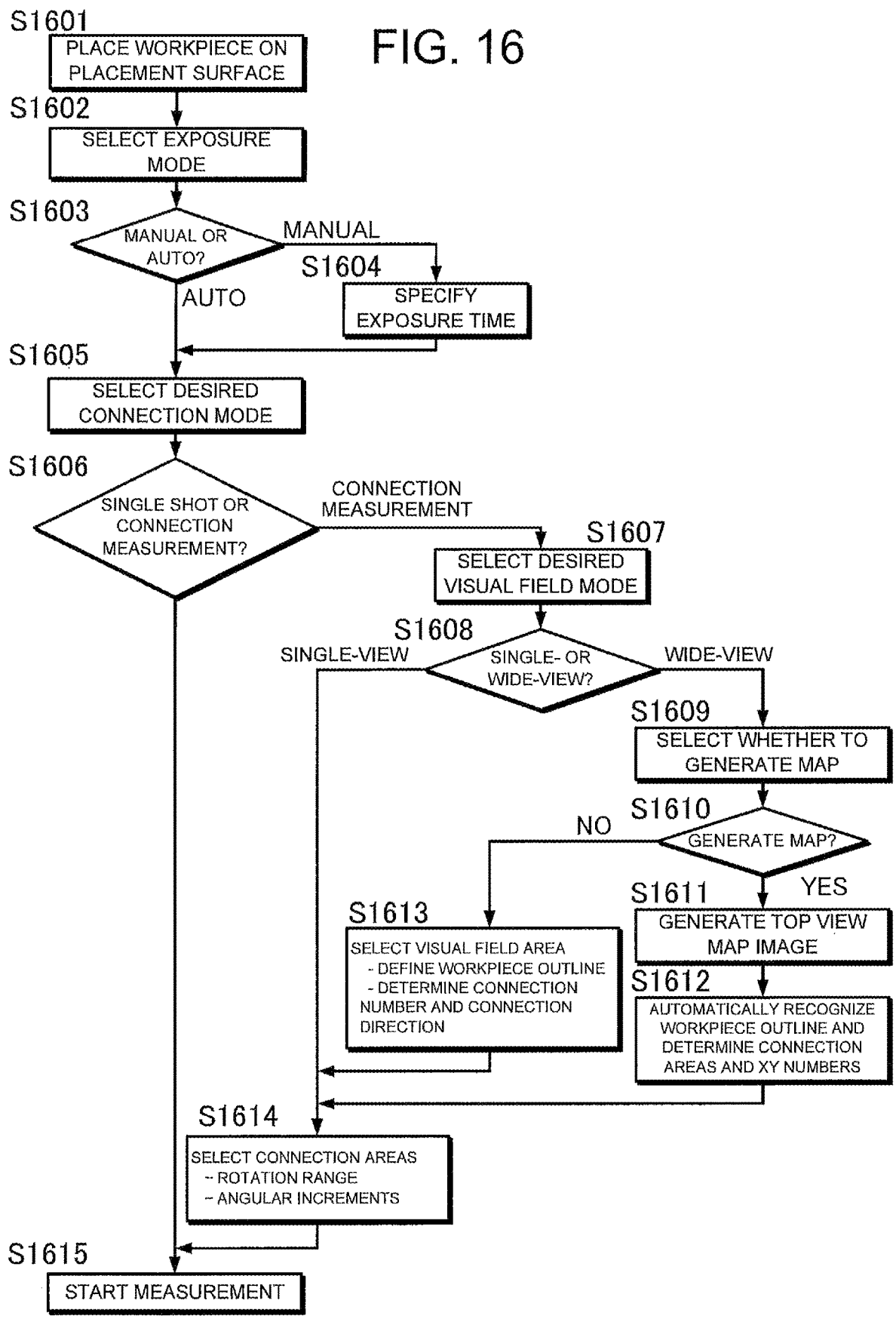
FIG. 16 is a flowchart illustrating the procedure for preparing measurement start.

Procedure before measurement start to execute measurement which obtains an entire wide area, and front- and back-side shapes of a measurement object by using the three-dimensional shape measuring apparatus is described with reference to a flowchart of FIG. 16. In Step S1601, users first place a measurement object on the placement surface 142. The three-dimensional shape measuring apparatus may prompt users to place the measurement object onto the placement surface 142 if necessary.

Subsequently, exposure mode is defined in Step S1602. Here, users select an automatic or manual exposure mode. Subsequently, in Step S1603, it is determined whether the automatic or manual exposure mode is selected, if the manual exposure mode is selected, exposure time is manually specified in Step S1604, and the procedure goes to Step S1605. On the other hand, it is determined that the automatic exposure mode is selected in Step S1603, the procedure goes to Step S1605.

A desired image connection mode is selected in Step S1605. Here, users select single shot or connection measurement as the desired connection mode. If single shot measurement is selected, the procedure goes to Step S1615 so that measurement is started. On the other hand, if the connection measurement is selected in Step S1606, the procedure goes to Step S1607 in which a desired visual field mode is selected. Here, users select a single-view or wide-view measurement as the visual field mode. Subsequently, in Step S1608, it is determined whether the single-view or wide-view measurement is selected as the desired visual field mode. If the single-view measurement is selected, the procedure goes to Step S1614. On the other hand, if the wide-view measurement is selected, the procedure goes to Step S1609 in which need or no need of map generation is selected. Here, users select need or no need of top view map image generation. Subsequently, it is determined whether need or no need of map generation is selected in Step S1610. If need of top view map image generation is selected, the procedure goes to Step S1611 in which the top view map image generator 261 generates a top view map image. Subsequently, the top view map image generator 261 automatically recognizes the outline of the measurement objects, and determines areas to be connected and the number of images to be captured in Step S1612, and the procedure goes to Step S1614. On the other hand, if it is determined that no need of top view map image generation is selected in Step S1610, users select a visual field area in Step S1613. For example, users are prompted to define an outline of the measurement object or to specify the number of images to be connected, connection direction, and the like. Subsequently, the procedure goes to Step S1614.

Areas to be connected are selected in Step S1614. For example, users are prompted to specify a rotation range of the rotation stage part 143, and a rotation angle which is rotated by one rotation operation (angular increments). Finally, the procedure goes to Step S1615 so that measurement starts. After the procedure, measurement which measures the measurement object by using the three-dimensional shape measuring apparatus starts.

Procedure After Measurement Start

Figure 17:
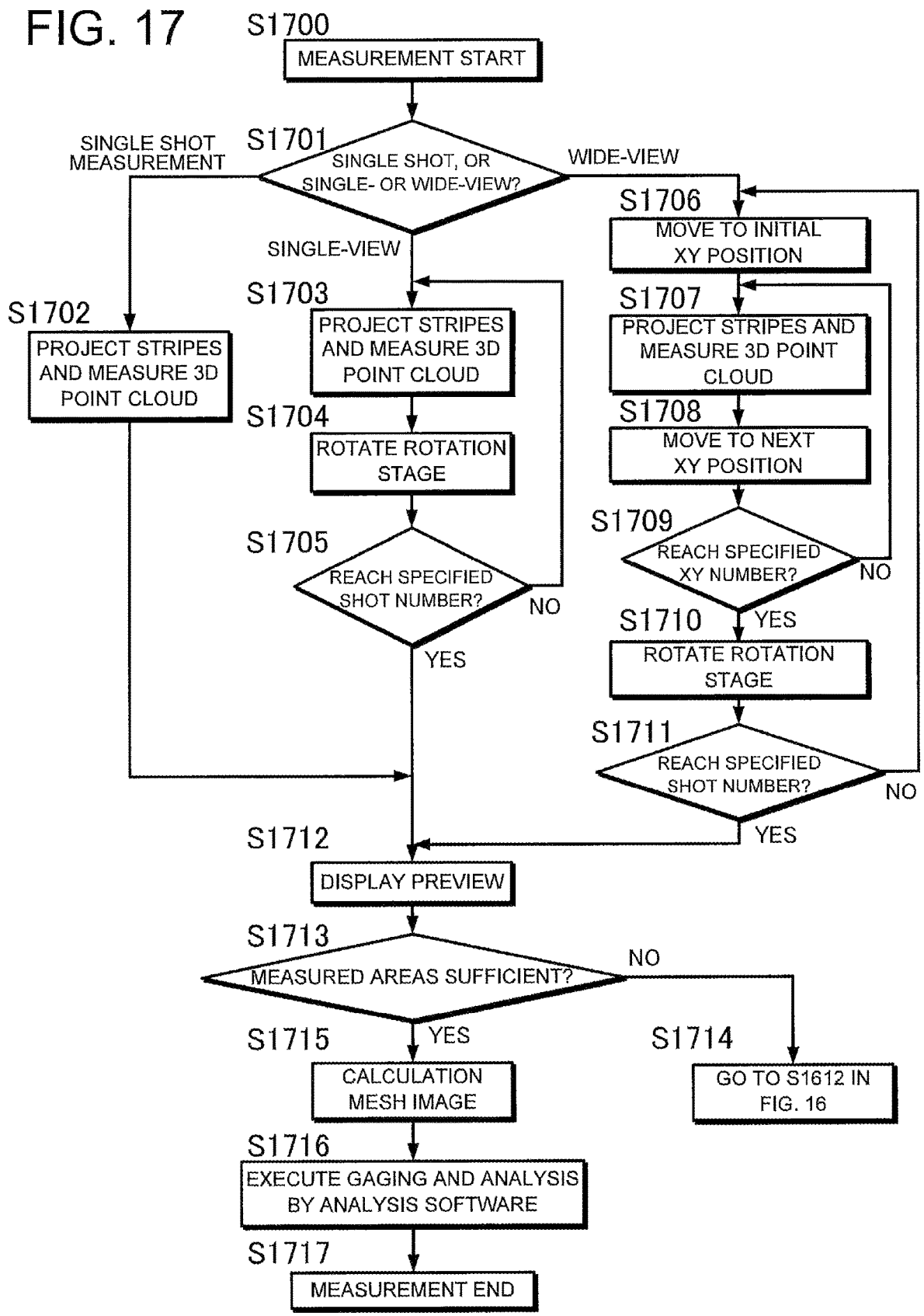
FIG. 17 is a flowchart illustrating the procedure for measurement execution.

Procedure after measurement start is now described with reference to a flowchart of FIG. 17. Firstly, the three-dimensional shape measuring apparatus starts measurement of the measurement object starts in Step S1700, and the desired image connection mode and the desired visual field mode which have been selected are determined in Step S1701. In a first case in which the single shot measurement has been selected as the desired image connection mode, the procedure goes to Step S1702 in which the illuminator 110 projects stripes onto the measurement object so that three-dimensional point cloud data is generated by the point cloud data generator 260, and the procedure then goes to Step S1712.

On the other hand, in a case in which it is determined that the connection measurement has been as the desired connection mode, and the single-view measurement has been selected as the desired visual field mode in Step S1701, the procedure goes to Step S1703 in which stripes are projected onto the measurement object so that three-dimensional point cloud data is generated. Subsequently, the rotation stage part 143 is rotated in Step S1704. Subsequently, it is determined whether a specified number of image capture operations are completed in Step S1705. Here, it is determined whether the number of image capture operations which have been executed reaches the specified number of shots which is defined depending on rotation angle of the rotation stage part 143 and the number of moving operations or not, if it does not reach the specified number the procedure returns to Step S1703 so that the aforementioned steps are repeated, and if it reaches the specified number the procedure goes to Step S1712.

On the other hand, in a case in which it is determined that not the single shot measurement but the connection measurement has been selected as the desired connection mode, and the wide-view measurement has been selected as the desired visual field mode in Step S1701, the procedure goes to Step S1706 in which the translation stage part 141 is moved to its initial XY position. Subsequently, in Step S1707, stripes are projected onto the measurement object so that three-dimensional point cloud data is generated. Subsequently, the translation stage part 141 is moved to a next XY position in Step S1708. Subsequently, it is determined whether a specified number of image capture operations are completed in Step S1709. Here, it is determined whether the number of image capture operations which have been executed reaches the specified number of shots which is defined depending movement distances of the translation stage part 141 (XY stage) and the number of divided parts of a measurement object which are defined in accordance with the observation visual field or not, if it does not reach the specified number the procedure returns to Step S1707 so that the aforementioned steps are repeated, and if it reaches the specified number in Step S1709 the procedure goes to Step S1710 in which the rotation stage part 143 is rotated. Subsequently, it is determined whether the number of image capture operations which have been executed reaches the specified number of image capture operations (i.e., the specified number of shots) which is defined relating to the rotation stage part 143 or not in Step S1711, if it does not reach the specified number of image capture operations the procedure returns to Step S1706 so that the aforementioned steps are repeated, and if it reaches the specified number the procedure goes to Step S1712.

A preview image is displayed in Step S1712. Here, the generated image is displayed on the display 400. Subsequently, in Step S1713, users see the preview image and determine whether the measured areas are sufficient or insufficient. If it is determined that the measured area is insufficient, the procedure goes to Step S1714 so that the exposure mode selection in Step S1602 shown in FIG. 16 is executed again.

On the other hand, if it is determined that the measured area is sufficient, calculation to generate a mesh image is executed in Step S1715. Finally, gaging and analysis are executed by using the three-dimensional shape measuring program in Step S1716, and the measurement ends in Step S1717.

Top View Map Image

Figure 6:
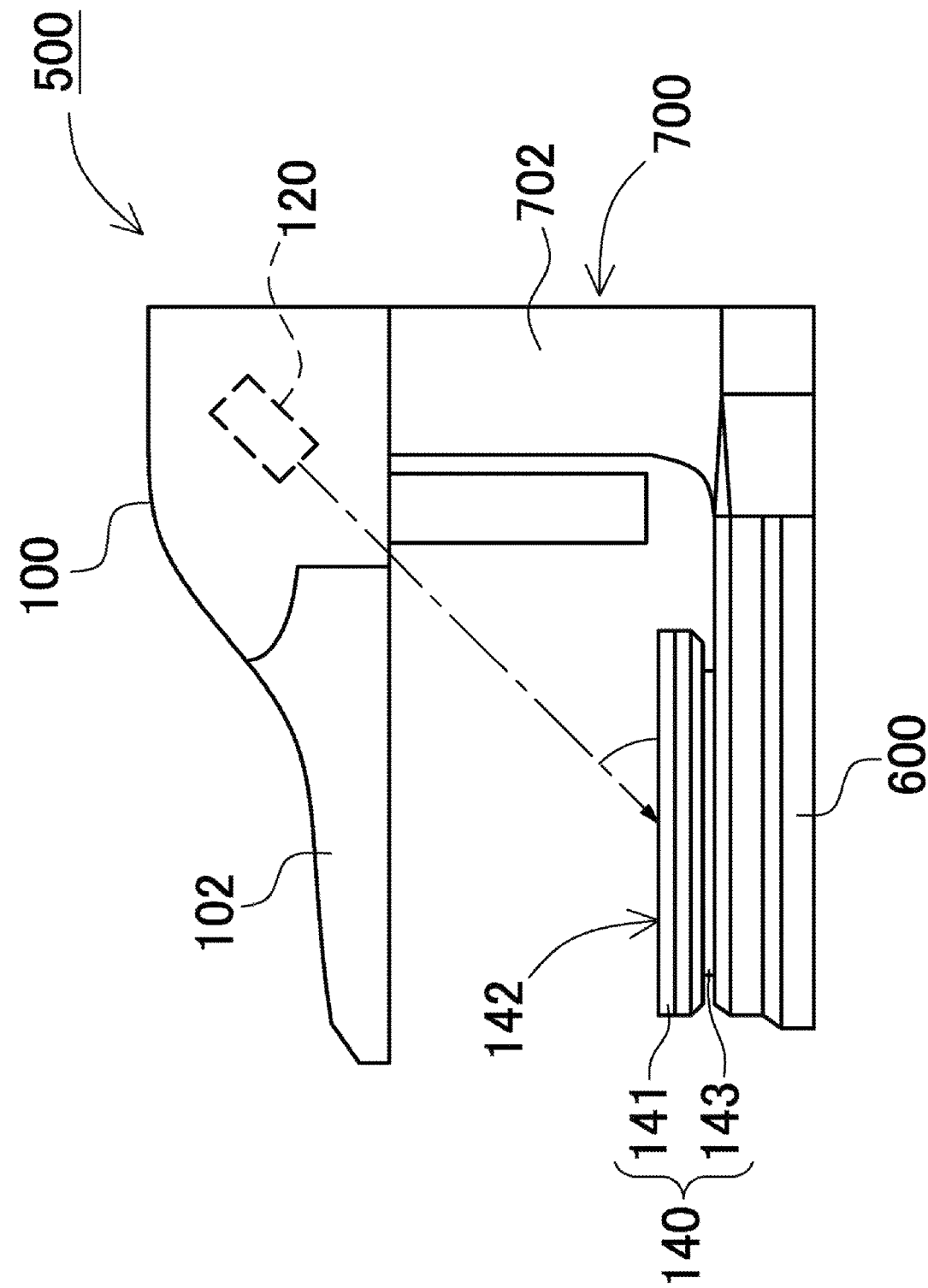
FIG. 6 is a side view of the main part of the three-dimensional shape measuring apparatus shown in FIG. 4.

The three-dimensional shape measuring apparatus according to the embodiment has a function of generating a top view map image. The top view map image refers to an image of a measurement object placed on the stage 140 as viewed from the top side and corresponds to a plan view of the measurement object. In particular, in the case of the three-dimensional shape measuring apparatus which observes the measurement object not from a position right above the measurement object but in a slanting direction from the top as shown in FIG. 6, users often cannot easily visually grasp an exterior shape of the measurement object, and the like. To address this, a top view map image which is viewed like a plan view of the measurement object is prepared to show the entire image of the measurement object to users so that users can easily grasp a part of the measurement object which is currently included in the field of view to be observed in a slanting direction from the top, that is, can easily grasp a relative positional relationship of this part in the measurement object.

The viewpoint of the top view map image is basically provided as viewed in a direction perpendicular to the placement surface 142. However, the top view map image may be provided as viewed in a direction slightly inclined with respect to the direction perpendicular to the placement surface. For example, the top view map image may be provided as viewed in a direction approximately +/−5° where the vertical direction perpendicular to the placement surface 142 is defined zero degree. In this specification, such an image as viewed in a direction slightly inclined with respect to the vertical direction also referred to as a top view map image. Also, because the top view map image is aimed at navigation such as at grasping the measuring point of a measurement object, the top view map image is not limited to an optical image captured by the image pickup device but may be a pseudo-image which represents the measurement object. Also, because measurement executed by the three-dimensional shape measuring apparatus is obtained based on not the top view map image but three-dimensional images, and the like which are separately generated, the top view map image is not required to have high accuracy.

Figure 18:
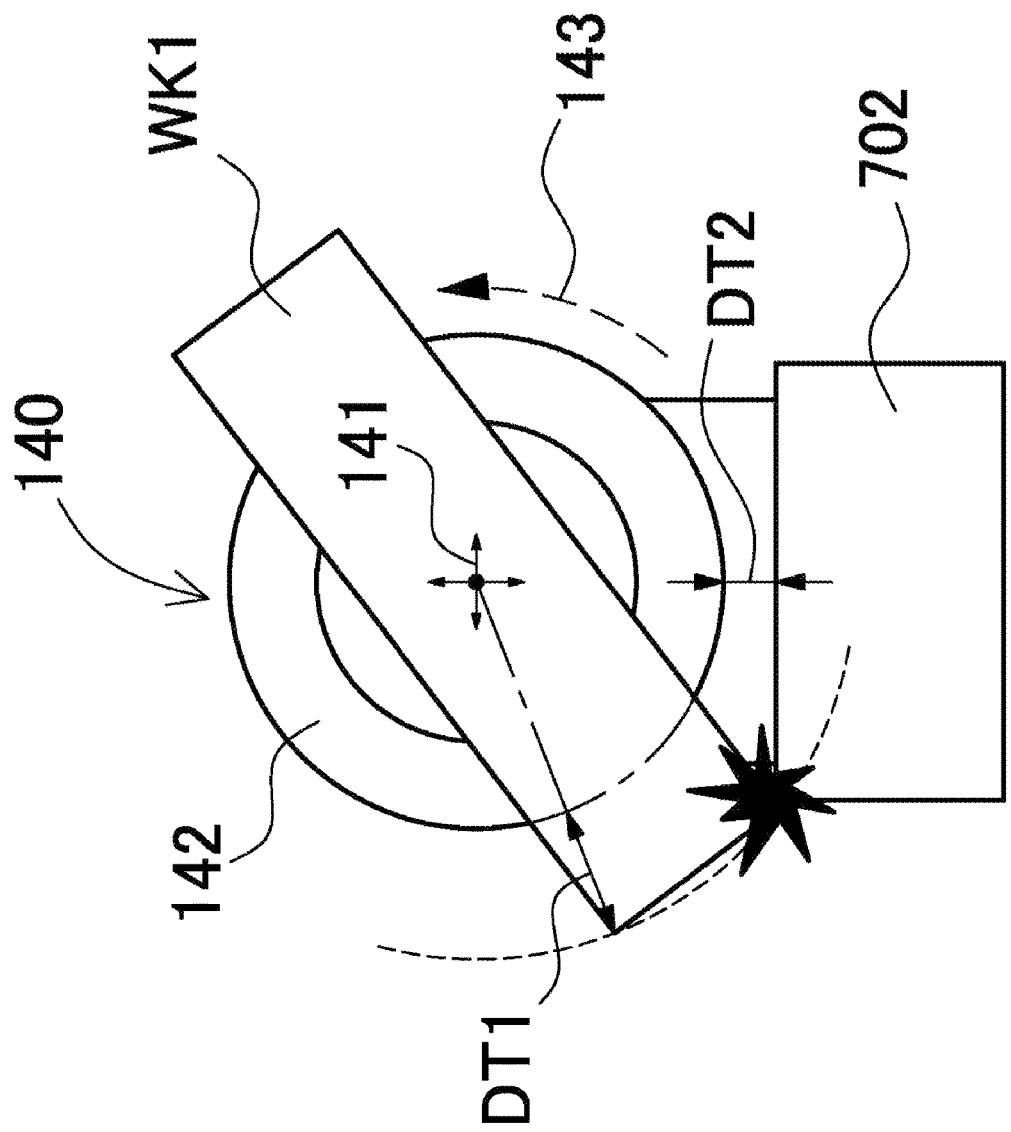
FIG. 18 is a schematic view showing collision of a measurement object when rotated by the rotation stage part.

The three-dimensional shape measuring apparatus which is a non-contact type measuring apparatus and observes down a measurement object in a slanting direction from the top as shown in FIG. 6 is considered to be used to measure not only an upper surface of the measurement object but also a three-dimensional shape of the measurement object including its outer peripheral side surfaces. In this arrangement, the measurement object is observed in a slanting direction from the top (45° in the case of FIG. 6) to include the top surface and side surfaces of the measurement object in the observation visual field. In the three-dimensional measurement, in order to obtain the exterior shape of the measurement object, the rotation stage part 143 can be rotated to observe all the peripheries of the measurement object. In addition, the translation stage part 141 can be considered to be used to measure a larger measurement object. On the other hand, there is the need to measure a larger measurement object. In this case, if a long measurement object WK1 is placed on the stage 140 and is rotated as shown in FIG. 18, there may be a risk that the measurement object WK1 collides with support stand 702 or the like of the three-dimensional shape measuring apparatus. In FIG. 18, if a distance DT1 as protruding amount of the measurement object WK1 is larger than a distance DT2 between the outermost periphery of the placement surface 142 and the support stand 702, such collision occurs.

Function of Detecting Exterior Shape of Measurement Object

To address this, the three-dimensional shape measuring apparatus according to this embodiment has an exterior-shape-detecting function of detecting an exterior shape of a measurement object. The exterior shape of the measurement object is detected by using the image capture optical system included in the measurer 100 based on image information which is obtained by capturing images of the measurement object placed on the placement surface 142. The exterior shape of the measurement object is detected by the CPU 210, for example. A known method such as edge detection can be suitably uses for the exterior-shape-detecting function algorithm. In addition, in the case in which the image capture optical system includes two photo-receiving devices including low and high scaling factors are included as discussed above, even when the high scaling factor photo-receiving device is selected to observe a measurement object, the low scaling factor photo-receiving device can be used to capture a small image of the measurement object so that exterior shape information of a wider area of the measurement object is obtained. For this reason, even in the case in which low and high scaling factor measurement modes are included as measuring modes of the three-dimensional shape measuring apparatus, an image is preferably captured by the low scaling factor photo-receiving device in order to grasp the exterior shape of the measurement object irrespective of selection of measuring mode.

Figure 19:
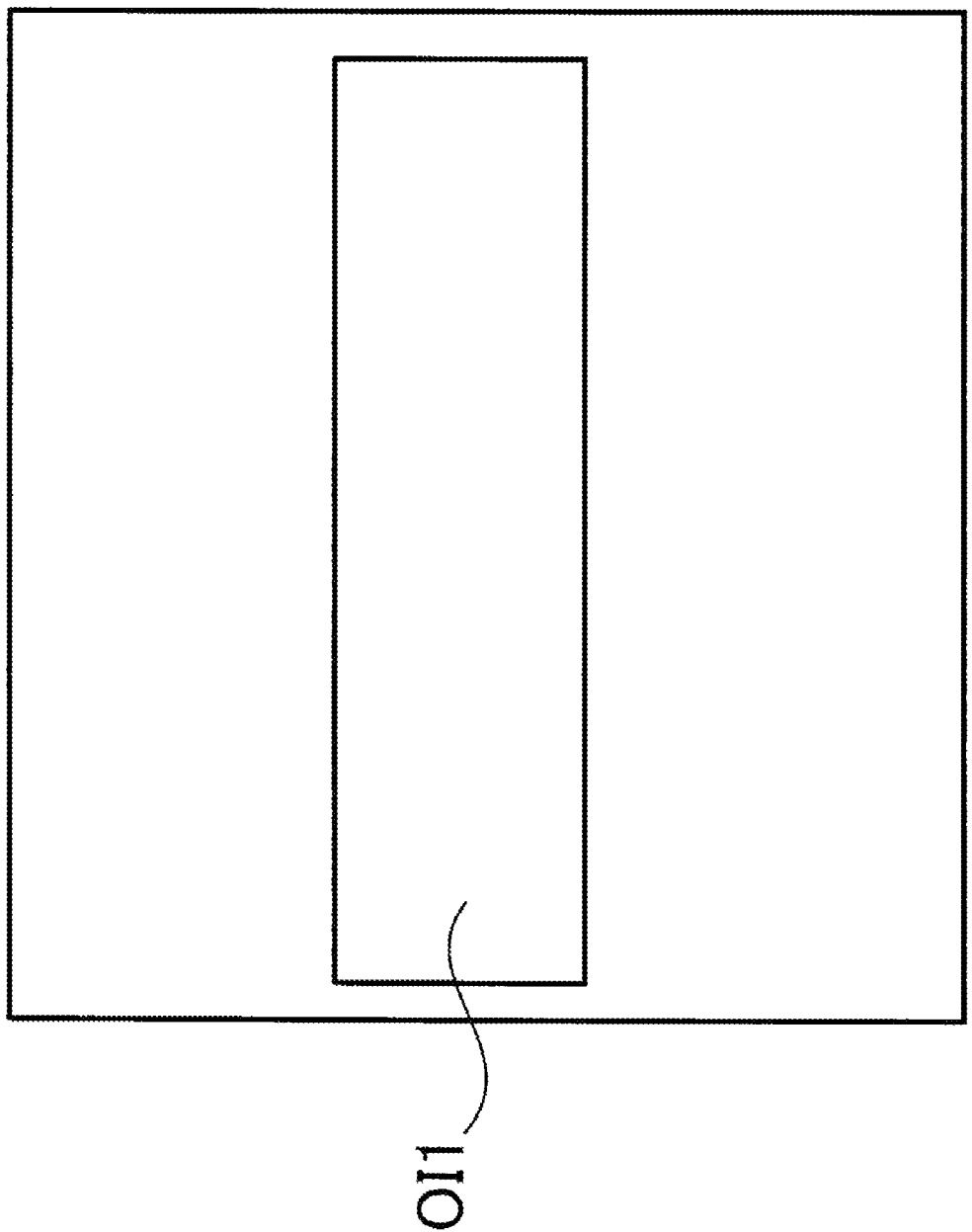
FIG. 19 is an image showing an observed image of a measurement object as viewed in a slanting direction from the top.
Figure 20:
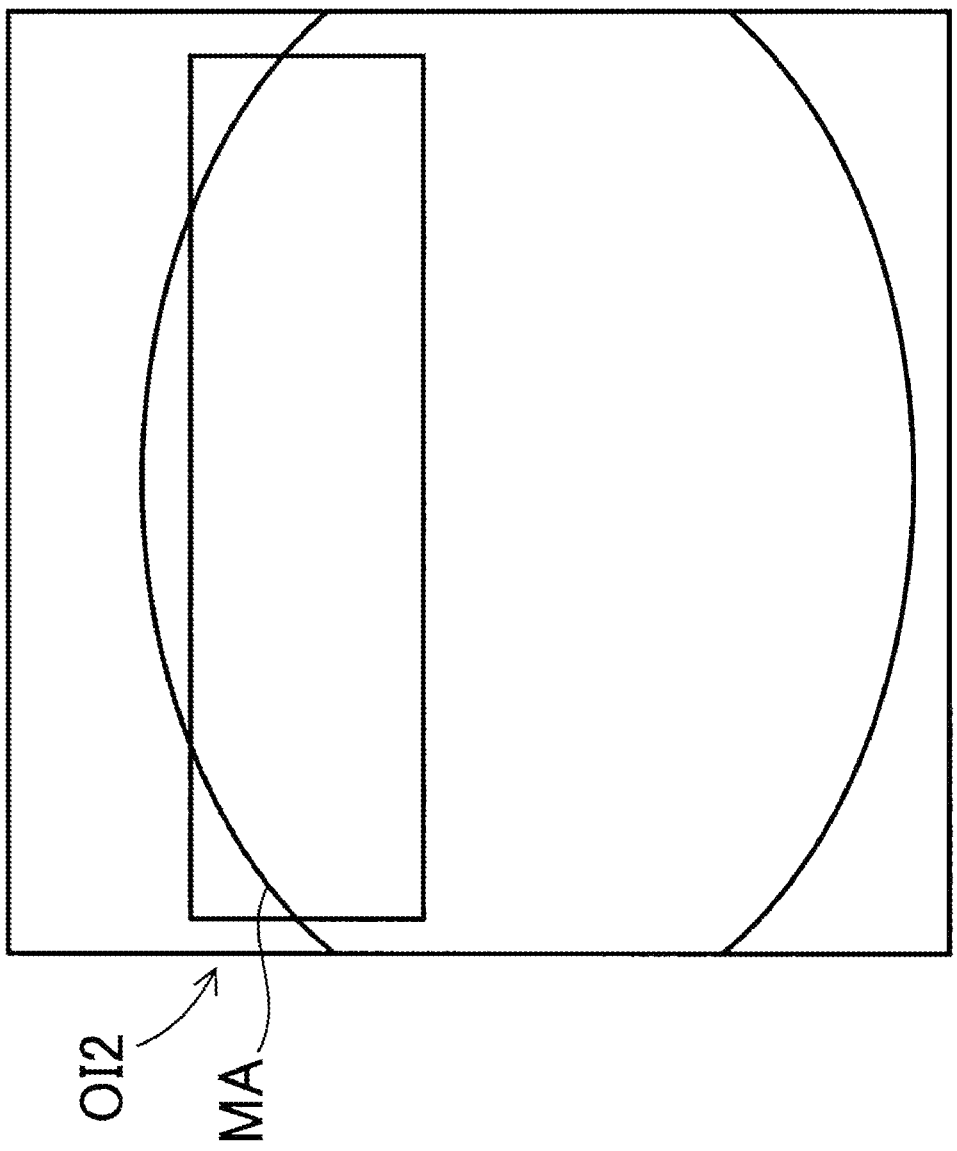
FIG. 20 is an image showing a measurable area in FIG. 19.

FIG. 19 shows an observed bird's-eye view image OI1 of a measurement object which is captured in a slanting direction, and FIG. 20 shows the observed image OI2 on which a measurable area MA is superposed. Generally, wide-angle lenses are often used to capture a small image corresponding to wide area measurement, and its field of view is distorted toward the far side. In the image capture optical system which looks down a measurement object in a slanting direction with respect to the placement surface 142, according to the arrangement of its wide angle optical system, its captured image is affected by perspectivities, and as a result there is a problem that an extracted outline of the measurement object does not always accurately represent the exterior shape of the measurement object. This is because that its scaling factor varies in its depth direction, and a depth distance corresponds to a different pixel length depending on the depth.

Figure 21:
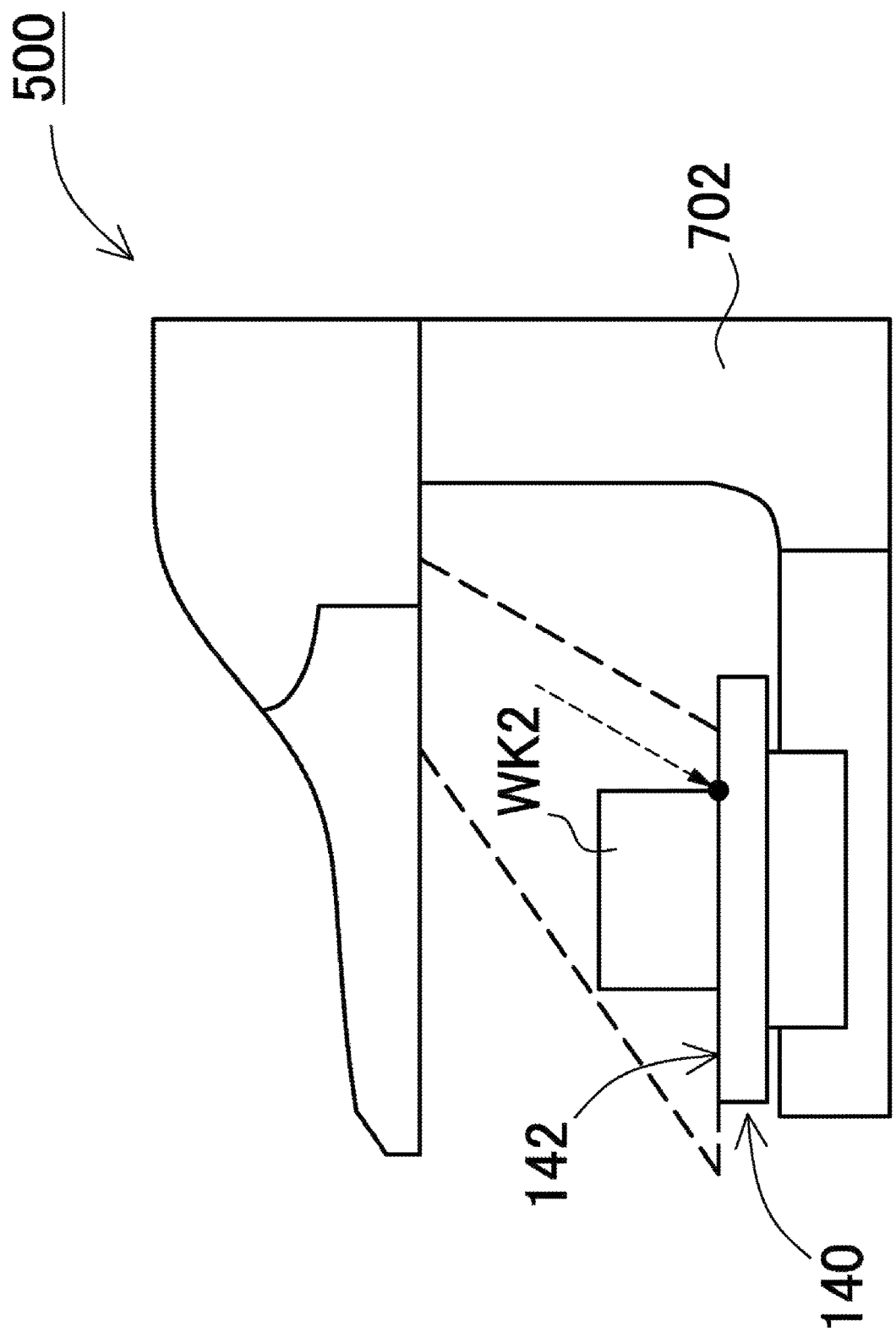
FIG. 21 is a schematic side view showing a measurement object placed in a horizontal orientation on the placement surface when observed in a slanting direction from the top.

In addition to a problem that such bird's-eye view images as viewed in a slanting direction from the top lack exterior shape information of a back surface of a measurement object, a problem arises that an outline of a front surface of the measurement object included in the field of view cannot always accurately represent the "end" of the measurement object which is placed on the placement surface 142. Here, this problem in detection of the end of a measurement object in a wide angle bird's-eye view is discussed with reference to FIGS. 21 and 22. In the case in which a bottom surface of a measurement object WK2 properly touches the placement surface 142 as shown in FIG. 21, the outline of the measurement object WK2 (shown by a solid black circle in FIG. 21) agrees with the exterior shape of the measurement object WK2. However, in the case in which the measurement object WK3 is placed on the placement surface 142 in an inclined orientation as shown in FIG. 22, the outline which is recognized in a captured image (shown by a solid white circle in FIG. 22) does not agree with the end of the measurement object WK3. Also, even in the case of FIG. 21, if a measurement object has a protruding part which protrudes upward, its outline does not agree with its end.

In these cases, even if a measurable area MA which can be obtained by moving the placement surface 142 is shown, users cannot recognizes the end of such a measurement object, and as a result a problem arises that users cannot recognize the area definition accuracy. For example, also in the case of the observed image OI2 on which the measurable area MA is superposed shown in FIG. 20, in addition to uncertainty whether the back side is included in the measurement area, it can be found that determination whether the measurement object is inclined or the measurement object is positioned on the far side is difficult.

Accordingly, to address the difficulty in the detection of the exterior shape of such a measurement object, the three-dimensional shape measuring apparatus according to this embodiment generates a top view map image of the measurement object which is a top bird's-eye view image as viewed from the top like a plan view of the measurement object in order to change the viewpoint. The measurement area can be shown to users for ease of their grasp on the area by displaying the top view map image. In addition, because users can grasp the orientation of the measurement object which is placed on the placement surface 142 and the exterior shape of the measurement object, there is an advantage that movement control can be conducted in consideration of collision prevention and the like to prevent unintentional collision of the measurement object with other members when moving the placement surface 142.

The top view map image generator 261 generates a top view map image. Specifically, generation procedure of a top view map image is described. Firstly, point cloud data of a measurement object is generated. Subsequently, the generated point cloud data is mapped onto a plan view as viewed downward from the position right above the measurement object to generate the top view map image. A process which prompts users to specify a measurement area on the top view map image may be provided if necessary. In addition, a process which automatically specifies a measurement area on the top view map image may be provided.

As discussed above, although the three-dimensional shape measuring apparatus according to this embodiment includes an optical system which observes down a measurement object not from a position right above the measurement object but in a slanting direction from the top, the three-dimensional shape measuring apparatus obtains three-dimensional information of the measurement object, and generates and displays a top view map image as viewed from a position right above the measurement object to allow users to easily grasp the entire shape of the measurement object, and as a result the measurement area can be properly defined.

(Procedure of User Instruction to Generate Top View Map Image)

In the procedure definition and measurement flow in which the measurement area is defined on the top view map image and measured, the top view map image is first generated and displayed, and subsequently the measurement area is defined on the top view map image and then measured. A series of operations by users in this procedure is described with reference to a flowchart of FIG. 23. Firstly, a measurement object is placed on the stage in Step S2301. Subsequently, in Step S2302, measurement conditions for measuring the measurement object are defined. Here, examples of measurement conditions can be provided by brightness, orientation, measurement area, and the like of images. Subsequently, in Step S2303, an instruction to generate a top view map image is issued. For example, users open a measurement-area setting screen through a three-dimensional shape measuring apparatus operation program, and selects "generation of top view map image".

Accordingly, the top view map image is generated by the top view map image generator 261, and is displayed on the display 400 (Step S2304). After that, users see the top view map image (Step S2305), and determine whether the image capture area of the top view map image is sufficient or insufficient (Step S2306). If determining the image capture area is insufficient, users instruct to generate an additional top view map image (Step S2307). In this case, the additional top view map image is added and a new top view map image is displayed (Step S2308), and users determine whether the image capture area of the top view map image is sufficient or insufficient again (Step S2306).

On the other hand, if it is determined that the image capture area of the top view map image is sufficient, the procedure goes to Step S2309 in which the measurement area is defined. Subsequently, an instruction to measure the measurement object is issued in Step S2310 so that the measurement object is measured (Step S2311). As a result, the top view map image is generated.

(Procedure of Generation of Top View Map Image)

Figure 24:
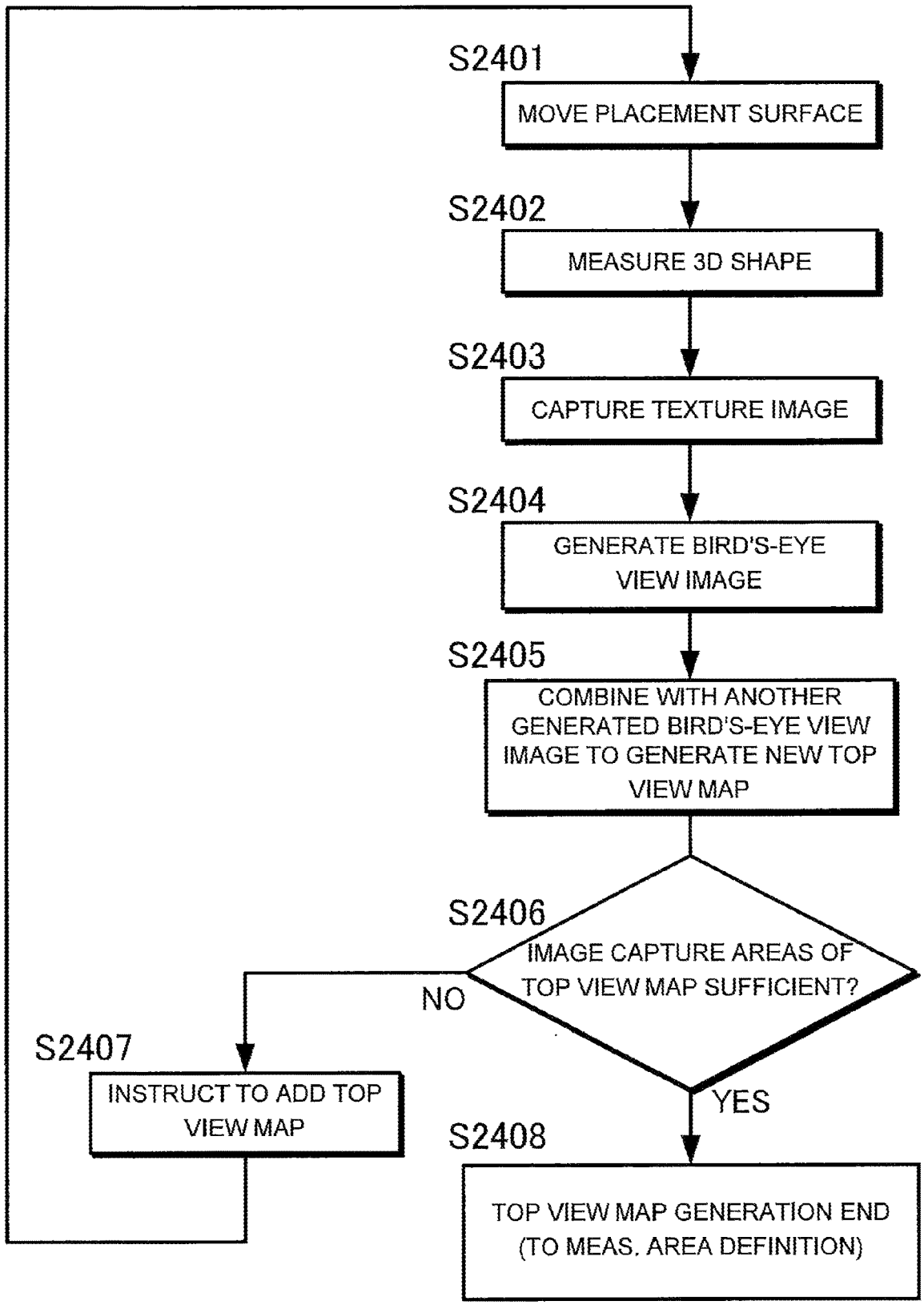
FIG. 24 is a flowchart illustrating the procedure for generating a top view map image.

The top view map image is a single top bird's-eye view image or an image which is generated by combining two or more top bird's-eye view images. Such top view map images have an advantage that two or more top bird's-eye view images can be easily combined with each other. Contrary to this, in the case of wide angle images as viewed in a slanting direction, because the wide angle images are affected by perspectivities, it is not easy to accurately combine two or images with each other. Because two or more top bird's-eye view images can be easily combined with each other, there is an advantage that an additional image is easily added to a top view map image which has been generated. For this reason, when the top view map image is generated, because the procedure from the three-dimensional measurement and image capture to the image combination can be recursively executed, the size of the top view map image (i.e., field of view) can be increased until users feel that the size of the top view map image is sufficient. Here, the procedure as a series of processes for generating a top view map image is now described with reference to a flowchart of FIG. 24.

In the procedure in the three-dimensional shape measuring apparatus, the placement surface 142 is first moved in Step S2401. Subsequently, in Step S2402, a three-dimensional shape is measured at the position where the placement surface has been moved. Subsequently, a texture image is captured in Step S2403, and a top bird's-eye view image is generated in Step S2404. In addition, in Step S2405, this top bird's-eye view image is combined with another top bird's-eye view image which has been generated to generate a new top view map image.

Subsequently, in Step S2406, determination whether the image capture area is sufficient or insufficient is made as users' operation when users see the generated top view map image. If the image capture area is insufficient, the procedure goes to Step S2407 in which users instruct the three-dimensional shape measuring apparatus to add an additional image to the top view map image. According to this instruction, the procedure returns to Step S2401 so that the three-dimensional shape measuring apparatus repeats the processes for generating a top view map image. On the other hand, if it is determined that the image capture area of the top view map image is sufficient in Step S2406, the procedure goes to Step S2408 so that the series of processes for generating a top view map image ends. After that, the procedure goes to measurement area definition if necessary.

Here, FIG. 25 shows texture images, top view map images (top bird's-eye view images) before combination, and top view map images after combination at four positions (stage positions) in the case in which additional images are added to a top view map image one after another by moving the stage 140 to the four positions to increase the size of the top view map image (i.e., field of view). It can be found from FIG. 25 that the field of view becomes wider with increase of the number of stage positions so that the grasp of the entire shape of the measurement object becomes better.

In this case although the field of view becomes wider with the number of stage positions, time required to generate the top view map image correspondingly becomes longer. To grasp the entire shape of a measurement object, processes for capturing images at two positions can be sufficient in some cases but even processes for capturing images at four positions may be in sufficient in some other cases depending on the measurement object. As the procedure which generates a sufficient top view map image by generating images at a necessary and sufficient number of stage positions, it is conceivable that the field of view is increased until users stop the increase of field of view, for example. Alternatively, the top view map image generation process may stop for every position so that users determine whether to increase the field of view or not. Also, the top view map image generator 261 may recognize the increase degree of a visual field of the measurement object after top view map image combination to automatically increase the field of view if determining that the top view map image of the measurement object is insufficient.

(Top View Map Image Generation Process)

As discussed in the aforementioned series of processes for generating a top view map image, the top view map image generation process includes a process for creating a top bird's-eye view image at every stage position, and a process for combining top bird's-eye view images which have been created with each other.

(Creation of Top Bird's-Eye View Image)

A top bird's-eye view image which is used to generate a top view map image is generated from three-dimensional information and a texture image which are obtained from a measurement object. An example of a creation method of a top view map image can be provided by a method for mapping a two-dimensional image from point cloud data. Here, the method for mapping a two-dimensional image from point cloud data to generate the top view map image will be described.

(Mapping of Two-Dimensional Image from Point cloud)

Figure 26:
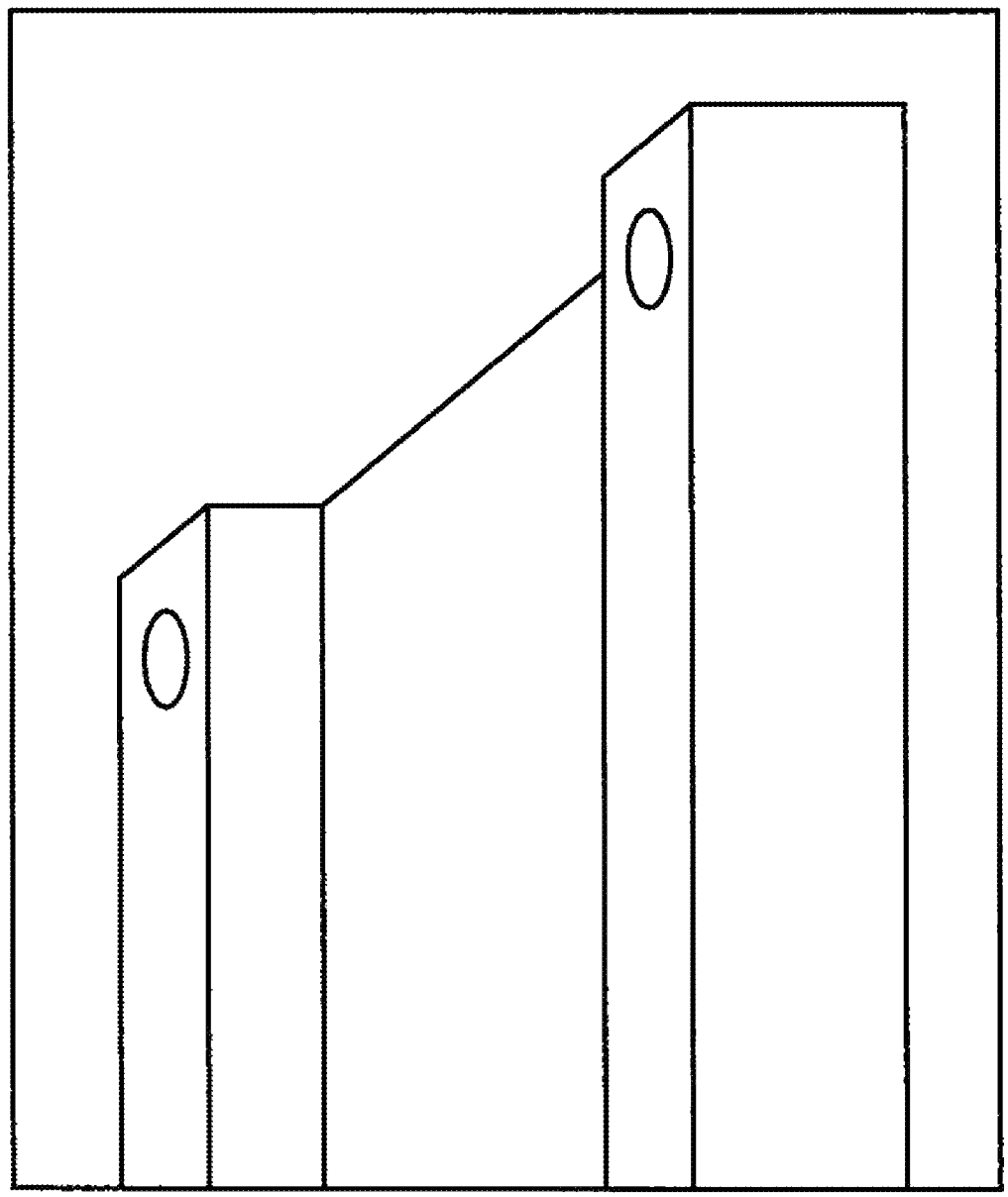
FIG. 26 is an image showing an exemplary texture image of a measurement object.
Figure 27:
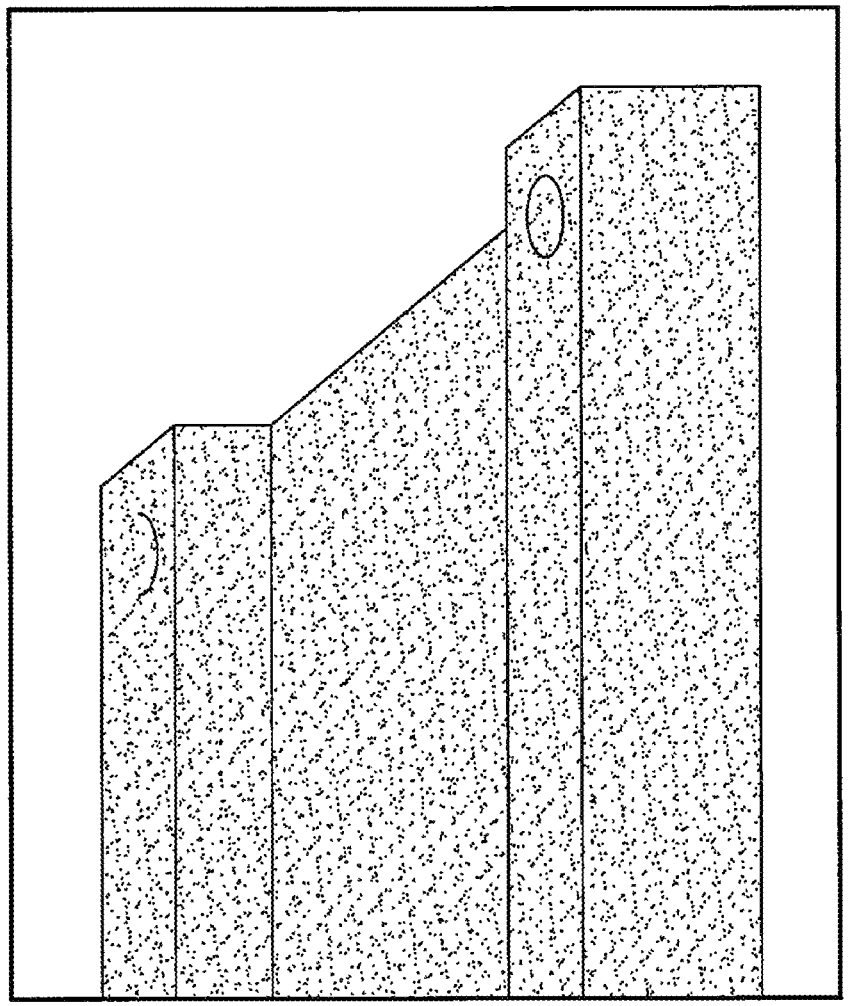
FIG. 27 is an image showing a point cloud image of the measurement object shown in FIG. 26.
Figure 28:
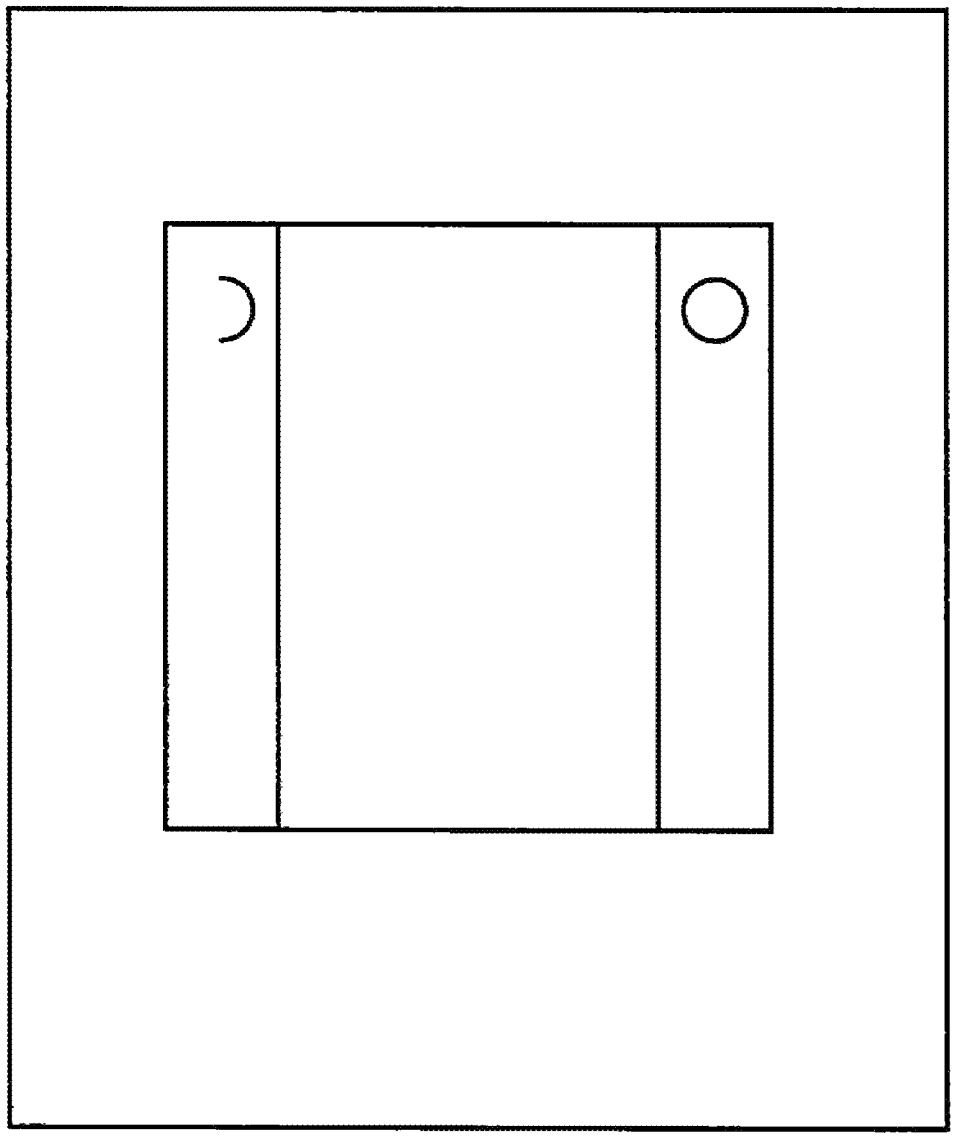
FIG. 28 is an image showing a top view map image of the measurement object shown in FIG. 26.
Figure 29A:
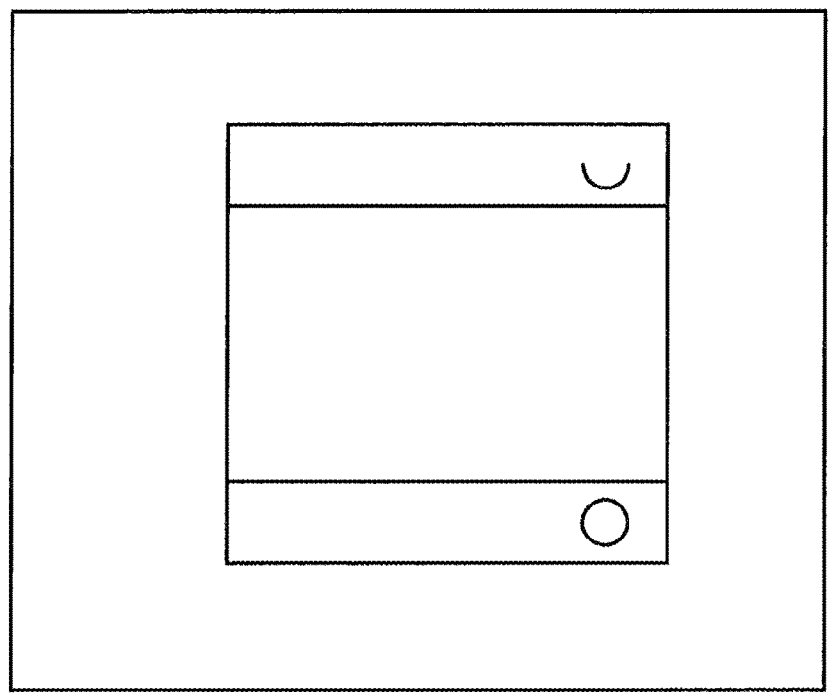
FIG. 29A is an image showing a top view map image before complementary to missing pixels.
Figure 29B:
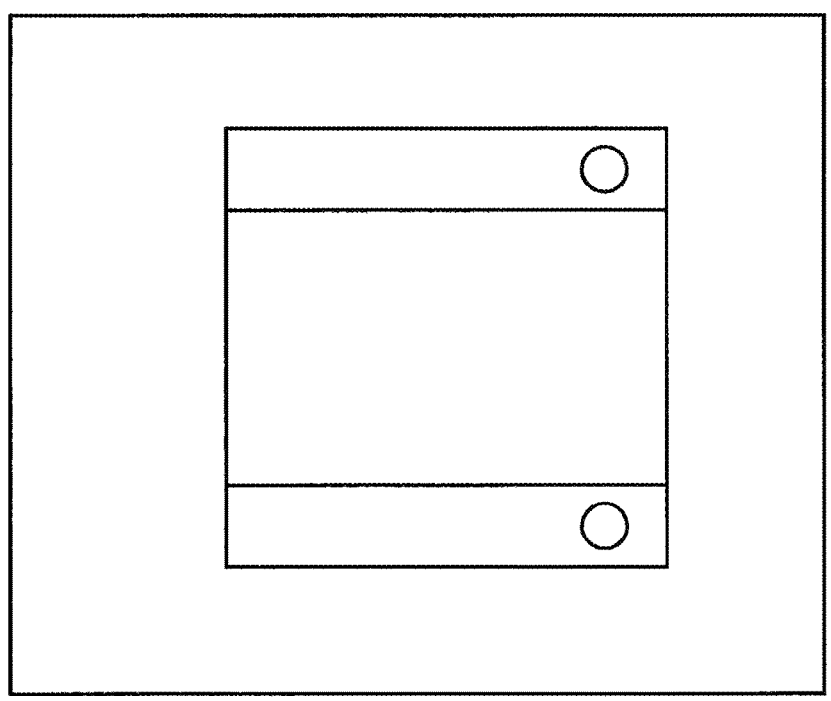
FIG. 29B is an image showing a top view map image after the complementary.

Three-dimensional information includes point cloud information (structured point cloud which holds positions of points for every pixel of the camera), and mesh data which is generated from the point cloud information. The top view map image is created by assigning brightness values in the texture image to positions of points for every pixel of the camera as photo-receiving device by using the point cloud information. Specifically, a top view map image shown in FIG. 28 is created from a texture image shown in FIG. 26 and a point cloud image shown in FIG. 27. However, because the top view map image is created by mapping points one by one, some of pixels may be missing. In this case, the top view map image generator 261 can interpolate such missing pixels based on peripheral pixels around the missing pixels to create a better quality image. As in such a case, FIG. 29A shows an exemplary top view map image before complementary which includes missing pixels, and FIG. 29B shows an exemplary top view map image after complementary which is created by complementing the missing pixels.

(3D Rendering by Generating Textured Mesh)

It is noted that the generation method of a top view map image used in the present invention is not limited to the aforementioned method for mapping a two-dimensional image from point cloud data but other methods can be used. Another exemplary generation method of a top view map image by generating a mesh with texture to render a 3D image is described. In this case, point cloud data is not used as it is, but a mesh image is first created, and a textured mesh image which has texture on the mesh image is created. In this method, a top view map image is generated by rendering a three-dimensional image of the created mesh image and changing the viewpoint and angle of view to provide a top bird's-eye view of the three-dimensionally rendered image. That is, the viewpoint from which the mesh image is viewed is set to a position right above a measurement object so that a view of the mesh image is shown in a plan view, and consequently the plan view of the mesh image is used as the top view map image. Although this method requires increase processing time as compared with the case in which point cloud information is used as it is because mesh image generation processing is needed, there is an advantage that other images which are viewed from different viewpoints such as side views and back view can be generated if required.

(Top Bird's-Eye View Image Combination)

Also, top bird's-eye view images can be simply superposed on each other, and as a result there is an advantage that processing required for combination of top bird's-eye view images is simple. For this reason, such a top bird's-eye view image can be easily added to a top view map image which has been generated, and therefore a top view map image of a wider area can be provided as shown in FIG. 25 if necessary.

(Speed Enhancement of Top View Map Image Generation)

Because top view map images are not used for measurement, high accuracy such as for measurement is not required for top view map image generation. For this reason, it can be said that a top view map image is preferably provided faster even if its accuracy is slightly poor. From this viewpoint, as compared with capture of images to be used for normal three-dimensional shape measurement, time required to generate a top view map image is reduced by simplification of image capture conditions and the like when the top view map image is captured. In this embodiment, when a top view map image is generated, the top view map image generator 261 generates the top view map image under simple measurement conditions which require a lower processing load than measurement conditions in normal three-dimensional shape measurement (normal measurement conditions). Because the simple measurement conditions are defined to reduce the load as compared with the normal measurement as discussed above, the top view map image can be generates and displayed in a short time.

(Simple Measurement Conditions)

The simple measurement conditions can include lower image resolution and shorter exposure time than the normal measurement conditions, a limited operation in which only a single image capture operation is executed with only one of the illuminators 110 (if two or more illuminators 110 are included to capture images by using the photoreceptor 120 every when the illuminators 110 of the photoreceptor 120 illuminate a measurement object with light one after another), and the like. Among them, it can be considered that the lower image resolution is provided by scaling the resolution of the camera as the photo-receiving device down when top view map images are captured. According to this scaling down of resolution, the number of elements in point cloud and the number of texture pixels are reduced, and as a result computation time can be reduced. For example, image capture time and image processing time can be reduced by reduction in mage size by half.

Also, shorter exposure time can be provided by increasing analog gain by using the analog gain function of the camera, for example. According to this increase of analog gain, although camera noise will increase, such noise provide not a detriment because accuracy is not required for top view map images; rather there is an advantage that exposure time of the camera can be reduced.

Also, the limited operation in which only a single image capture operation is executed with only one of the illuminators 110 (if two or more illuminators 110 are included) can be provided by using only the first illuminator 110A or the second illuminator 110B when a top view map image is created in the case in which the aforementioned right and left illuminators 110 are included as shown in FIG. 2 to use their right and left measuring illumination systems when normal three-dimensional information is obtained. According to this limited operation, the illumination time can be reduced by half, and as a result, computation time can be reduced. In this case, although the area of a top view map image which can be measured at one stage position becomes smaller than the case in which the right and left illuminators are used, a drop-off area can be complemented by another top view map image which is obtained at another stage position. In addition, in the case in which the three-dimensional shape measuring apparatus includes a single illuminator and two or more photoreceptors, an image is captured by using only one of the photoreceptors when a top view map image is created so that the top view map image creation processing can be similarly simplified.

(Measurement Area Definition)

The measurement area is specified from a top view map image which has been created as discussed above. Examples of measurement area definition can be provided by automatic selection which is automatically executed by the three-dimensional shape measuring apparatus, and manual selection which is manually selected by users.

(Automatic Selection of Measurement Area)

Figure 30:
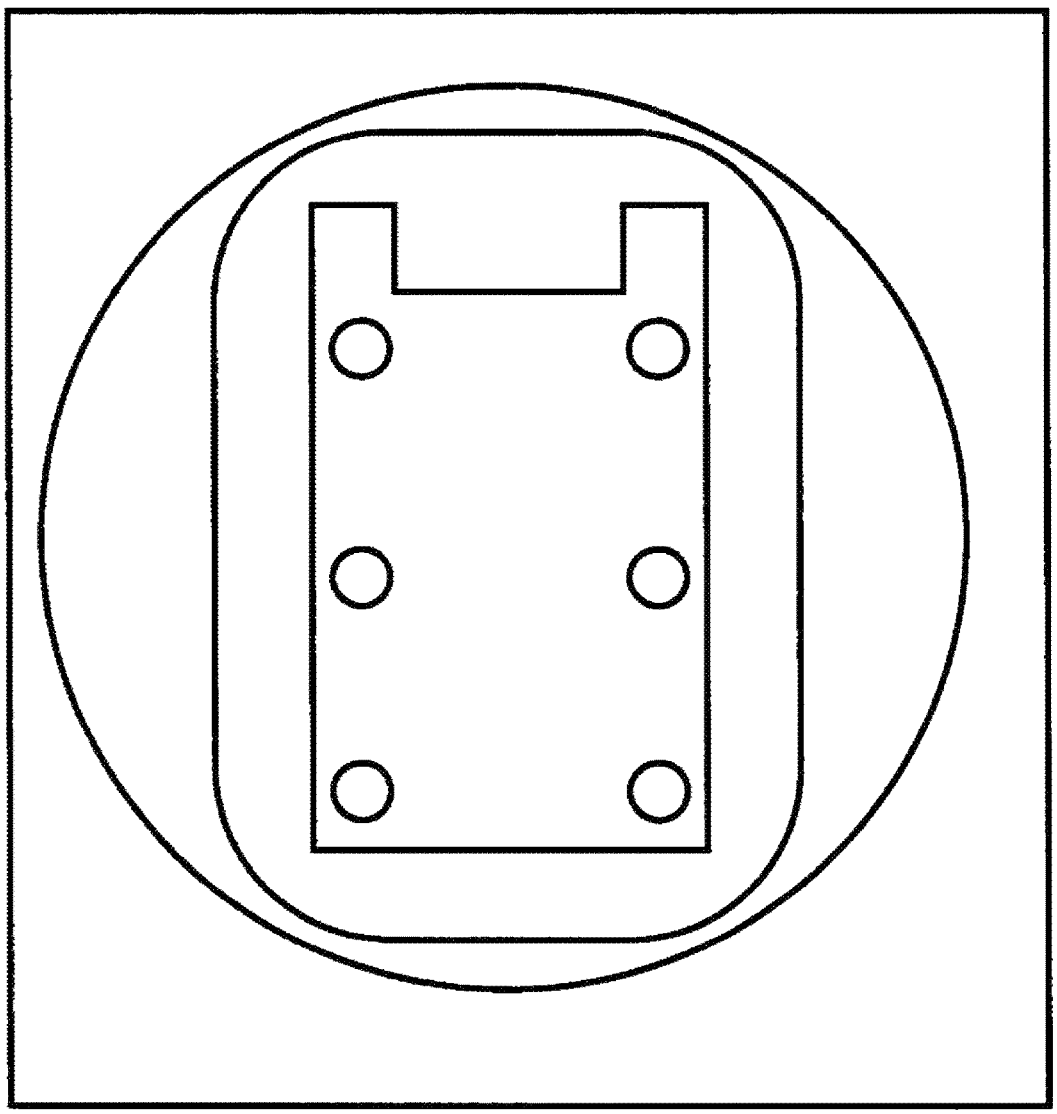
FIG. 30 illustrates an image showing an exemplary top view map image of the measurement area which is automatically determined.

Here, the automatic selection of the measurement area is described with reference to FIG. 30. FIG. 30 shows exemplary superposition display of the outline of a measurement object and the measurement area which is automatically determined. Because the top view map image generator 261 acquires the three-dimensional information of the measurement object in the creation process of the top view map image, it can determine which part of the top view map image is the measurement object. Here, it is determined that the part above the placement surface 142 of the stage 140 is the measurement object. Accordingly, the measurement area can be automatically determined so that the measurement area encloses the measurement object. In the case of FIG. 30, the measurement area is defined by an oval or rounded rectangular shape to enclose the outline of the measurement object shown by the thick line.

(Manual Selection of Measurement Area)

Figure 31:
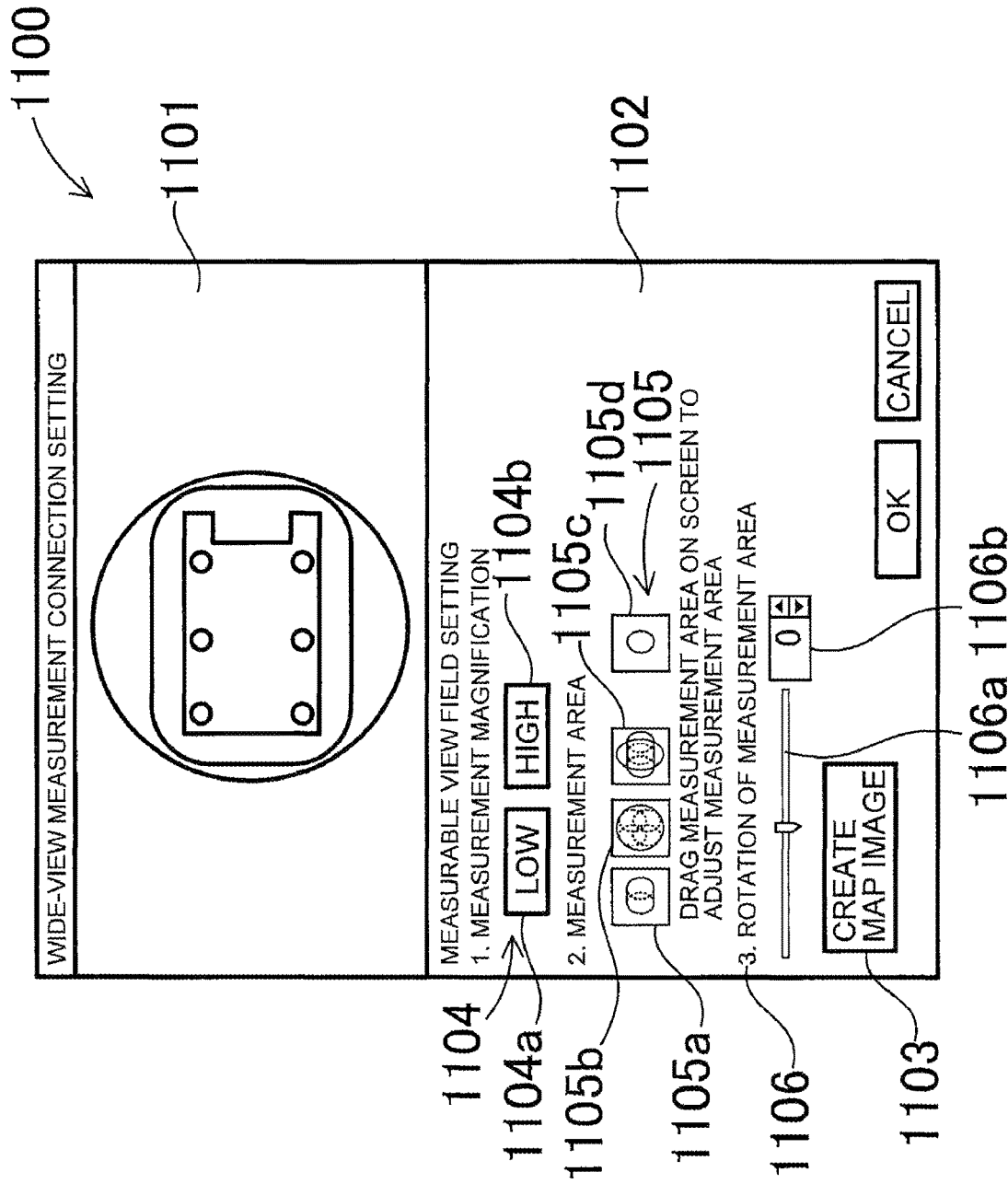
FIG. 31 is an image showing a user interface screen of a three-dimensional shape measuring program for allowing users to manually define a measurement area.

Next, exemplary manual selection in which users manually specify the measurement area is described with reference to FIG. 31. FIG. 31 shows an exemplary user interface screen of the three-dimensional shape measuring program to be displayed on the display 400. This screen is a measurement area setting screen 1100 which is one form of the measurement area setting part 264 which receives manual entry to specify the measurement area by using the top view map image. The measurement area setting screen 1100 includes a top view map image display area 1101 and an operation area 1102.

(Top View Map Image Display Area 1101)

The top view map image which is generated by the top view map image generator 261 is displayed in the top view map image display area 1101. In addition, the white line shows the outer edge of the stage 140 (circular line in FIG. 31), and the thin brown line shows the measurement area so that they are superposed on the top view map image.

(Operation Area 1102)

In the operation area 1102, buttons and tools which allow users to specify conditions and the like for creating a top view map image in the top view map image generator 261 are arranged. Also, guidance and the like may be shown in addition to the buttons and tools in the operation area. The operation area 1102 of the measurement-area setting screen 1100 shown in FIG. 31 includes a top view map image creation button 1103 for generating a top view map image, as well as a scaling-factor setting field 1104 for setting a measurement scaling factor, a measurement-area setting field 1105 for specifying a measurement area, and a measurement-area rotation field 1106 for rotating a measurement area as the buttons and tools which allow users to specify conditions for generating the top view map image. These fields to which their number corresponding to the setting order are arranged in increasing order from the top toward the bottom so that users can specify a measurement area by specifying these settings in this order. As discussed above, the operation area 1102 shows users the items corresponding conditions to be specified by users in the setting order, and as a result a navigation function which directs users to properly define the measurement area is realized. Also, a guidance function which gives guidance of procedure of various settings or shows specifications of measurement, cautions in measurement and the like by voice or video may be additionally provided. Accordingly, even if a user is not sophisticated about operations of the three-dimensional shape measuring apparatus, the procedure of settings is shown to the user so that the user will be directed to define user's desired measurement area without confusion. Of course, if a user is sophisticated about the operations, the user does not always necessarily follow such shown procedure but can suitably select necessary settings to specify user's desired conditions. Also, in this case, the navigation function or the guidance function can be switched between ON and OFF. This allows users to flexibly specify the settings in accordance with their experience and preference.

(Scaling-Factor Setting Field 1104)

A measurement scaling factor of an image to be captured is defined in the scaling-factor setting field 1104. Also, a predetermined low scaling factor of a top view map image is determined to capture a wide top view map image. In the exemplary user interface screen shown in FIG. 31, low and high scaling factor buttons 1104a and 1104b which select a low or high scaling factor are provided. When the low scaling factor button 1104a is pressed, the first optical system which is included in the photoreceptor 120 and has the low scaling factor is selected, and a low scale image is captured. FIG. 31 shows the exemplary user interface screen shown in which the low scaling factor button 1104a is selected by pressing it. In particular, because the top view map image is required to include a wide area, preferably the entire shape of a measurement object, it is desirable to select the low scaling factor which provides a wide area image. In particular, even when high scaling factor measurement is actually performed, easy-to-operate environments in which operations such as measurement area setting can be easily conducted can be realized. From this viewpoint, the low scaling factor button 1104a may be selected as a default setting in the scaling-factor setting field 1104.

However, the top view map image does not necessarily include the entire image of the measurement object. For example, in the case in which an area which includes only a part (e.g., fore end) of a measurement object is measured, the top view map image is only required to include such a needed part. Alternatively, a case is conceivable in which a measurement area is carefully defined. To address such a case, to capture not only a low scale image but also a high scale image also when a top view map image is captured, the high scaling factor button 1104b shown in FIG. 31 can be provided.

Also, the scaling-factor setting field 1104 is not limited to the binary decision in which the low or high scaling factor is selected but may have another arrangement. For example, in a measurement-area setting screen 1200 according to a modified embodiment shown in FIG. 32, one scaling factor can be selected from a predetermined set of scaling factors in a pull-down list. Alternatively, the scaling-factor setting field may accept direct entry of any numerical value as the scaling factor.

Also, the photoreceptor may be moved away from the stage 140 so that a wider area top view map image can be captured. For example, the translation stage part 141 is translated by the movement controller 144 in a direction opposite to the support stand 702 from the previously-defined original position. In the case in which the translation stage part 141 is first moved to a position away from the photoreceptor 120, and the point cloud data generator 260 then generates point cloud data which represents a three-dimensional shape of a measurement object, a wide angle of view can be surely provided so that a wide area image can be captured, and therefore there is an advantage that even a large measurement object can be easily included in the field of view.

(Measurement-Area Setting Field 1105)

One shape can be selected from a predetermined set of shapes in the measurement-area setting field 1105 so that users can easily define an area to be measured. In the exemplary user interface screen shown in FIG. 31, buttons which represent a field of view by a pattern constructed of a circle or circles so that users can easily intuitively grasp their corresponding measurement areas. Specifically, four buttons are provided including a two-field pattern button 1105a represented by two fields of view which are horizontally aligned and partially overlap each other, a four-field pattern button 1105b represented by four fields of view which are arranged in four corner parts and partially overlap each other, a three-field pattern button 1105c represented by three fields of view which are horizontally aligned and partially overlap each other, and a one-field pattern button 1105d represented by only a single field of view. These pattern buttons show a field arrangement diagram roughly representing their arrangement of fields so that users can intuitively grasp the arrangement patterns of the fields of view which are assigned to the pattern buttons. It is noted that, although the fields of view are represented by a circular shape in the exemplary user interface screen for ease of understanding, actual fields of view are not limited to a circular shape but may have a trapezoidal shape. The reason to represent the field patterns by circular shapes is that such a circular shape helps users to grasp the field patterns, and areas which are extracted by the circular shapes from the fields of view which are actually captured provide reliable data higher than the other parts.

When users select a desired one from the pattern buttons, the selected measurement area is superposed on an image shown in the top view map image display area 1101. For example, when a user selects a two-field pattern button 1105a, the measurement-area setting screen 1100 of FIG. 31 is shown. As shown in FIG. 31, the measurement area corresponding to the selected two-field pattern button shown by the brown line is superposed on an image shown in the top view map image display area 1101. In addition, the selected two-field pattern button 1105a is highlighted in the measurement-area setting field 1105 so that the user can visually determine which measurement area template is currently selected.

In addition, users may arbitrarily adjust the measurement area. Users can move the location of a measurement area, tilt or rotate the measurement area, or change the size of the measurement area by dragging the measurement area in the top view map image display area 1101 by using a pointing device such as mouse. Accordingly, users can intuitively specify the measurement area. In this case, the centers of the circular shapes of the two-field pattern can be shown. These shown centers of the circular shapes help users to grasp the current locations and relative positional relationship of the fields of view so that users can minutely adjust their locations and relative positional relationship.

Figure 33:
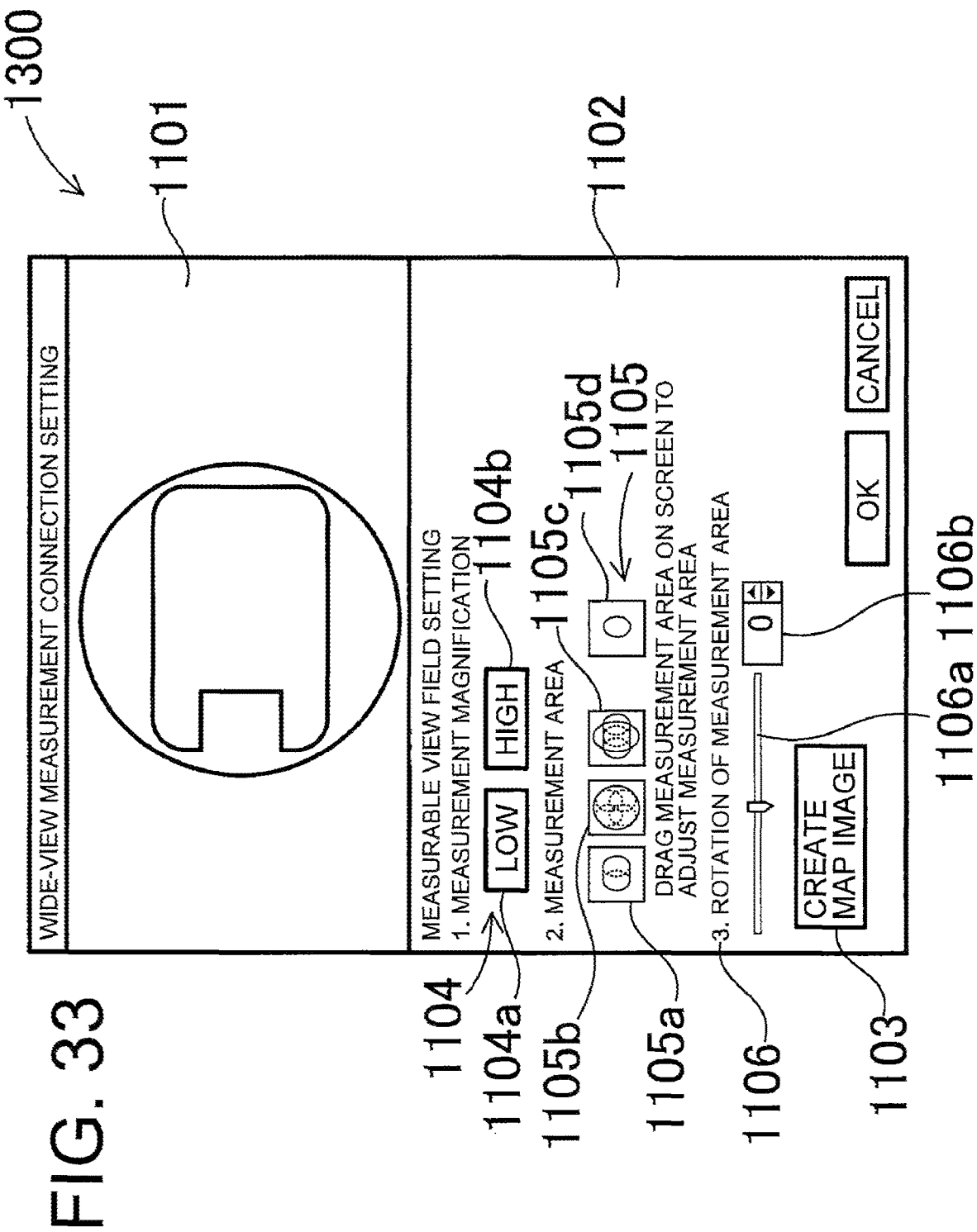
FIG. 33 is an image showing a screen in which a four-field pattern is selected in the measurement area setting screen shown in FIG. 31.
Figure 34:
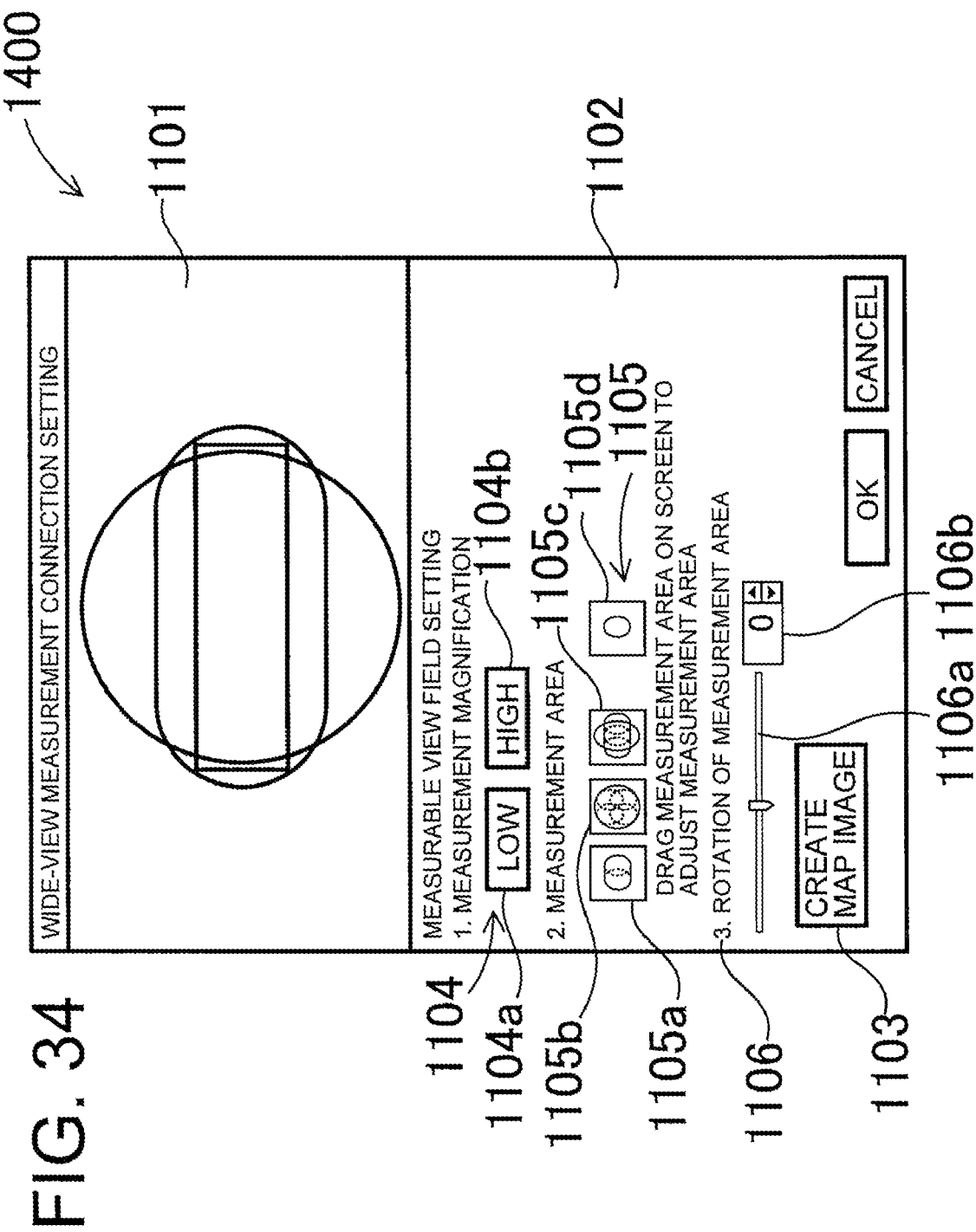
FIG. 34 is an image showing a screen in which a three-field pattern is selected in the measurement area setting screen shown in FIG. 31.
Figure 35:
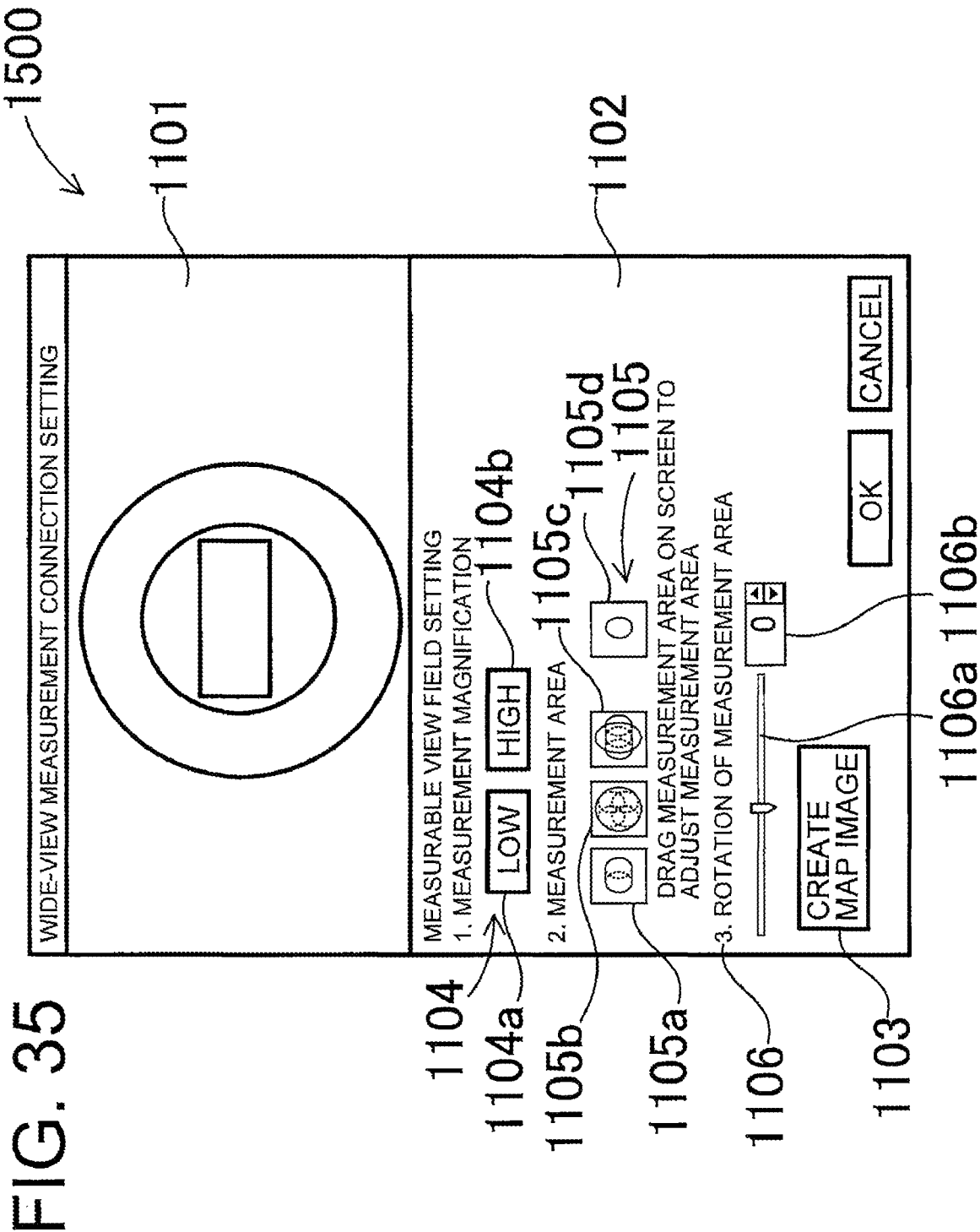
FIG. 35 is an image showing a screen in which a one-field pattern is selected in the measurement area setting screen shown in FIG. 31.

Similarly, when a user selects a four-field pattern button 1105b, a measurement-area setting screen 1300 of FIG. 33 is shown. Also, when a user selects a three-field pattern button 1105c, a measurement-area setting screen 1400 of FIG. 34 is shown. Also, when a user selects a one-field pattern button 1105d, a measurement-area setting screen 1500 of FIG. 35 is shown. Because measurement areas are previously provided like as templates as discussed above, users can select a suitable one from the previously-provided templates depending on the exterior shape of a measurement object. It is noted that the aforementioned templates are illustrative, and other patterns such as rhombus, trapezoid, polygon, and ring can be used. In addition to selection of a suitable template, users may directly draw a rectangular shape, circular shape, and the like on the top view map image display area 1101, alternatively, users may draw a line freehand to specify a measurement area and the area which is enclosed by the freehand line is converted into one of predetermined shapes which is selected as a roughly similar shape to the enclosed area by the top view map image generator 261.

(Measurement-Area Rotation Field 1106)

The measurement-area rotation field 1106 is a tool for rotating a measurement area which has been defined. In the exemplary user interface screen shown in FIG. 31, a slider for rotation 1106*a* is provided, a cursor can be moved along the rotation slider 1106*a* so that the measurement area in the top view map image display field is correspondingly rotated. Also, users can directly enter a numerical value as rotation angle into a numeric input field 1106*b* which is arranged on the right side of the rotation slider 1106*a*.

(Top View Map Image Creation Button 1103)

After the measurement area is defined as discussed above, a top view map image can be created. The top view map image creation button 1103 for creating a top view map image is provided under these operation fields. When users press the top view map image creation button 1103, the top view map image generator 261 generates the top view map image, and the generated top view map image is displayed in the top view map image display area 1101. Accordingly, users can visually grasp the displayed top view map image.

Figure 36:
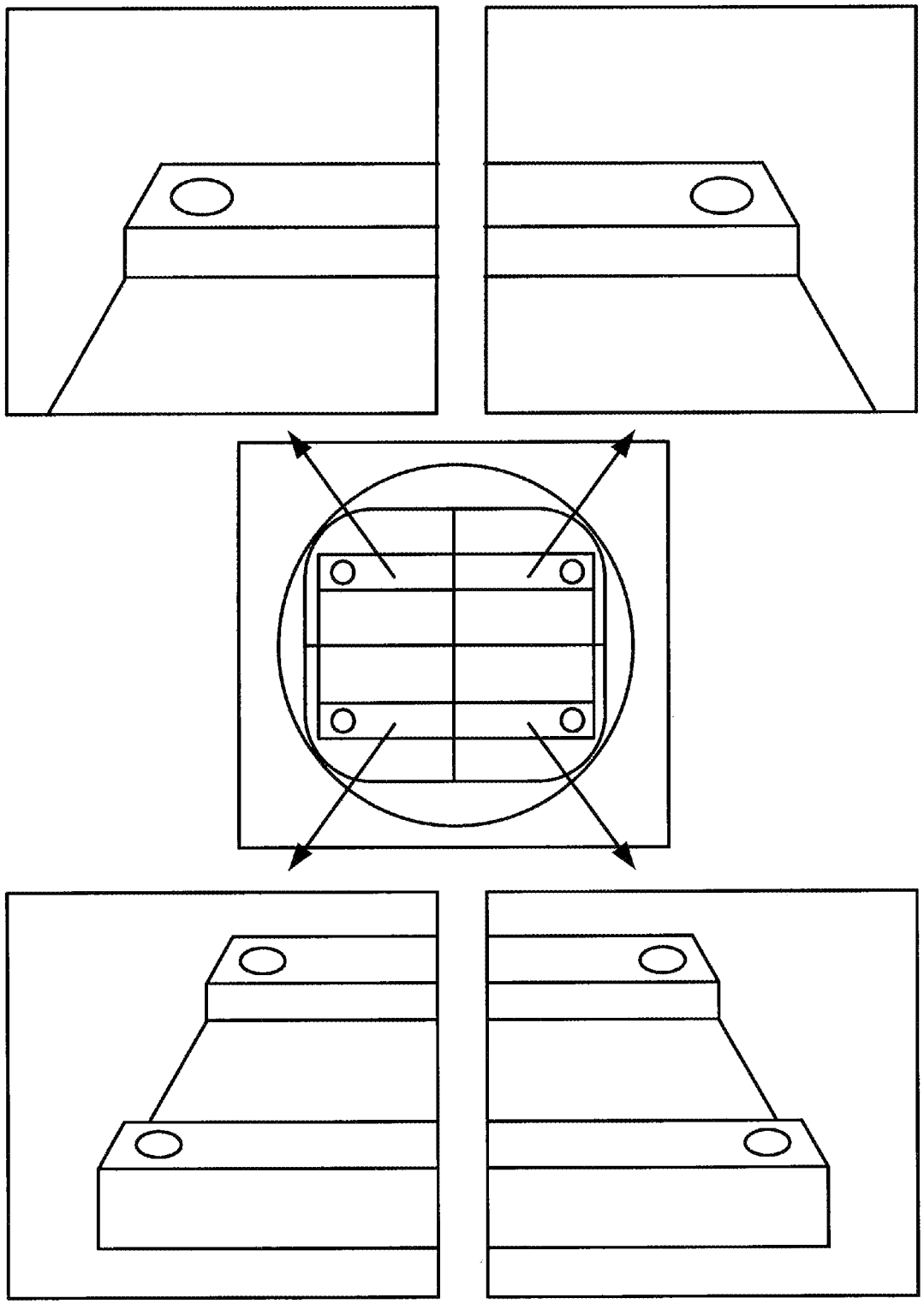
FIG. 36 is an image showing exemplary measurement area setting and measurement locations.

The top view map image generator 261 moves the translation stage part 141 so that measurement positions are positioned at the center of their corresponding field of view of the three-dimensional shape measuring apparatus. FIG. 36 shows a defined area and exemplary measurement positions in the defined area. Although only the translation stage part 141 is illustratively moved in this example, needless to say, rotation of the rotation stage part 143 can be combined with the movement of the translation stage part 141. In addition, in the case in which the rotation of the rotation stage part 143 can be combined with the movement of the translation stage part 141, after the translation stage part 141 is moved, the rotation stage part 143 is rotated at a position where the minimum rotation radius of the translation stage part 141 including the placement surface 142 as a whole is provided, and then the translation stage part 141 is translated.

(Top View Map Image Addition Function)

In addition, a top view map image addition function for adding an additional image to a top view map image which has been obtained may be additionally provided to spread the field of view of the top view map image. According to this function, if a top view map image is not properly obtained, for example, if right and left parts of a measurement object are unclear, or if a right or left part of a measurement object is not fully included, an image of the right or left part of the measurement object can be added to the obtained top view map image so that a wider field of view can be provided. An exemplary top view map image addition function is shown as a modified embodiment in FIG. 32. In this embodiment, an "auto" button 1103B is provided as the top view map image creation button 1103, and its information "1. Top View Map Creation: You Can Create Image Viewed from Top" or the like is shown in the upper part of an operation field. In addition, left and right buttons 1107*a* and 1107*b* are provided as addition buttons 1107 which realizes the top view map image addition function so that users can add an additional field of view to the left or right side to the top view map image which is currently shown. After that, a new top view map image corresponding to the wider field of view is similarly shown in the top view map image display area 1101 in the field of view, and users see the new top view map image and can further add an image to the new top view map image if necessary. For example, in the case in which to capture a top view map image as wide field of view as possible the stage 140 is positioned away from the measurer 100 when the image is captured, the right and left parts of the image of an object to be captured often cannot be seen, and to address this an image of a right or left part of the object can be added if necessary to take measurement against such unclear image.

Figure 32:
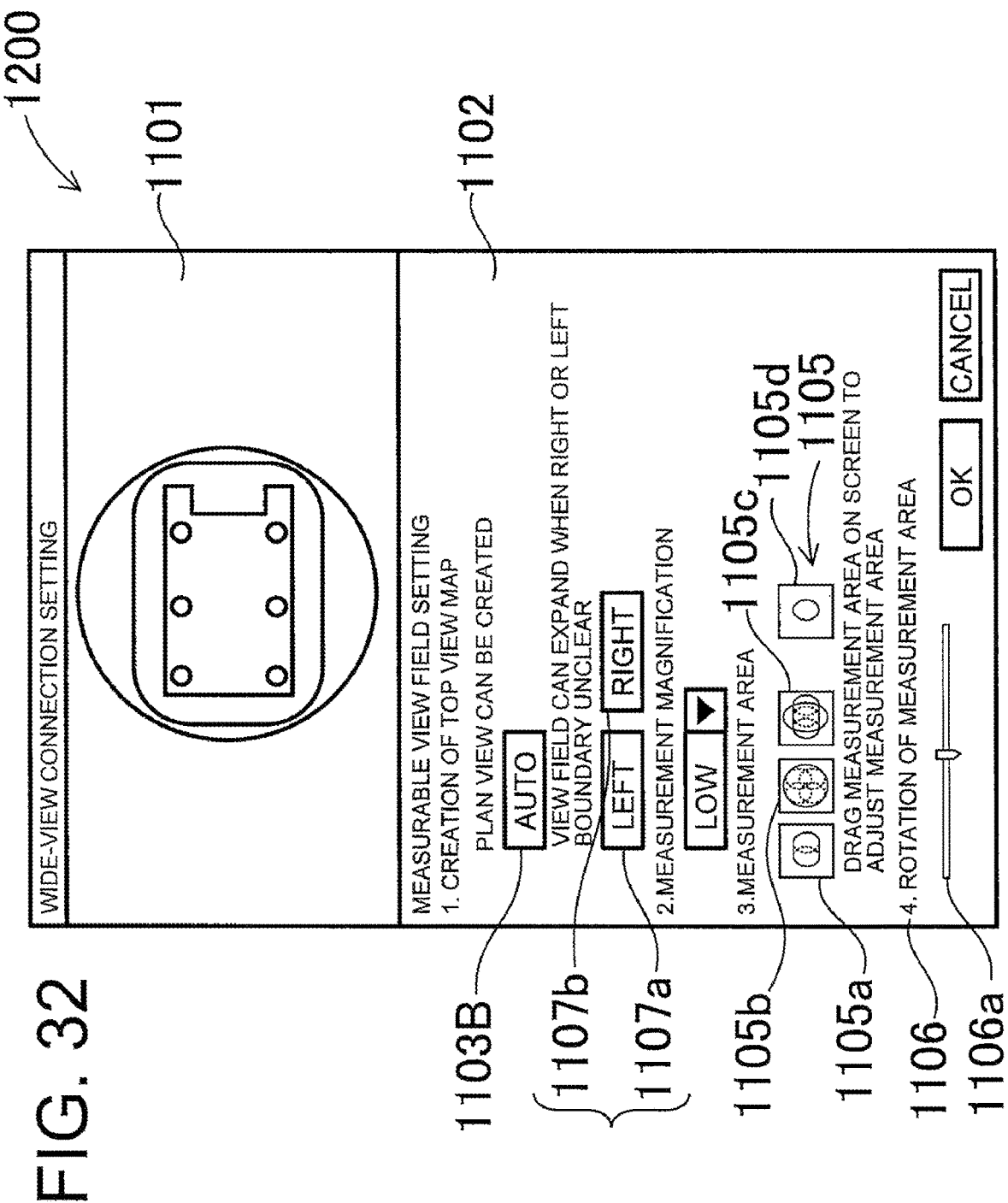
FIG. 32 is an image showing a measurement area setting screen according to a modified embodiment.

It is noted that, although addition buttons 1107 in the embodiment of FIG. 32 add an additional image to the right or left side of the top view map image which has been obtained, the present invention is not limited to this but such an additional image may be added to the top or bottom side of the top view map image, a part which is located in a slanting direction relative to the top view map image, or the like.

(Measuring Operation in Accordance with Measurement-Area Setting)

After the measurement area is defined as discussed above, measurement is conducted in accordance with this measurement definition. Here, the movement controller 144 moves the translation stage part 141 so that measurement points are positioned at the center of their corresponding field of view of the three-dimensional shape measuring apparatus. FIG. 36 shows a defined area and exemplary measurement positions in the defined area. Although only the translation stage part 141 is illustratively moved in this example, needless to say, rotation of the rotation stage part 143 can be combined with the movement of the translation stage part 141. In the case in which the rotation of the rotation stage part 143 can be combined with the movement of the translation stage part 141, after the translation stage part 141 is moved, the rotation stage part 143 is rotated at a position where the minimum rotation radius of the translation stage part 141 including the placement surface 142 as a whole is provided, and then the translation stage part 141 is translated.

(Data Split)

Figure 37:
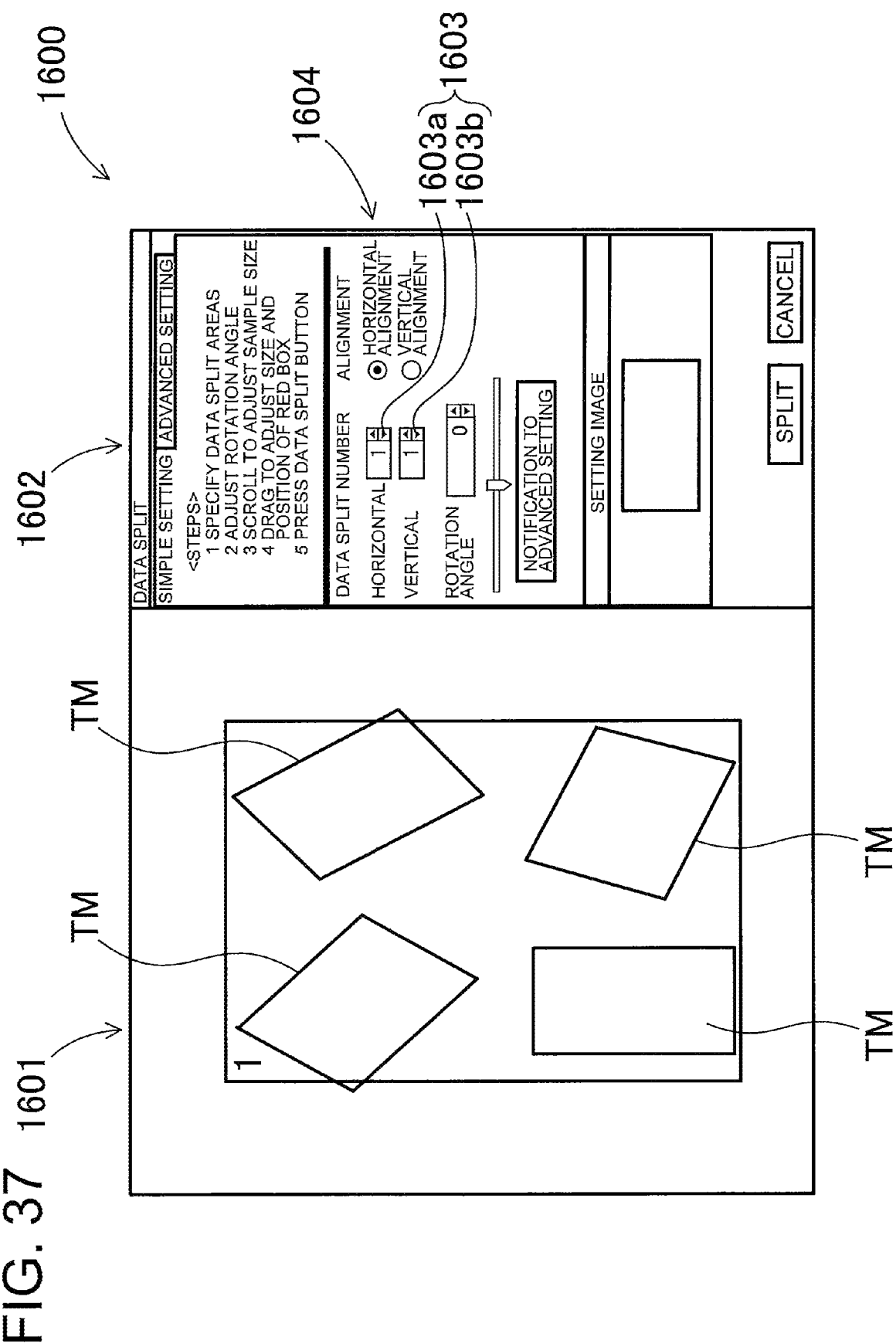
FIG. 37 is an image showing an example of data division screen.

Procedure of data split is now described with reference to FIGS. 37 to 41. FIG. 37 shows a result of top view map images TM converted from the measurement results in which two or more of measurement objects which have the same shape are measured. The three-dimensional shape measuring apparatus according to this embodiment can measure substantially the entire surface of the placement surface 142 by using the translation stage part 141. Users can measure two or more measurement objects which are arranged on the placement surface 142 in one measuring operation.

In the case in which the measurement results in which two or more measurement objects are measured at one time are provided in a file format, a single file which includes the two or more measurement objects will be provided. If the measurement results of two or more measurement objects are provided as a single file, inconveniences may arise in a case in which users compare the measurement results of two or more measurement objects with each other, in a case in which users compare each of the measurement results with master data, in a case in which users compare each of the measurement results with a template for analysis, or other cases. To address this, the three-dimensional shape measuring apparatus according to this embodiment can provide two or more files each of which includes corresponding one measurement object when two or more measurement objects are measured in one measuring operation.

An unsophisticated data split setting (simple setting) window 1602, and an image display area 1601 are provided in the right and left parts of a data split screen 1600 shown in FIG. 37, respectively. The unsophisticated data split setting window 1602 includes a data split number input field 1603 which accepts entry of the number of separate parts to be divided for the data split. Users can enter any number into the data split number input field 1603 to specify the number of separate parts to be divided for the data split. In this example, data split number setting buttons 1603a and 1603b which accept the numbers of separate parts to be vertically and horizontally divided from the image display area 1601 are provided. Users can enter any number into the data split number setting buttons 1603a to specify the number of separate parts to be horizontally divided for the data split, and any number into the data split number setting buttons 1603b to specify the number of separate parts to be vertically divided for the data split. The entire measurement area is divided into the separate parts in accordance with the numerical values which are entered corresponding to the vertical and horizontal directions.

Figure 38A:
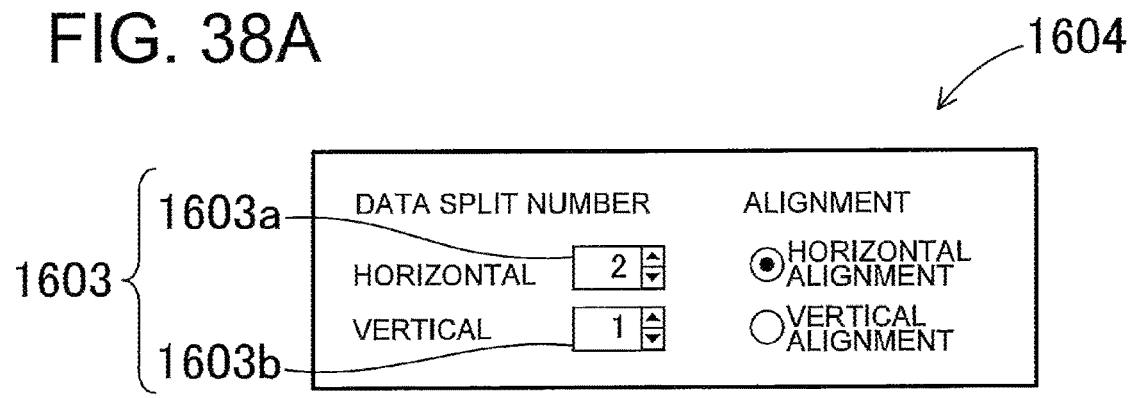
FIG. 38A is a part of an unsophisticated setting window.
Figure 38B:
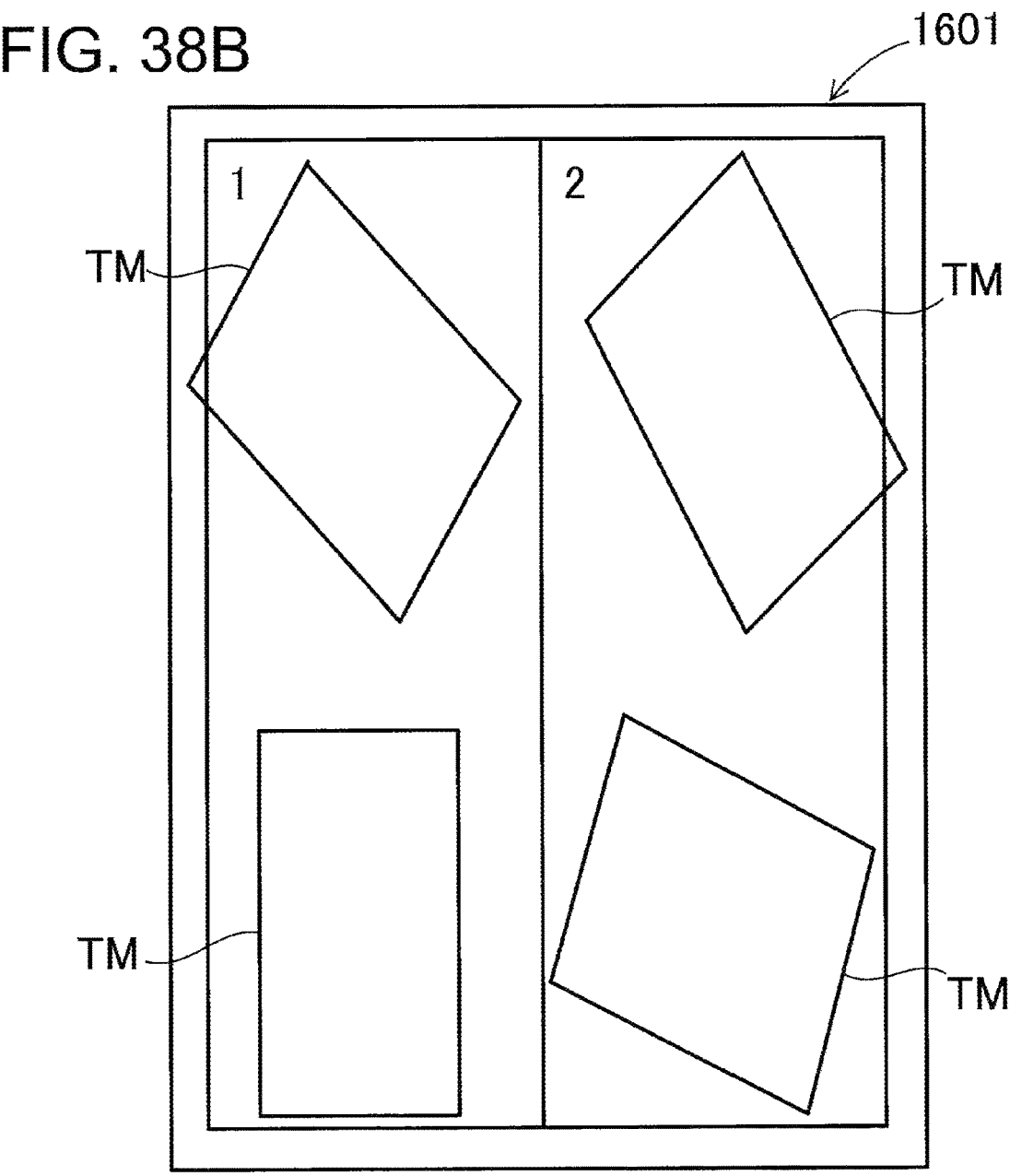
FIG. 38B is an image showing an image display area.
Figure 39A:
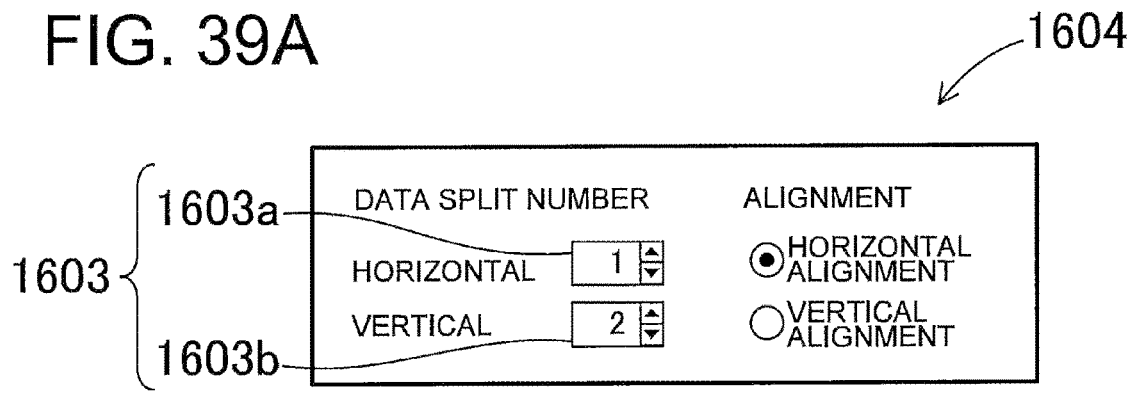
FIG. 39A is a part of an unsophisticated setting window.
Figure 39B:
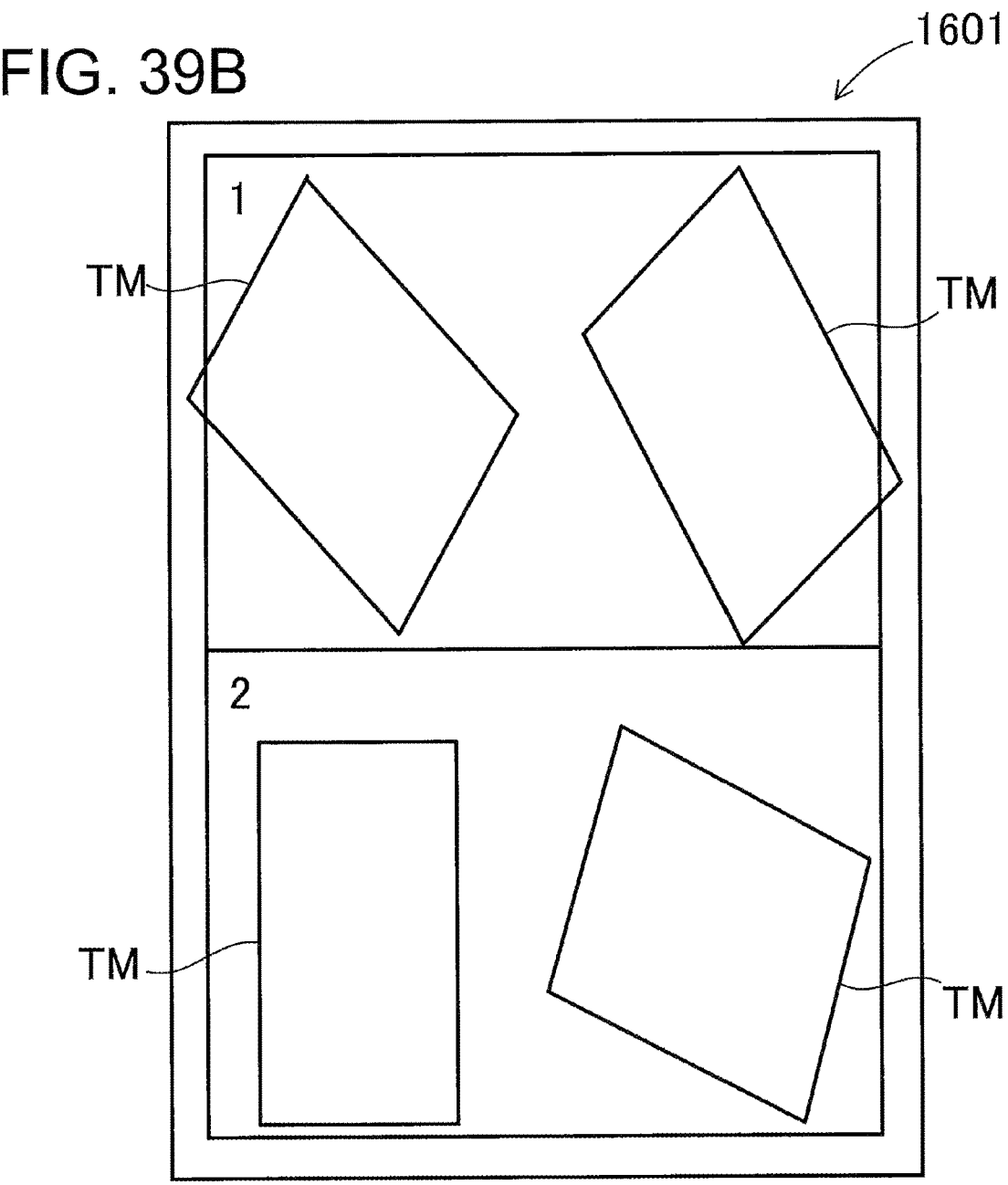
FIG. 39B is an image showing an image display area.
Figure 40A:
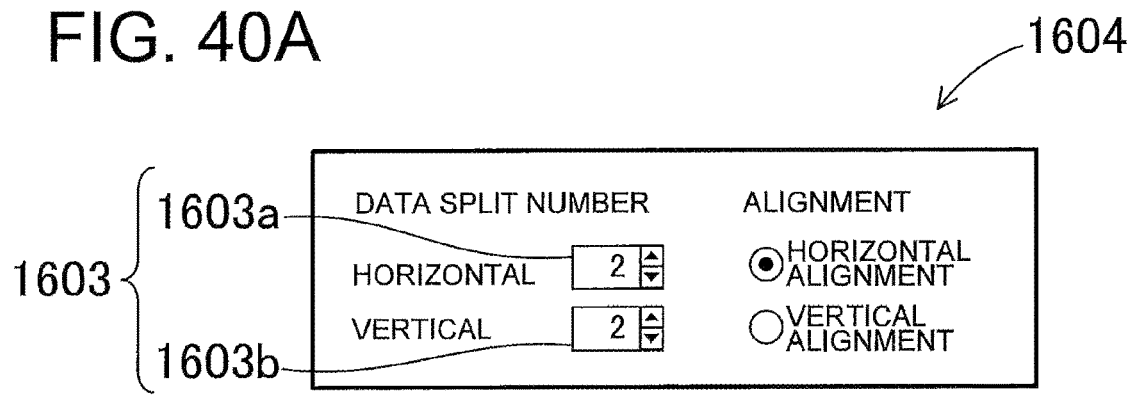
FIG. 40A is a part of an unsophisticated setting window.
Figure 40B:
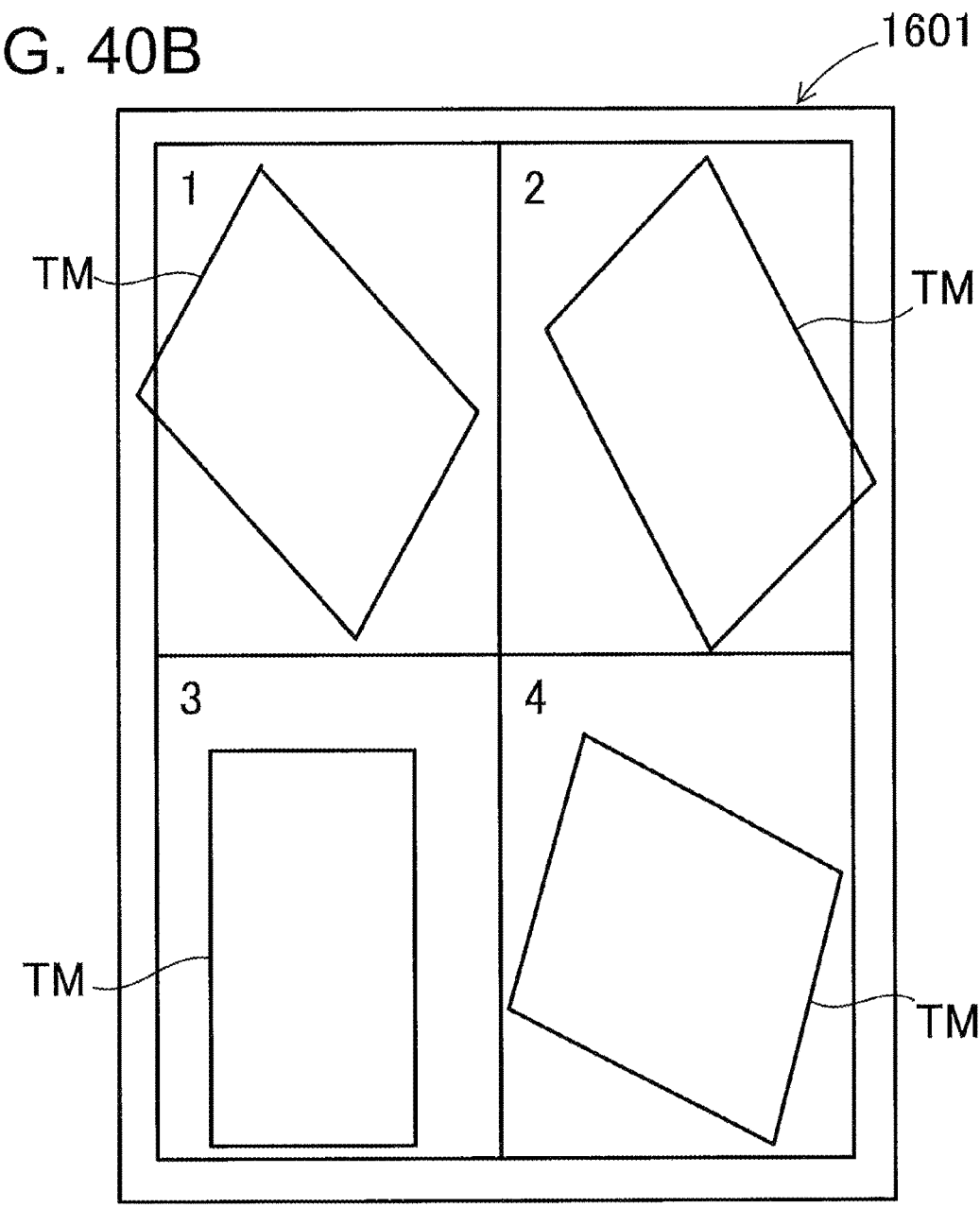
FIG. 40B is an image showing an image display area.
Figure 41A:
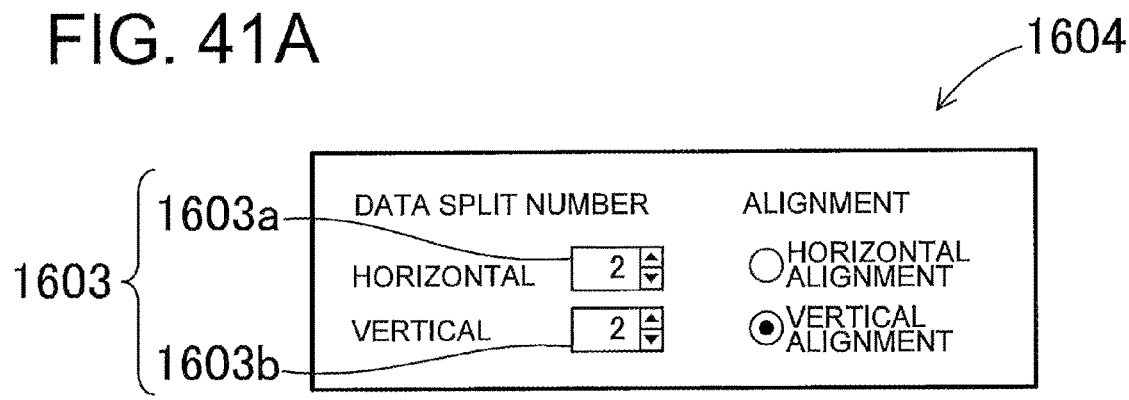
FIG. 41A is a part of an unsophisticated setting window.
Figure 41B:
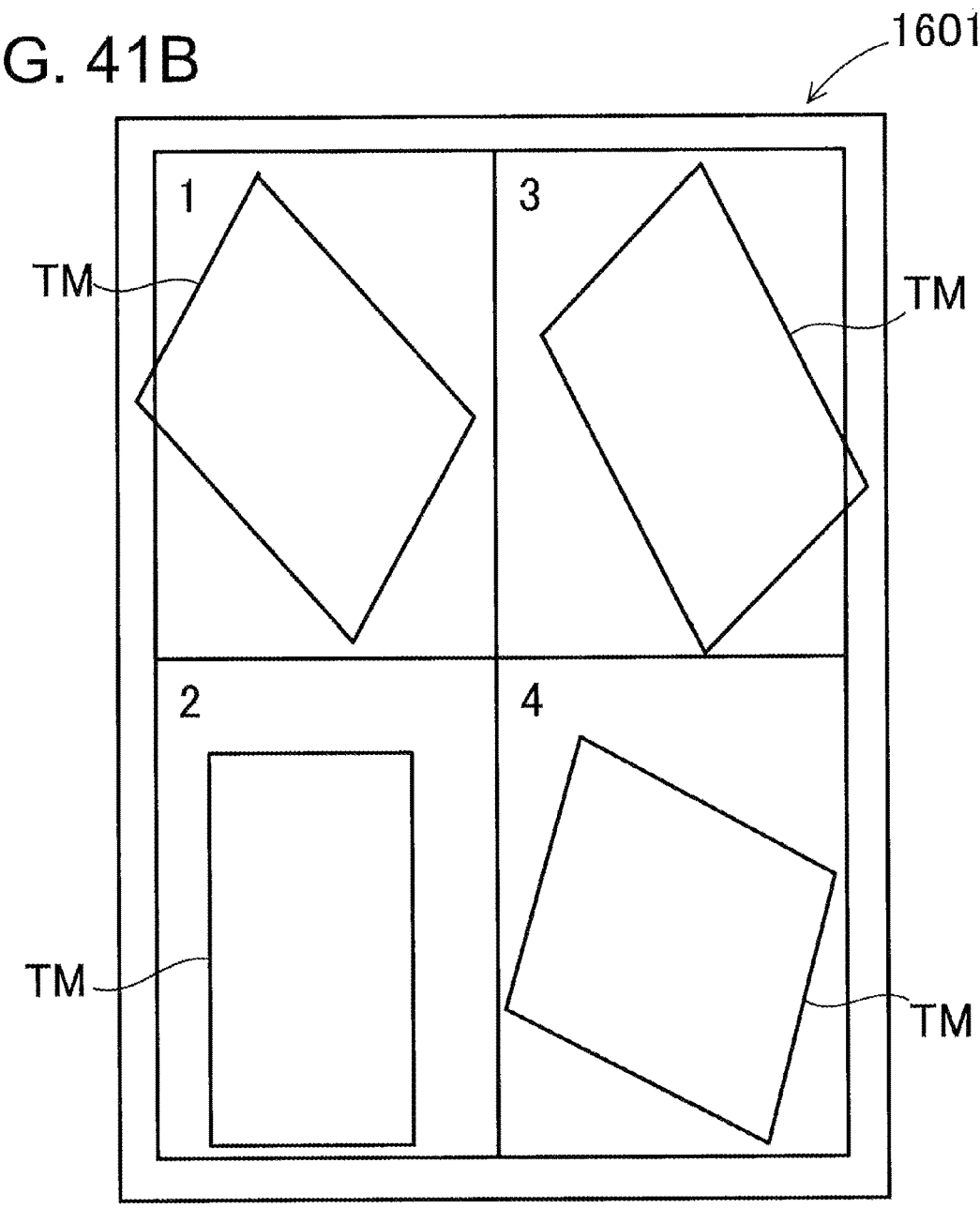
FIG. 41B is an image showing an image display area.

For example, when a user enters 2 as horizontally dividing number into the data split number setting buttons 1603a and enters 1 as vertically dividing number into the data split number setting buttons 1603b as shown in FIG. 38A, the image display area 1601 is divided into two (left and right) separate parts as shown in FIG. 38B. Similarly, when a user enters 1 as horizontally dividing number into the data split number setting buttons 1603a and enters 2 as vertically dividing number into the data split number setting buttons 1603b as shown in FIG. 39A, the image display area 1601 is divided into two (upper and lower) separate parts as shown in FIG. 39B.

In addition, the unsophisticated data split setting window 1602 includes an assignment setting field 1604 which specifies the order of separate parts. Here, radio buttons which allow users to select horizontal or vertical assignment are provided in the assignment setting field 1604. For example, when the horizontal assignment is selected in the assignment setting field 1604 shown in FIG. 40A, numbers 1 and 2 are assigned to the parts on the first row in the horizontal direction from the left to the right, and numbers 3 and 4 are assigned to the parts on the second row in the horizontal direction from the left to the right. Similarly, when the vertical assignment is selected in the assignment setting field 1604 shown in FIG. 41A, numbers 1 and 2 are assigned to the parts on the left (first) column in the vertical direction from the top to the bottom, and numbers 3 and 4 are assigned to the parts on the second column in the vertical direction from the top to the bottom.

Figure 42:
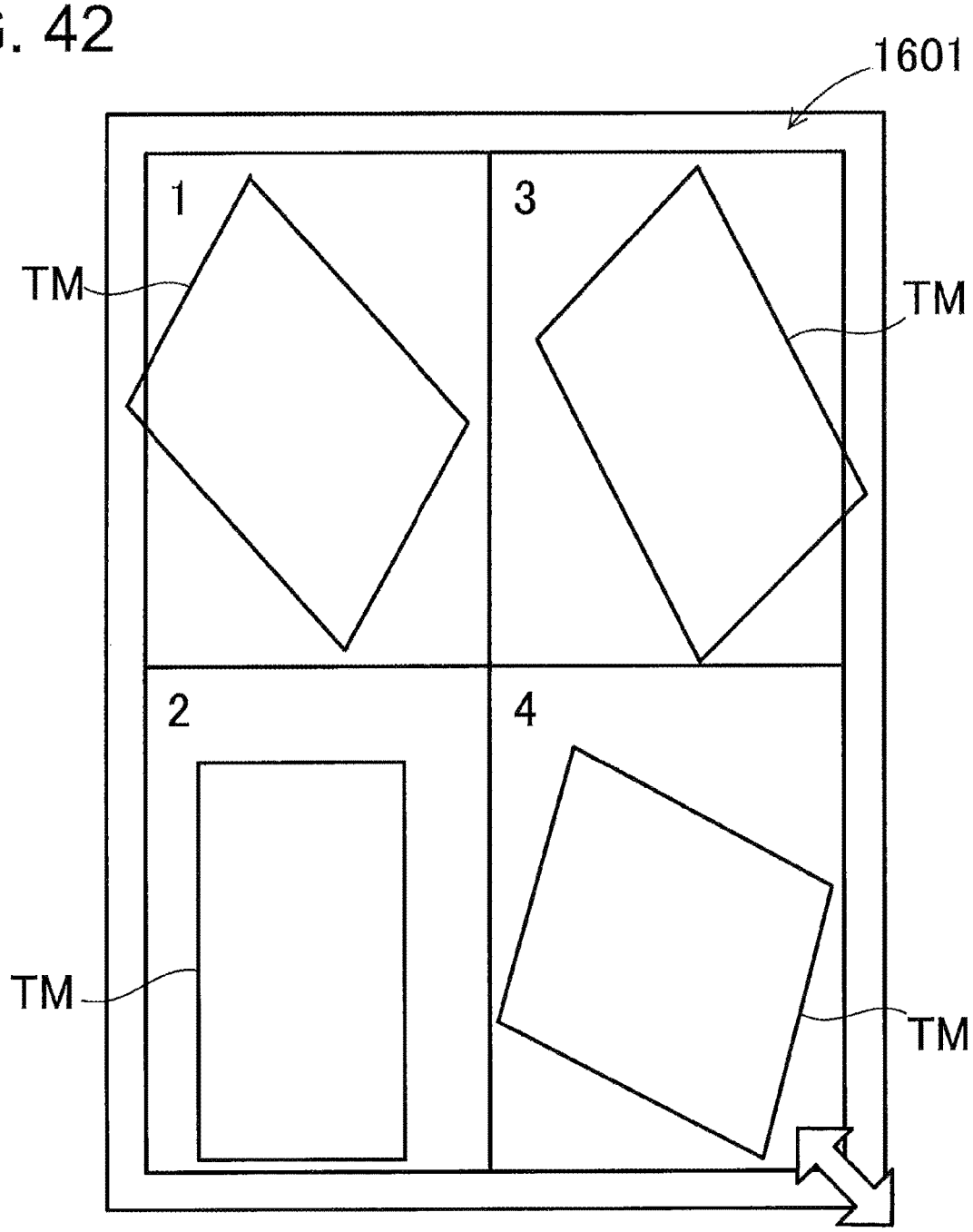
FIG. 42 is an image showing adjustment of split areas in an image display area.

As discussed above, area numbers are assigned to split areas corresponding to the separate parts, and these area numbers are shown on the top left side of their corresponding split areas. Also, users can adjust the arrangement of split areas. For example, users see the split areas which have been actually divided from the image display area 1601, and can manually minutely adjust the size and location of the split areas so that top view map images TM of two or more measurement objects are included in the split areas, as shown in FIG. 42. For example, the size can be adjusted by dragging handles of edges of a split area which defines the split area by using a pointing device such as mouse. In addition, the split areas may be moved so that their arrangement is changed by dragging one of the split areas to be moved. Also, when the image display area 1601 is divided into such split areas, because the viewpoint of top view map images TM shown in the image display area 1601 is fixed from the top in the Z direction so that the placement surface 142 are looked down, there is an advantage that users can easily intuitively specify the split areas.

Figure 43:
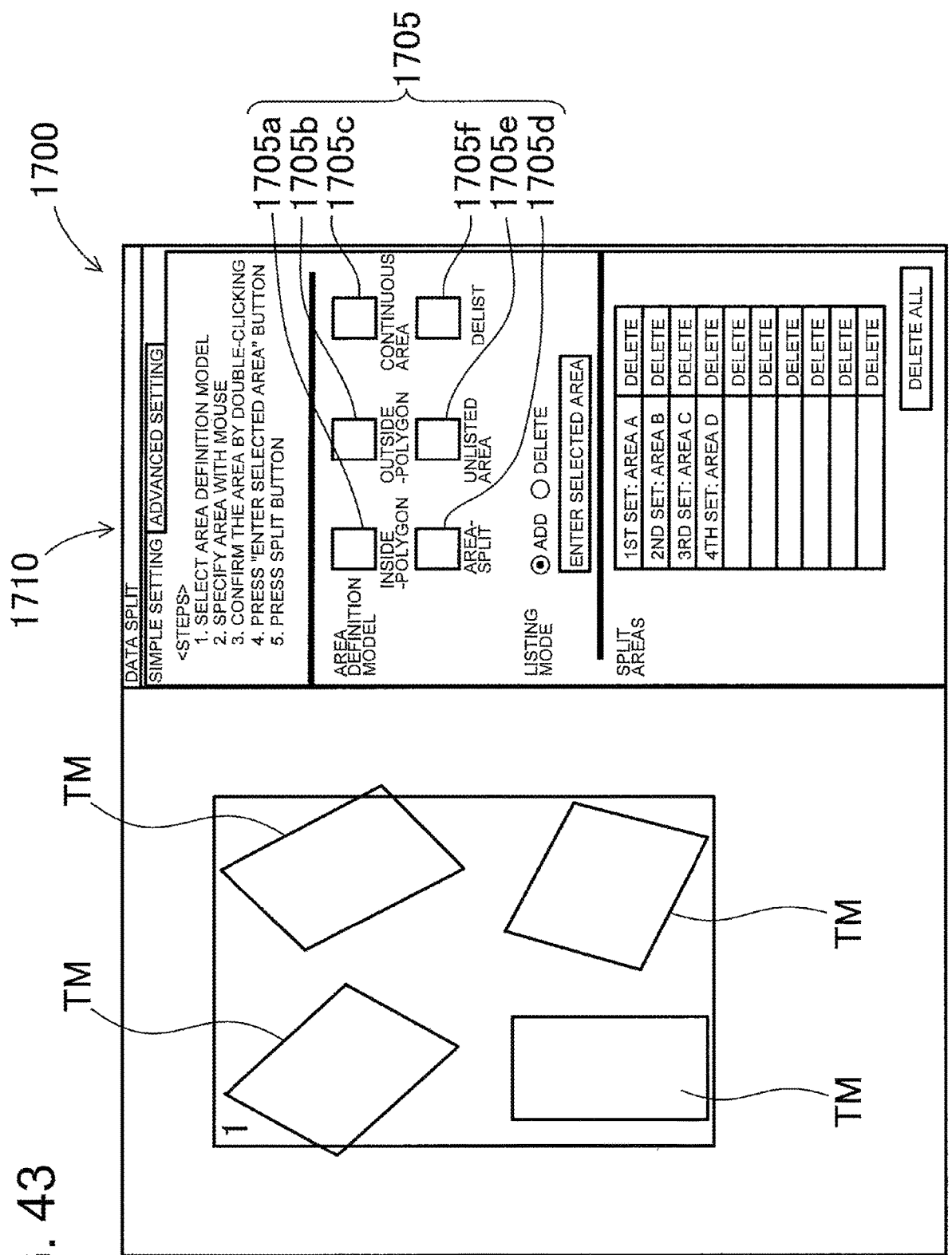
FIG. 43 is an image showing an advanced setting screen.

In addition, split areas can be specified in more detail. A setting window 1710 which specifies detailed settings is provided in the right side part of an advanced setting screen 1700 shown in FIG. 43. In the case of the aforementioned unsophisticated data split setting window 1602, although measurement objects are required to be assigned one by one into a red box in a grid, if the arrangement of the measurement objects is complicated, all the measurement objects may not be assigned one by one into their corresponding split area. To address this, in this embodiment, a partitioning line can be specified at any position by area definition model buttons 1705 which have previously-defined, their corresponding area dividing manner. The area definition model buttons 1705 shown in FIG. 43 includes an inside-polygon button 1705a, an outside-polygon button 1705b, a continuous area button 1705c, an area-split button 1705d, an unlisted area button 1705e, and a delist button 1705f.

For example, when the inside-polygon button 1705a is selected, a part inside a polygonal shape defined by three or more points which are pointed out by a mouse is generated as divided data. When the outside-polygon button 1705b is selected, a part outside such a polygonal shape is generated as divided data. When the continuous area button 1705c is selected, all surfaces which continuously extend from a point which is pointed out by clicking is generated as divided data. When the area-split button 1705d is selected, one of areas which are divided by clicks of a mouse button at two points to draw a line is generated as divided data. When the unlisted area button 1705e is selected, an area which has not been listed is selected as a whole and is generated as divided data. The generated area is listed into a split area field by pressing an "enter selected area" into list button, and unnecessary listed split area can be delisted by pressing the delist button 1705f. Also, the measurement object corresponding to a selected split area is shown by a color different from other split areas which are not selected. Also, when the advanced setting screen 1700 is activated, the rendering mode of the measurement objects in the display area may be changed to 3D rendering so that users can grasp the measurement objects in any directions.

When users complete the split area settings and press a split button, a window for selecting a folder in which the division data saved is activated so that the split areas can be saved as two or more separate files.

Figure 44:
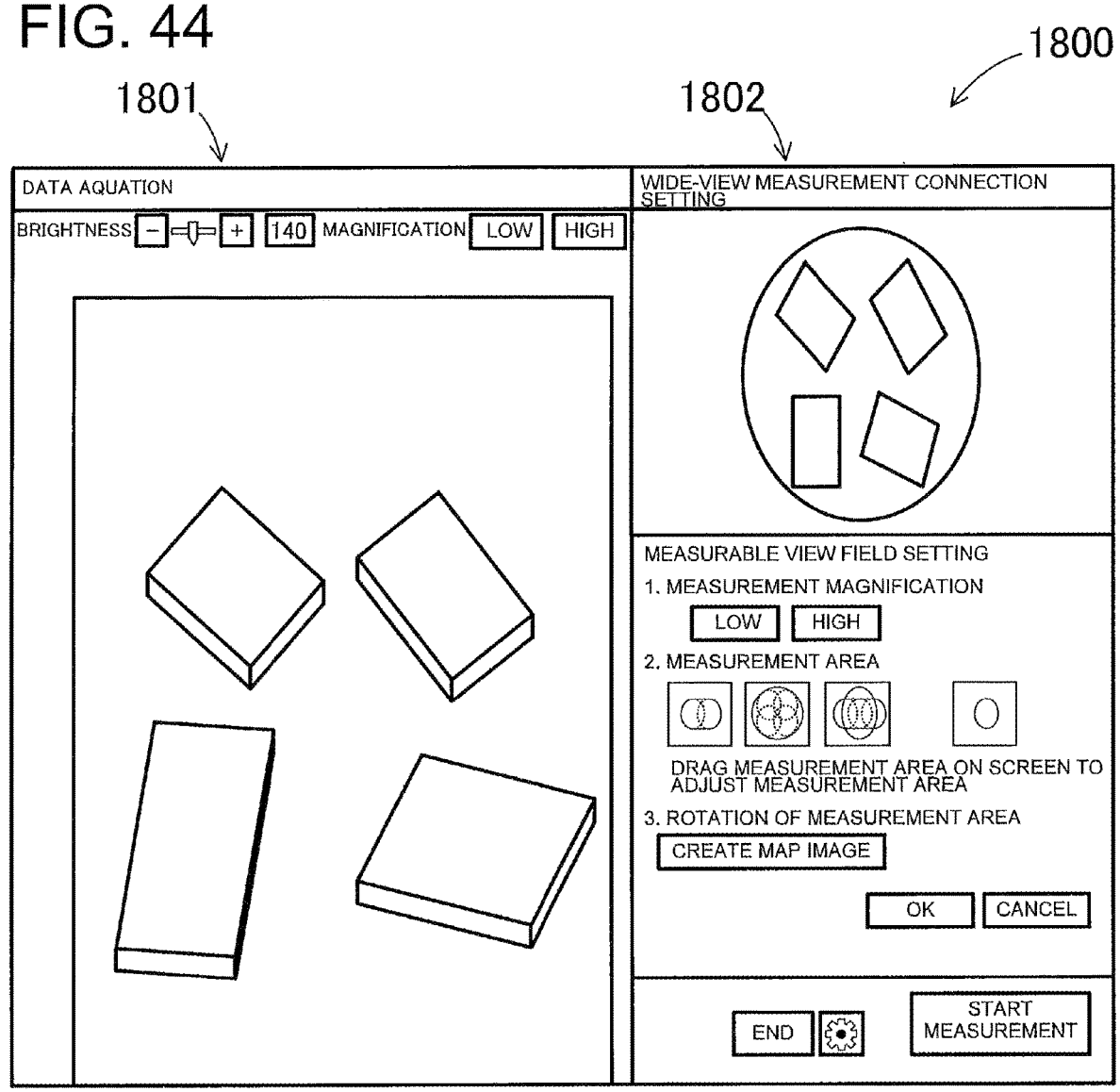
FIG. 44 is an image showing another exemplary measurement area setting screen.

It is noted that, although it is has been illustratively described that split areas are specified from the measurement result after the measurement has been completed in the foregoing embodiment, the present invention is not limited to this but split areas may be specified prior to measurement so that divided measurement results corresponding to the split areas which have been specified are provided when the measurement is completed. A measurement-area setting screen 1800 of FIG. 44 shows a measurement field-of-view setting screen showing measurement objects which have the same shape and are arranged on the placement surface 142. The aforementioned split area setting function may be provided in an image display area 1801 on the top right side in which top view map images are shown.

Because if users do not see top view map images of measurement objects which are viewed down from the top it is difficult for users to properly specify split areas, split areas are preferably specified in their top view map image. A measurement field-of-view setting area 1802 shows top view map images which are viewed live down from the top, and as a result these images can be effectively used for split area setting. Needless to say, images for split area setting may be separately generated.

Split areas can be specified in their top view map image in different manners. In addition to the aforementioned manner in which grid-shaped areas to which split areas are assigned are provided, split areas can be assigned to any areas. Different analysis templates can be applied to data corresponding to the split areas. The analysis templates can analyze geometry such as dimensions and angle of a position which is previously defined by users, as well as parameters such as surface roughness. In particular in the case in which two or more types of measurement objects are measured at one time, different analysis templates can be applied to the measurement objects depending on their types. Because the measurement result of the measurement objects includes three-dimensional shape information, suitable analysis templates can be automatically selected and applied to the measurement objects based on their three-dimensional shape information.

Also, split areas can be automatically specified. The three-dimensional measuring apparatus according to this embodiment can simultaneously recognize the placement surface 142 in addition to measurement objects. Partitioning lines can be specified between the measurement objects based on the continuation of the placement surface 142.

As discussed above, according to this embodiment, because split areas are manually or automatically specified in a measurement setting screen or in the measurement result after measurement of two or more measurement objects, separate files which include their corresponding measurement object can be independently provided.

A three-dimensional shape measuring apparatus and a three-dimensional shape measuring method according to the present invention can be suitably used for three-dimensional shape measuring apparatuses or digitizers which measure heights of a measurement object by using the triangulation principle and the like, or an inspection apparatus which determines non-defectives or defectives based on their inspection results.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

What is claimed is:

1. A three-dimensional shape measuring apparatus which measures a three-dimensional shape of a measurement object, the three-dimensional shape measuring apparatus comprising:
    a stage that includes a placement surface on which a measurement object is placed, the stage rotating about a rotational axis perpendicular to the placement surface;
    an illuminator that illuminates the measurement object, which is placed on the stage, with measuring light having a predetermined pattern;
    a photoreceptor that receives the measuring light which is reflected from the measurement object illuminated by the illuminator, and provides light-reception signals representing a light reception amount;
    a mount that supports the stage;
    a fixer that is coupled to the mount, and fixes the illuminator and the photoreceptor to produce a measurement area to be illuminated with the measuring light above the stage and to incline optical axes of the illuminator and the photoreceptor with respect to the placement surface in an orientation in which the illuminator and the photoreceptor face the measurement area obliquely downward;
    a support that supports the fixer to be spaced away from the mount;
    a point cloud data generator that generates point cloud data as a set of points including three-dimensional position information representing a three-dimensional shape of the measurement object based on the light-reception signals which are provided by the photoreceptor;
    a top view map image generator that generates a top view map image representing a plan view of the measurement object placed on the stage, from the point cloud data generated by the point cloud data generator, by mapping the point cloud data onto a plan as viewed downward from a position right above the measurement object; and
    a display that displays the top view map image generated by the top view map image generator and a line corresponding to the outer edge of the stage, such that a relative positional relationship between the stage and the measurement object is visually recognized as viewed downward from a position right above the measurement object.

2. The three-dimensional shape measuring apparatus according to claim 1, wherein the display includes a top view map image display area that shows the top view map image and the line corresponding to the outer edge of the stage.

3. The three-dimensional shape measuring apparatus according to claim 2, wherein the top view map image generator applies a two-dimensional texture image of the measurement object which is captured by the photoreceptor onto the point cloud data which is generated by the point cloud data generator onto the three-dimensional data positions in the point cloud data to generate the top view map image.

4. The three-dimensional shape measuring apparatus according to claim 2, wherein the top view map image generator generates the top view map image from a mesh image the surfaces of which are formed by applying polygons onto points in the point cloud data which is generated by the point cloud data generator.

5. The three-dimensional shape measuring apparatus according to claim 2 further comprising
    a measurement area setting part that specifies the measurement area on the top view map image which is displayed in the top view map image display area, and
    a movement controller that controls movement of the stage based on the measurement area which is defined by the measurement area setting part, wherein
    the stage is further translated in a direction parallel to the placement surface,
    the measurement area setting part specifies a plurality of the measurement areas including a measurement point respectively, and the movement controller controls translation movement of the stage such that the measurement point is positioned at the center of the stage.

6. The three-dimensional shape measuring apparatus according to claim 5, wherein the top view map image generator is capable of generating a combined top view map image by combining a plurality of top view map images of a plurality of different areas of the measurement object which are captured by the photoreceptor.

7. The three-dimensional shape measuring apparatus according to claim 6,
wherein the top view map image generator is configured to accept definition of a location on the top view map image displayed in the top view map image display area to which an additional top view map image is added, and
wherein the top view map image generator generates the additional top view map image in the defined location, and combines the top view map image or combined top view map image which has been generated and the additional top view map image to display a new combined top view map image in the top view map image display area.

8. The three-dimensional shape measuring apparatus according to claim 5, wherein the measurement area setting part is capable of selecting from among measurement area shapes.

9. The three-dimensional shape measuring apparatus according to claim 2,
wherein the stage includes a rotation stage part that rotates the placement surface, and
wherein the movement controller controls rotational movement of the rotation stage part based on the measurement area which is defined by the measurement area setting part.

10. The three-dimensional shape measuring apparatus according to claim 9,
wherein the stage further includes a translation stage part that translates the placement surface,
wherein the movement controller translates the translation stage part in a direction opposite to the support from a previously-defined original position, and the point cloud data generator generates the point cloud data representing a three-dimensional shape of the measurement object.

11. The three-dimensional shape measuring apparatus according to claim 10, wherein in the rotational movement of the rotation stage part the movement controller rotates the rotation stage part following the return movement of the translation stage part to a previously-defined reference position.

12. The three-dimensional shape measuring apparatus according to claim 2, wherein the top view map image generator generates the top view map image under a simple measurement condition which requires a lower processing load than a measurement condition in normal three-dimensional shape measurement.

13. The three-dimensional shape measuring apparatus according to claim 12, wherein the top view map image generator executes, as under the simple measurement condition, at least one of
reduction of image resolution as compared with the measurement condition in normal three-dimensional shape measurement,
reduction of exposure time of the photoreceptor as compared with the measurement condition in normal three-dimensional shape measurement, and
limitation on multiple image capture operations (if two or more illuminators are included) in which images are captured by the photoreceptor every when the illuminators illuminate the measurement object to a single image capture operation in which an image is captured by the photoreceptor only when one of the illuminators illuminates the measurement object.

14. The three-dimensional shape measuring apparatus according to claim 2,
wherein the photoreceptor comprises
a first optical system that has a first scaling factor, and
a second optical system that has a second scaling factor greater than the first scaling factor, and
wherein the top view map image generator generates the top view map image by using the first optical system even when the second optical system is selected for the three-dimensional measurement.

* * * * *